Aug. 1, 1933. F. L. FULLER 1,920,464
CASH REGISTER
Filed Dec. 3, 1926 22 Sheets-Sheet 1

Inventor
Frederick L.Fuller
By A. A. Click
and H. C. Liesering Attorneys

Aug. 1, 1933. F. L. FULLER 1,920,464
CASH REGISTER
Filed Dec. 3, 1926 22 Sheets-Sheet 3

Inventor
Frederick L. Fuller
By
A. A. Wliche and
H. C. Mieserud Attorneys

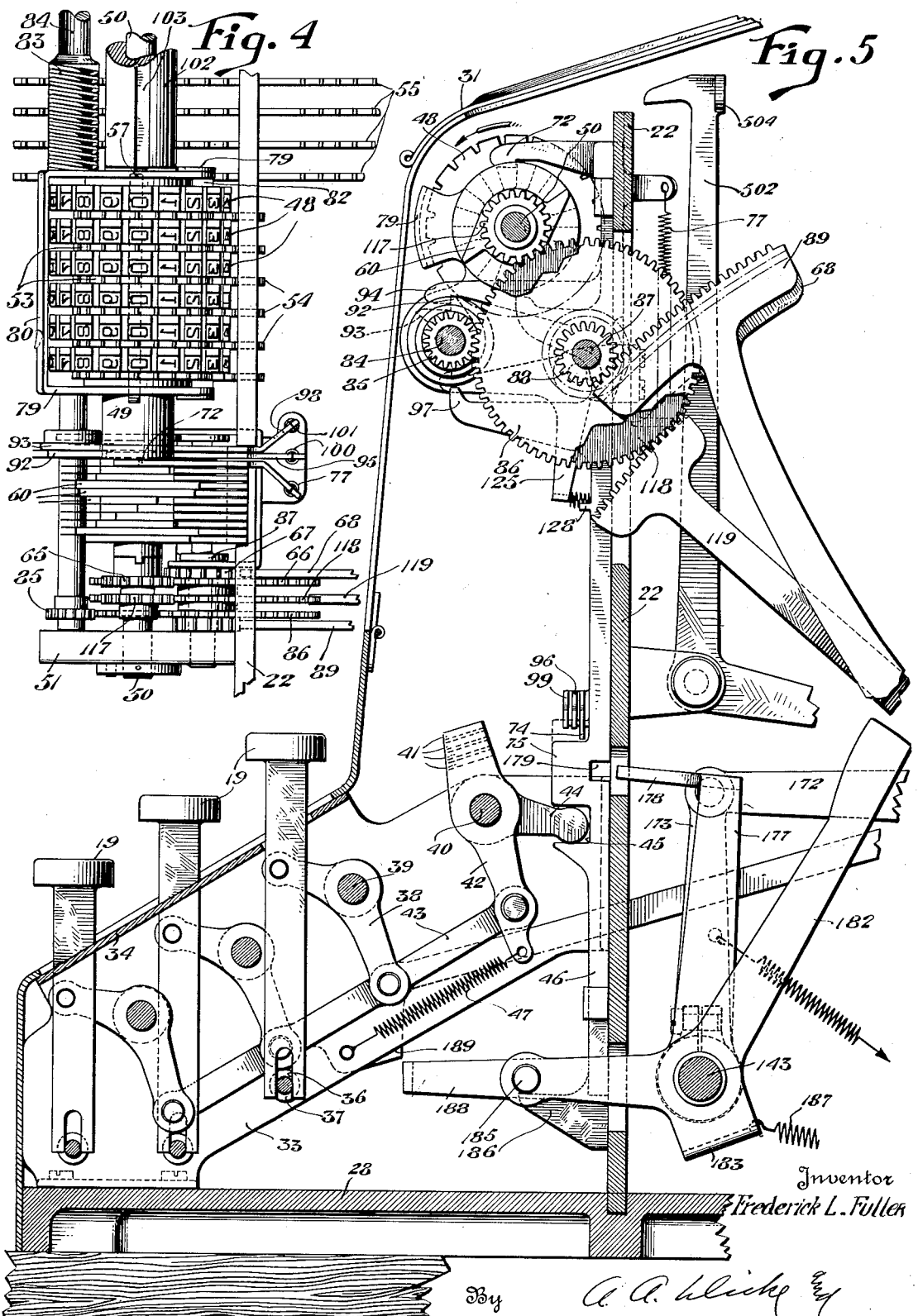

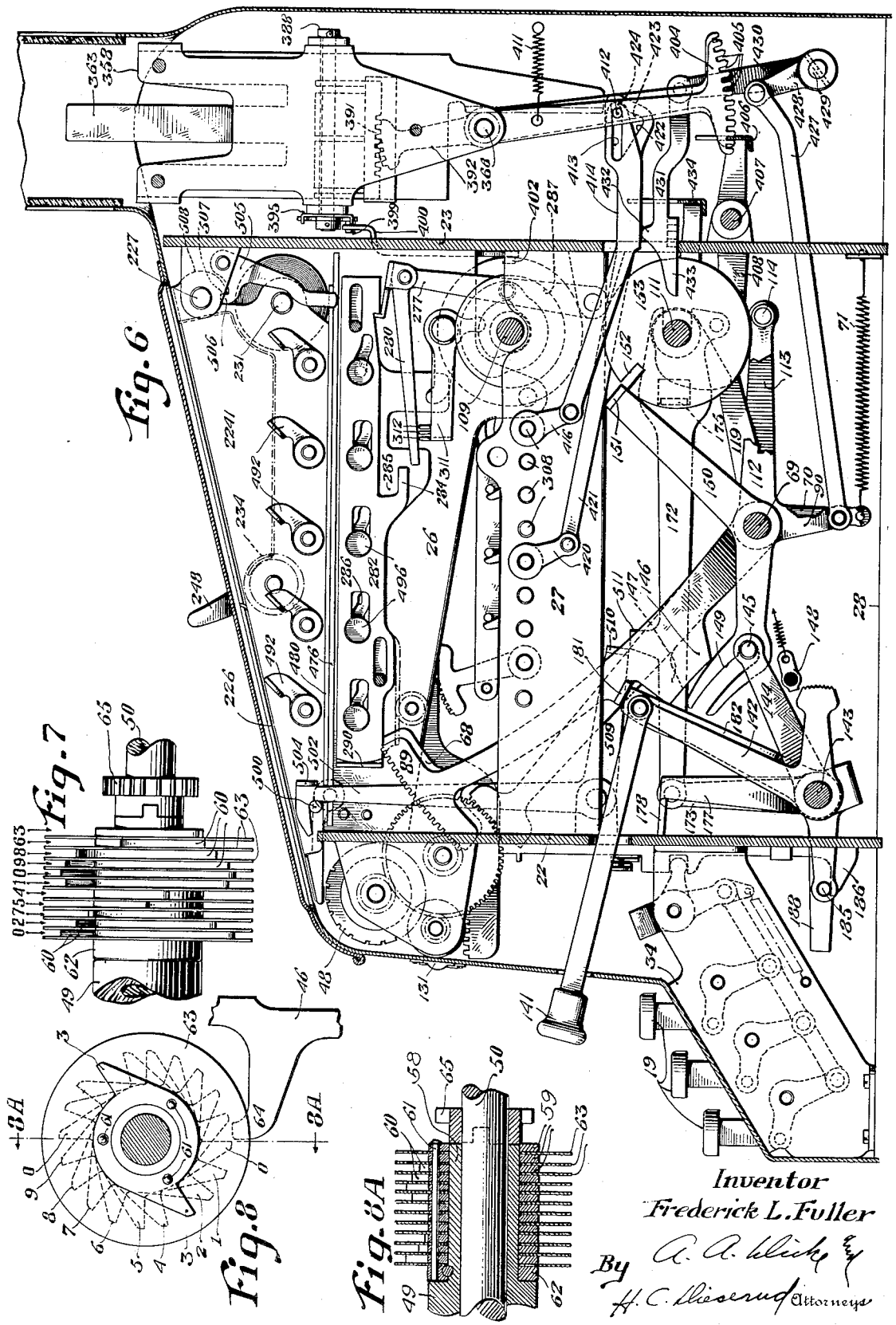

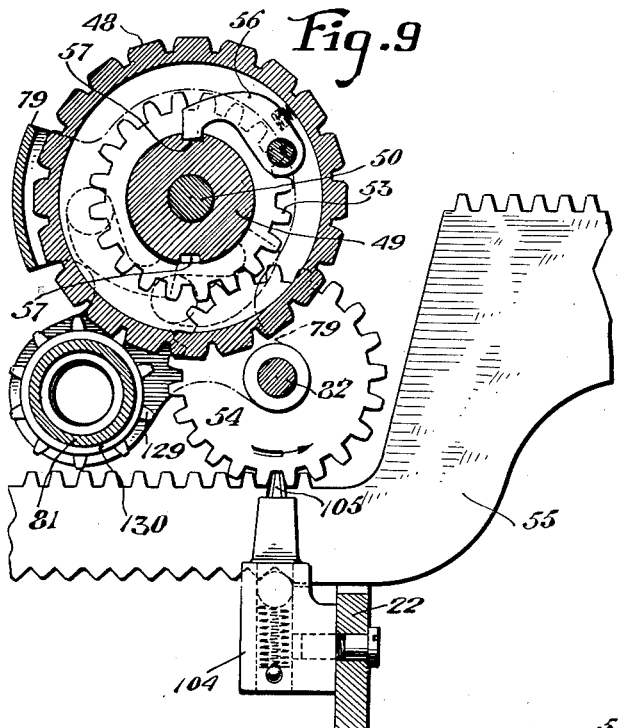
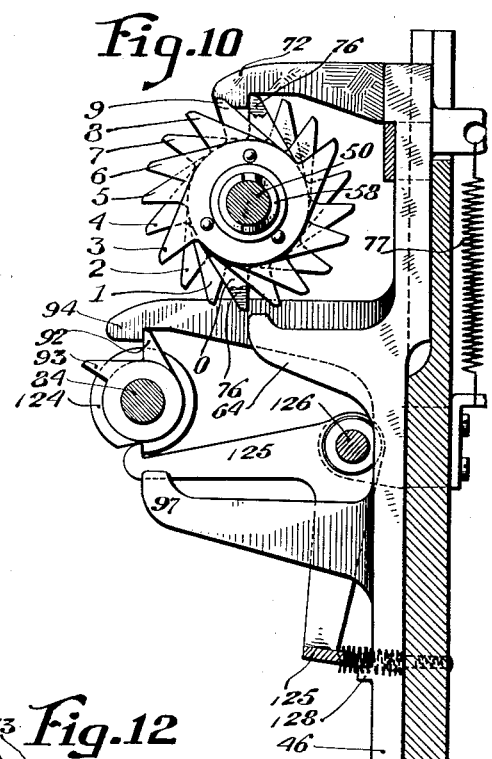
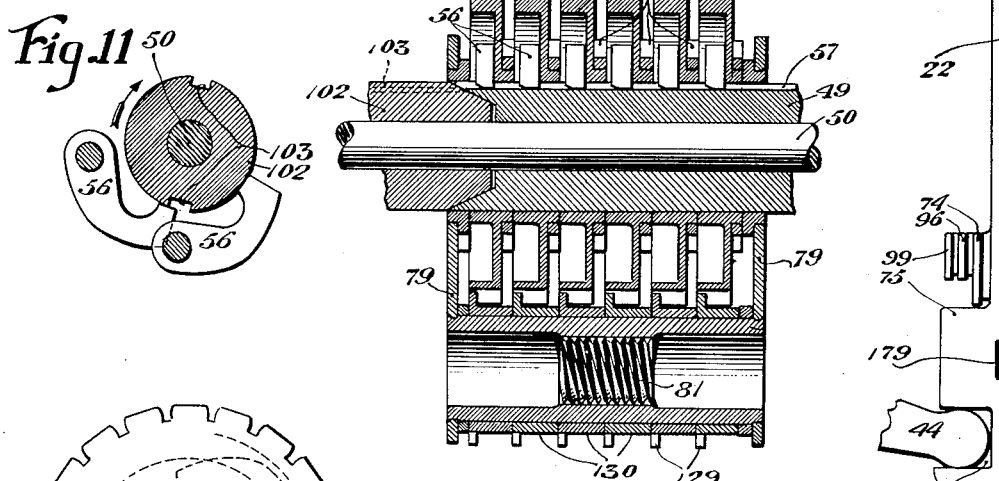
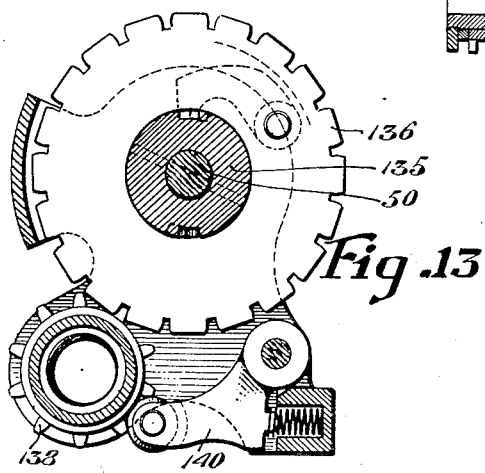
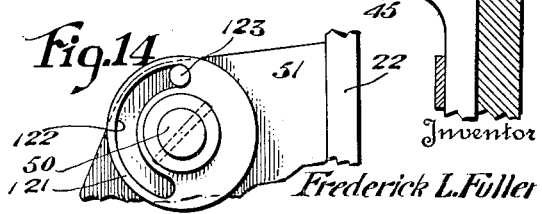

Aug. 1, 1933.  F. L. FULLER  1,920,464
CASH REGISTER
Filed Dec. 3, 1926  22 Sheets-Sheet 7
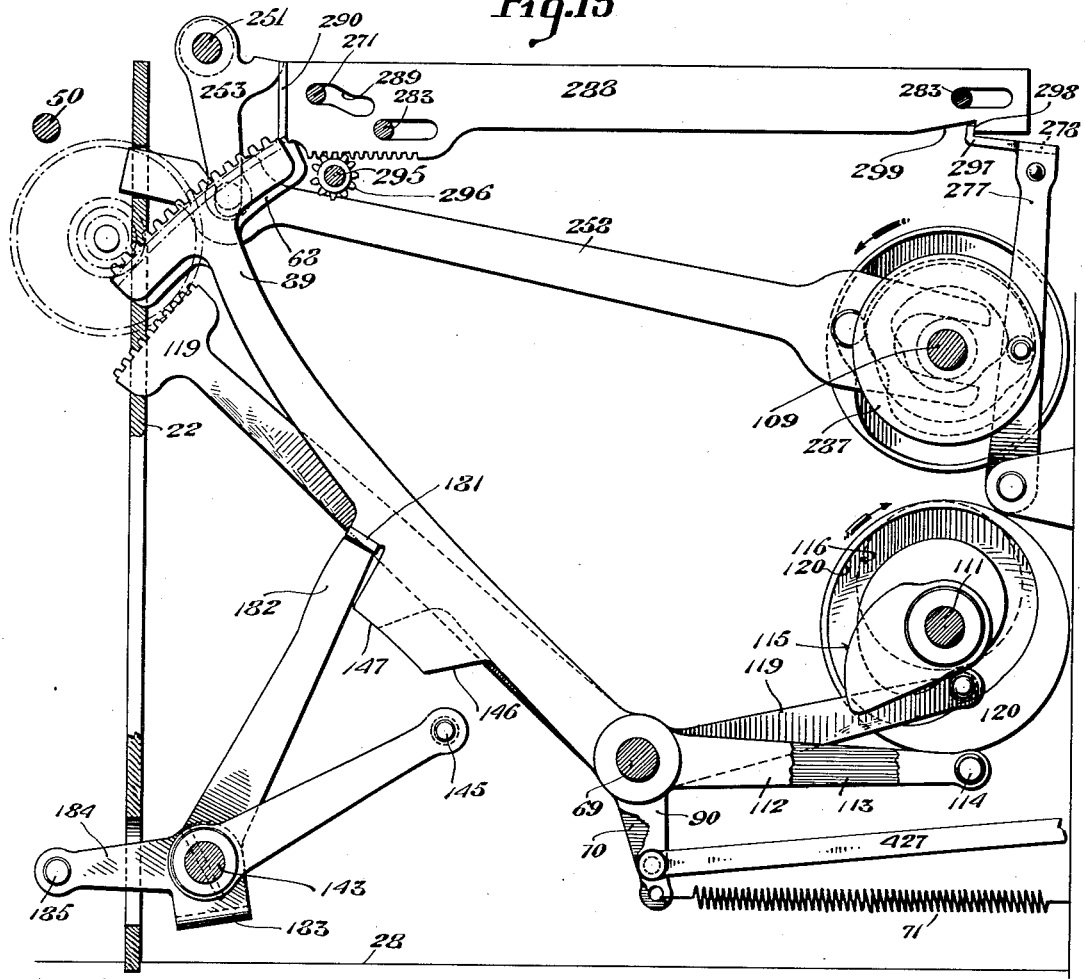
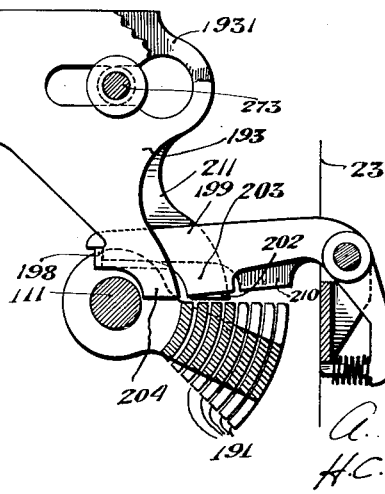

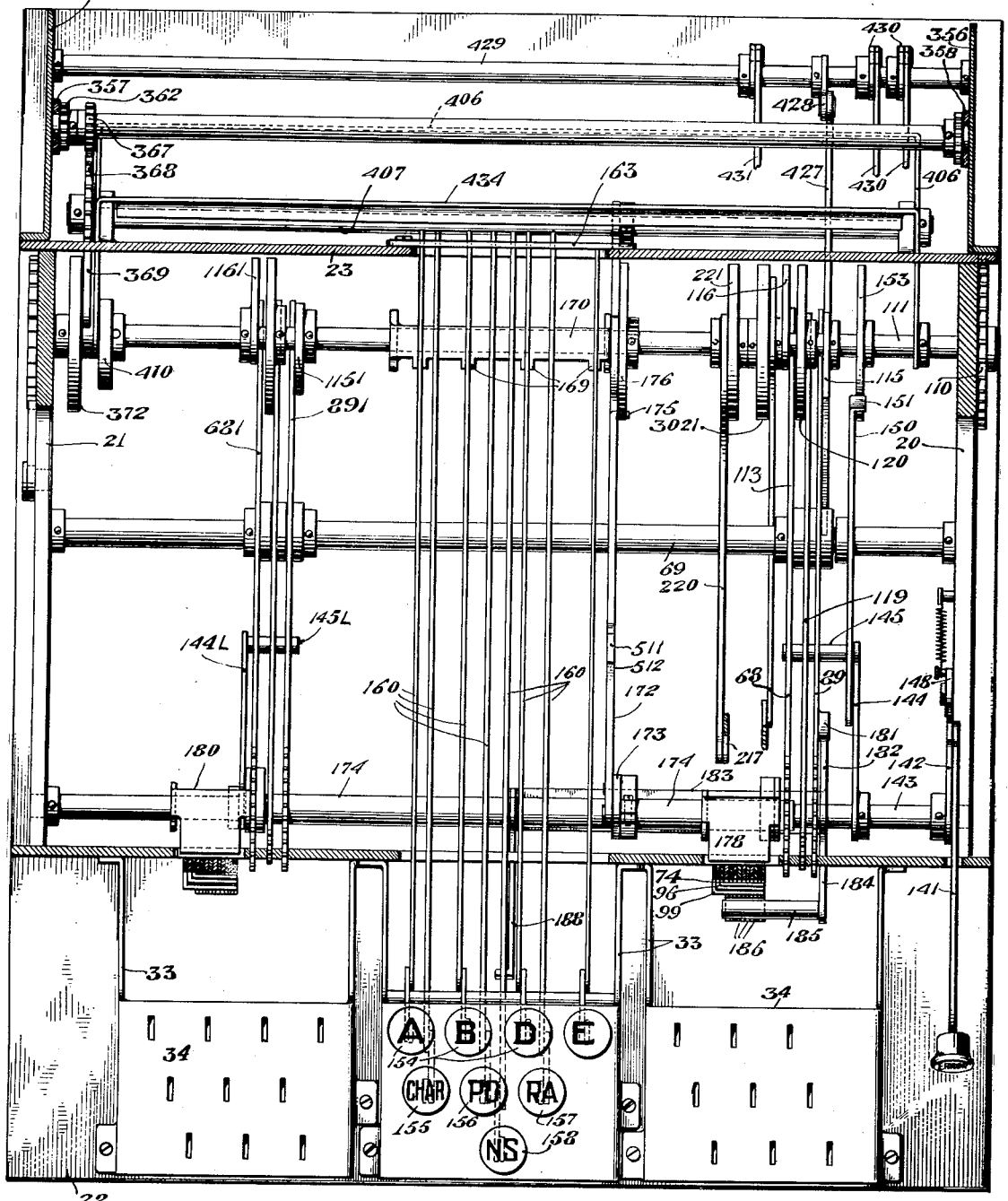

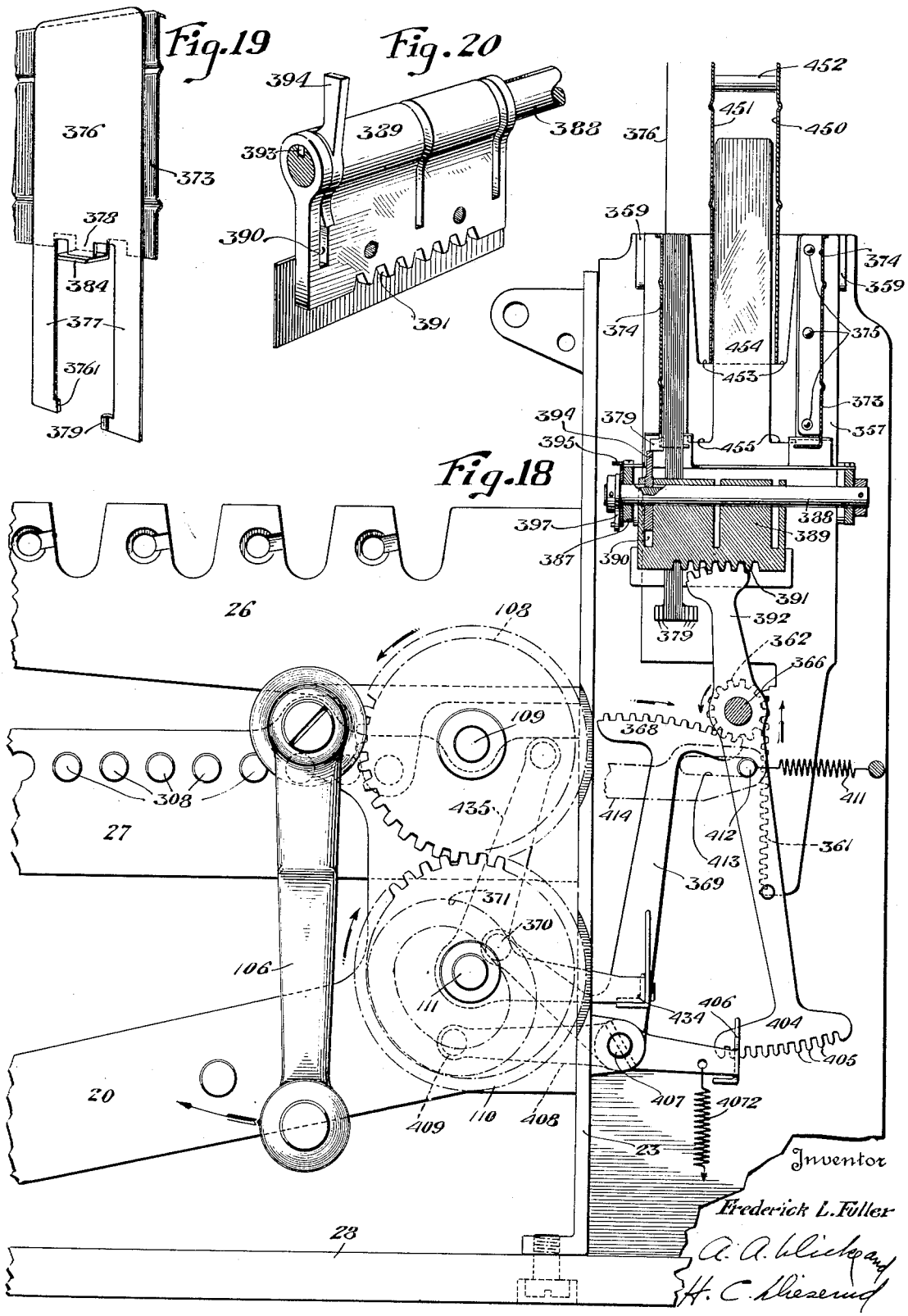

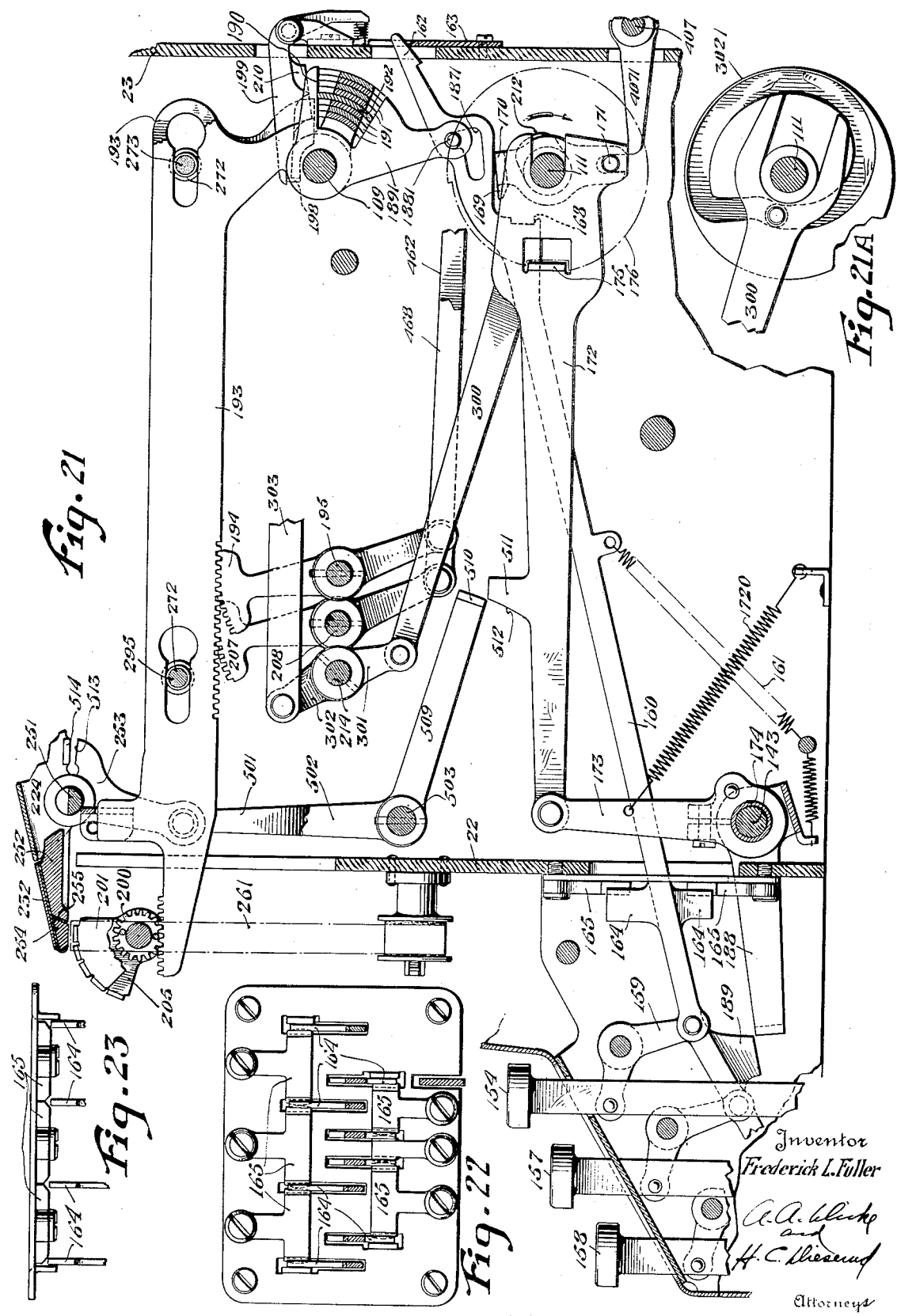
Aug. 1, 1933.  F. L. FULLER  1,920,464
CASH REGISTER
Filed Dec. 3, 1926   22 Sheets-Sheet 10
Inventor
Frederick L. Fuller
Attorneys

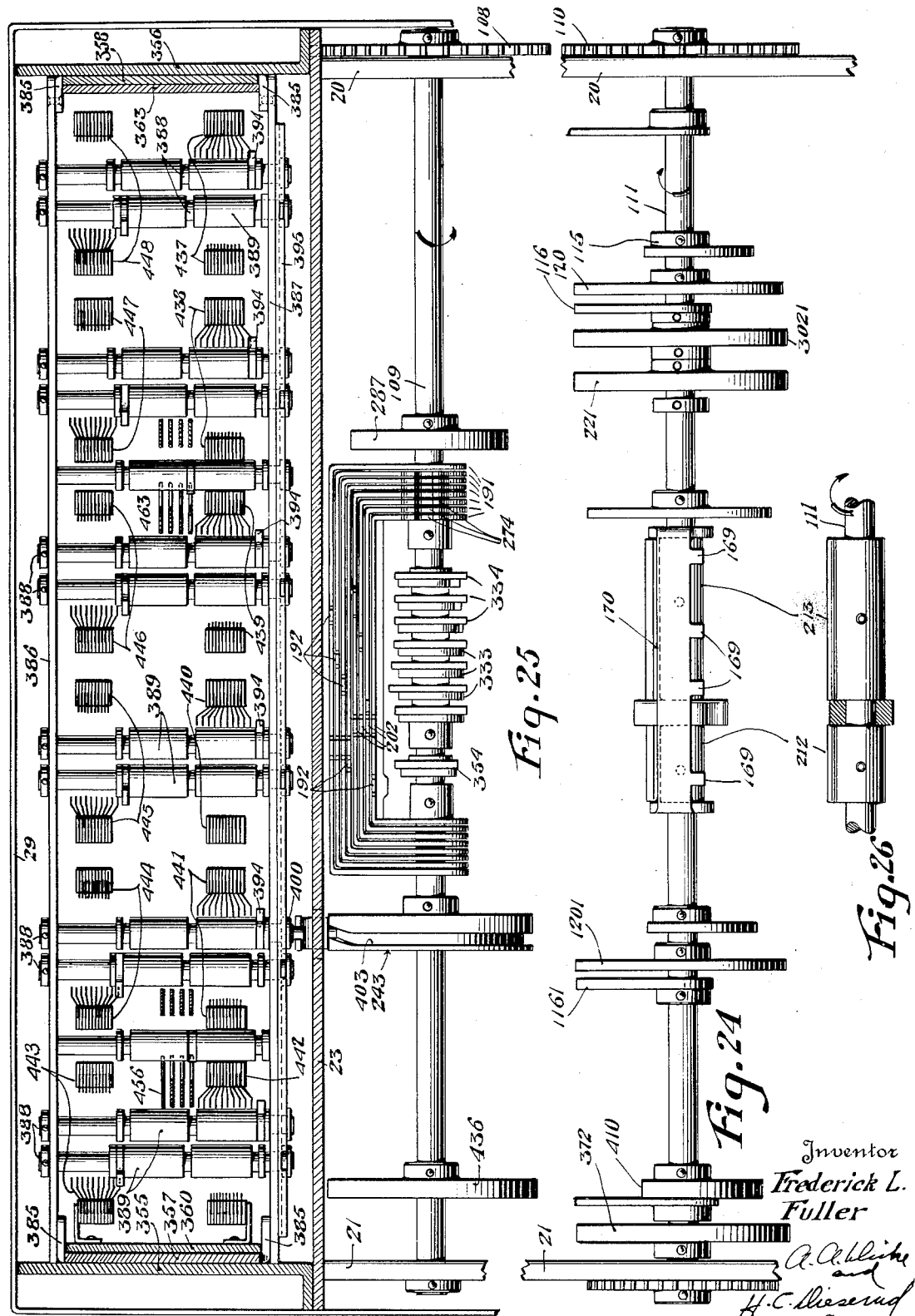

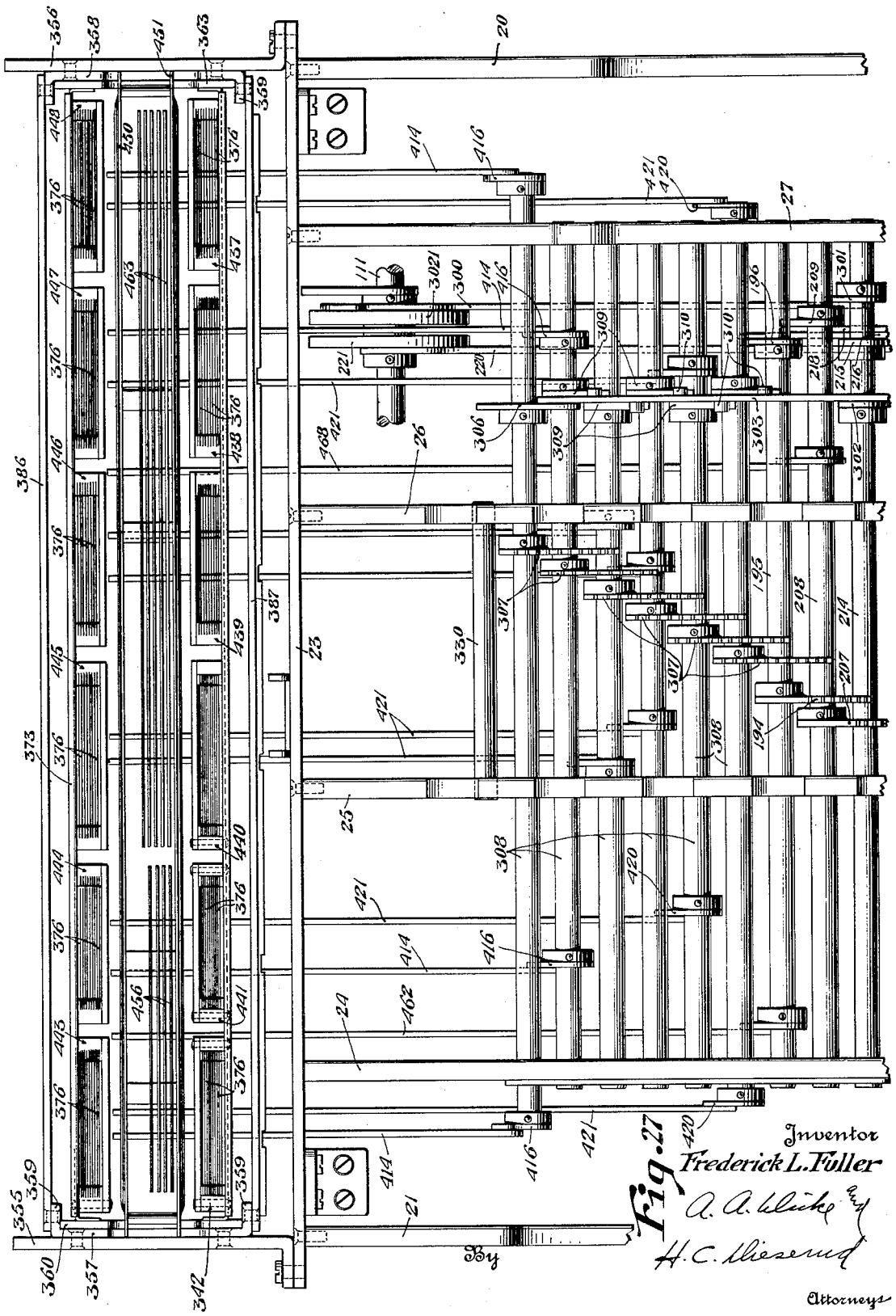

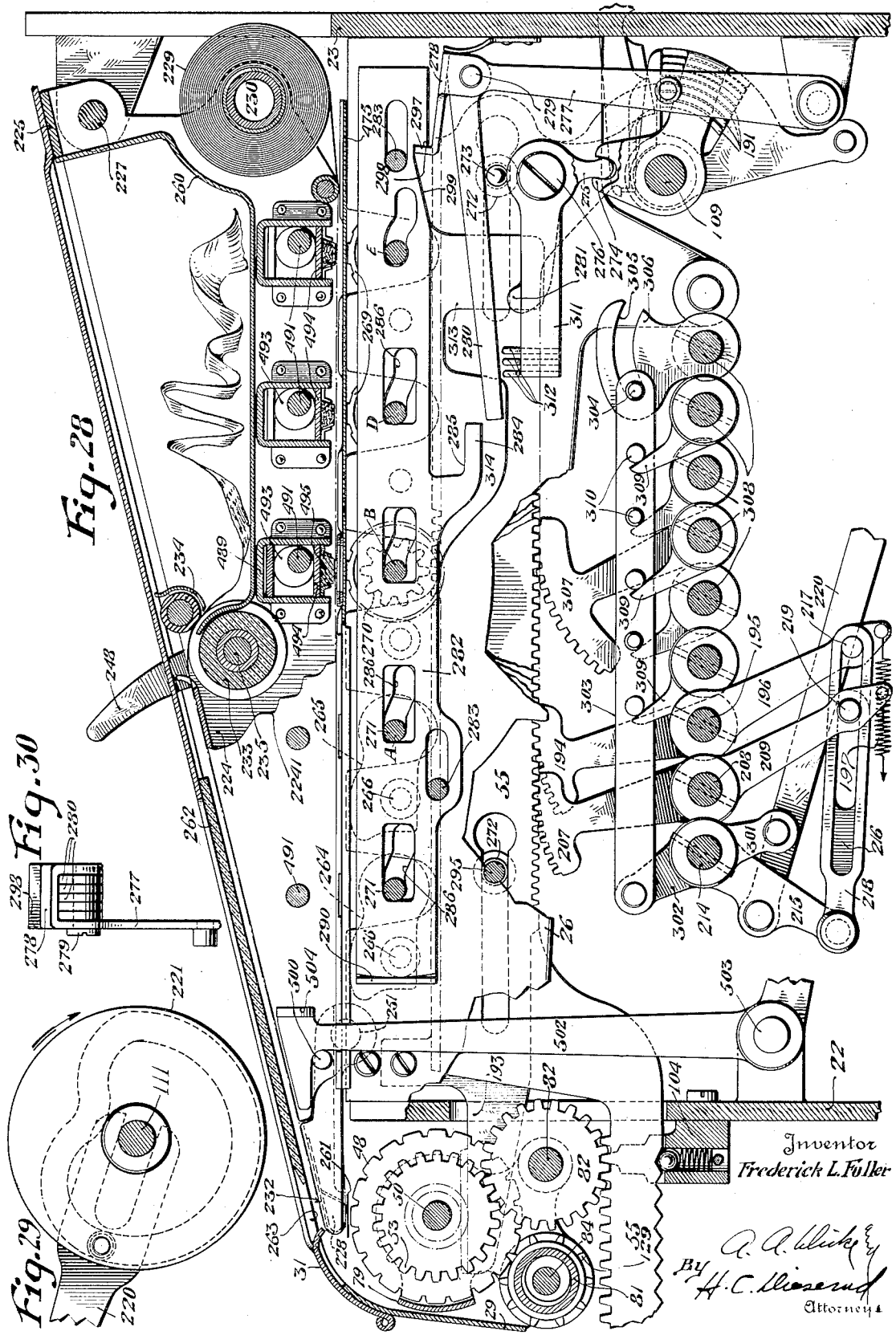

Aug. 1, 1933.  F. L. FULLER  1,920,464
CASH REGISTER
Filed Dec. 3, 1926   22 Sheets-Sheet 14
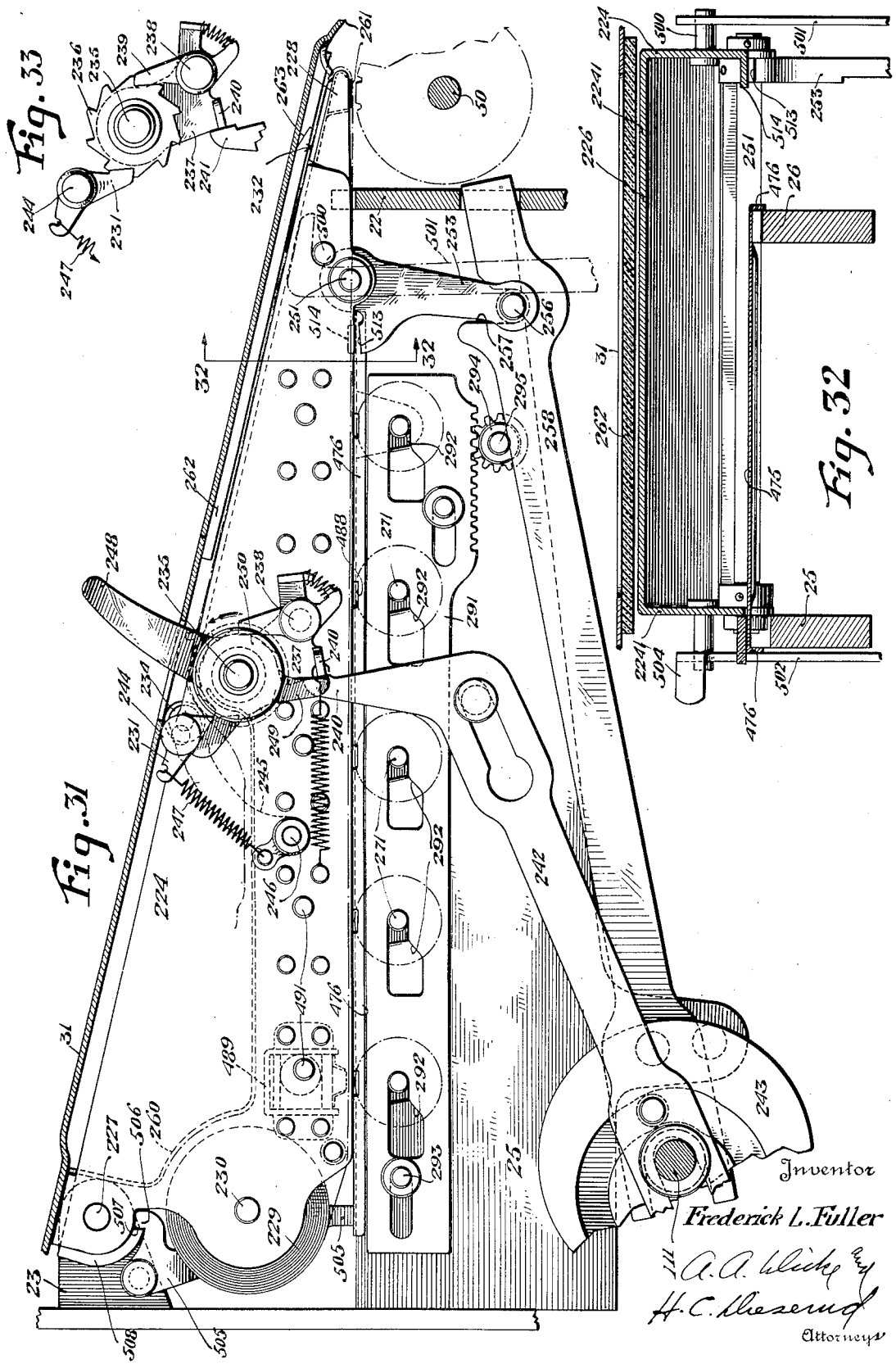
Inventor
Frederick L. Fuller
Attorneys

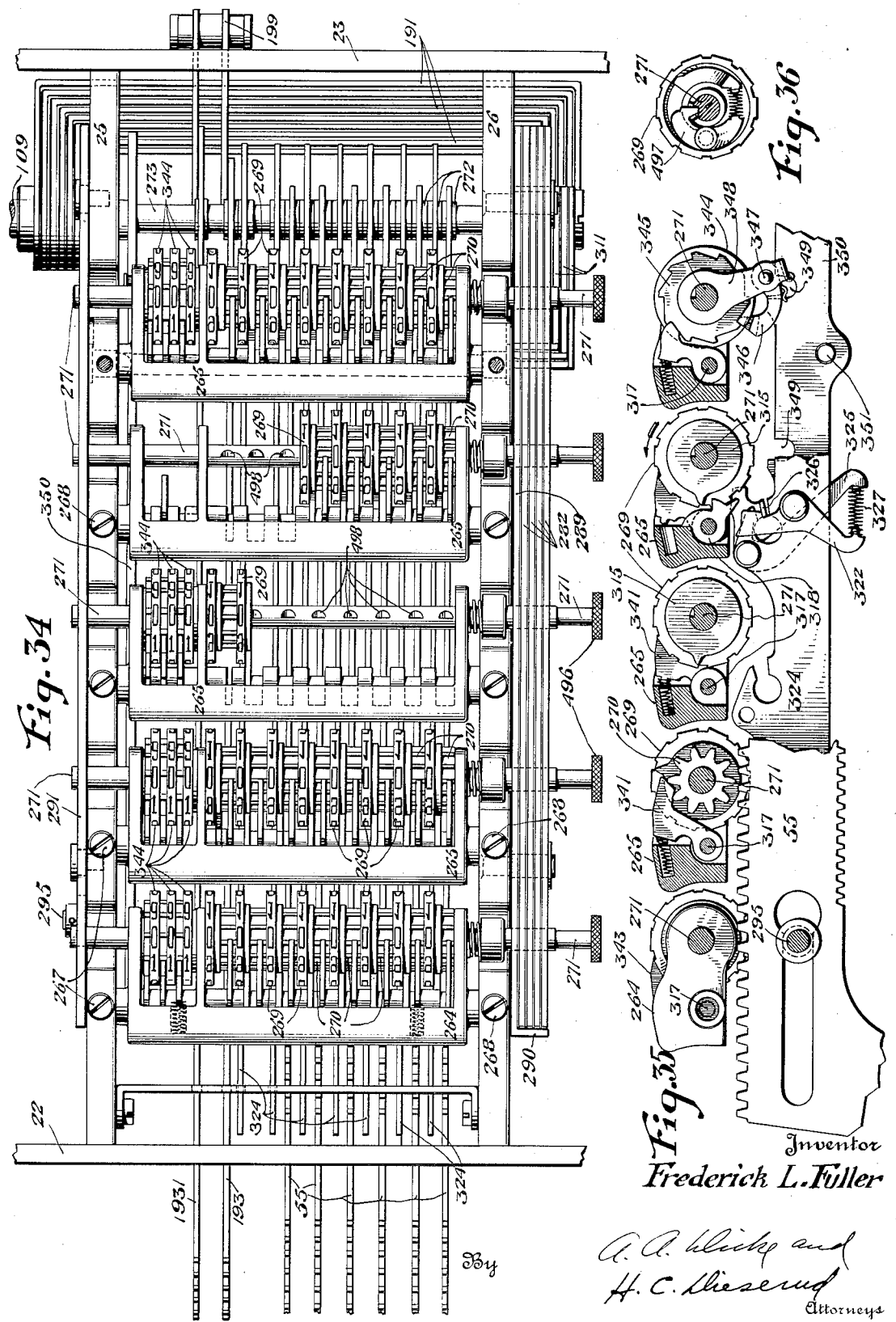

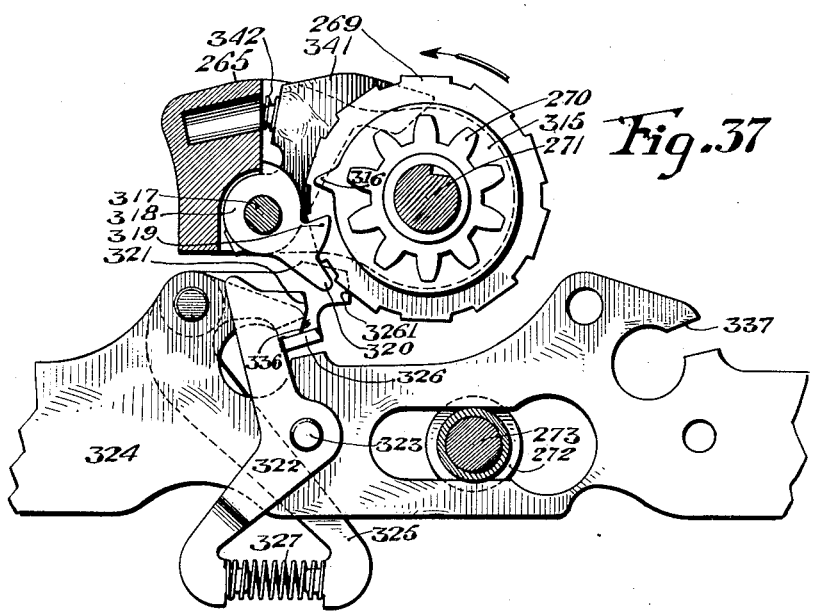
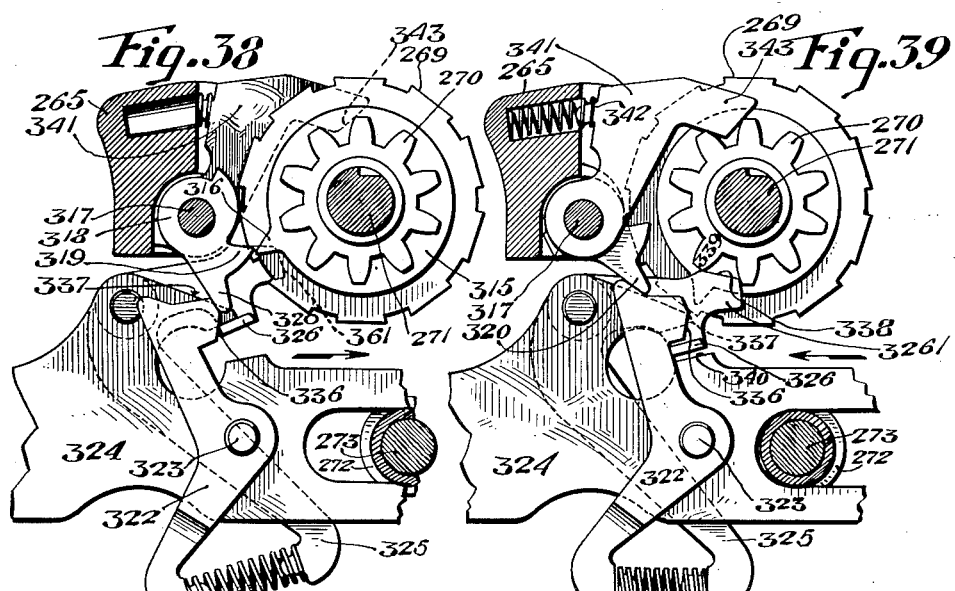
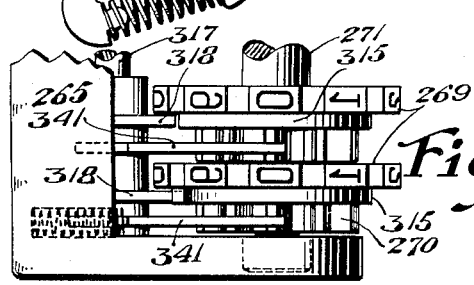

Aug. 1, 1933.  F. L. FULLER  1,920,464
CASH REGISTER
Filed Dec. 3, 1926   22 Sheets-Sheet 17
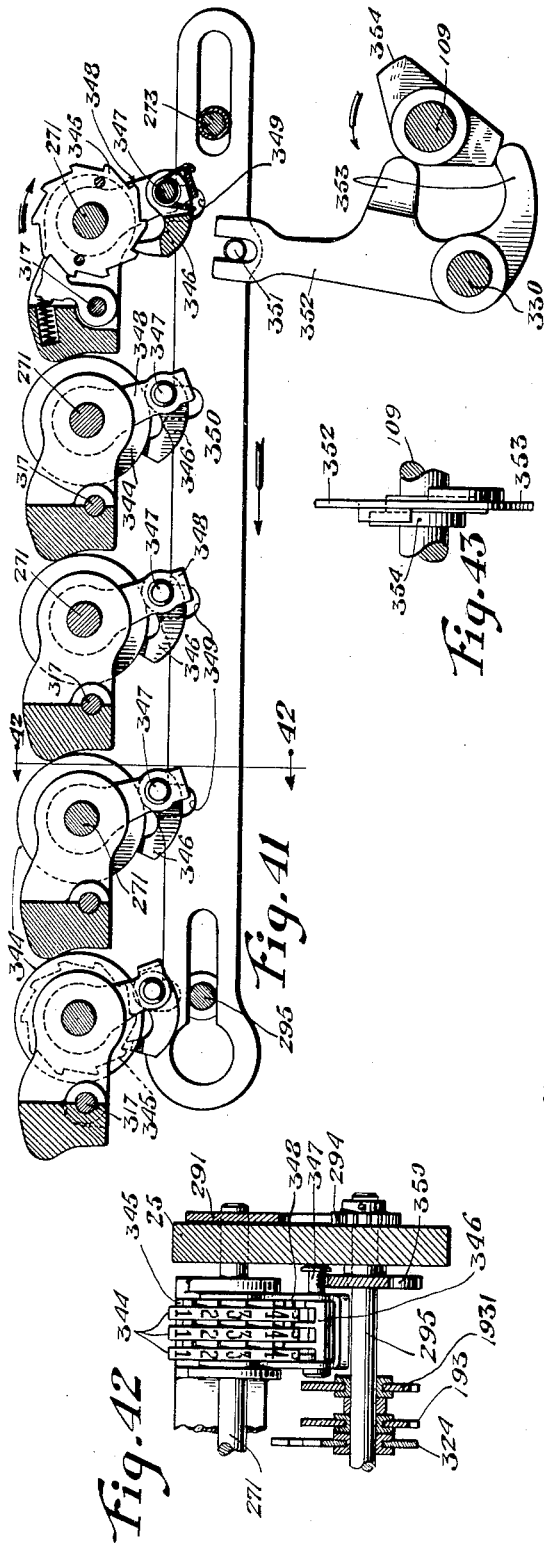
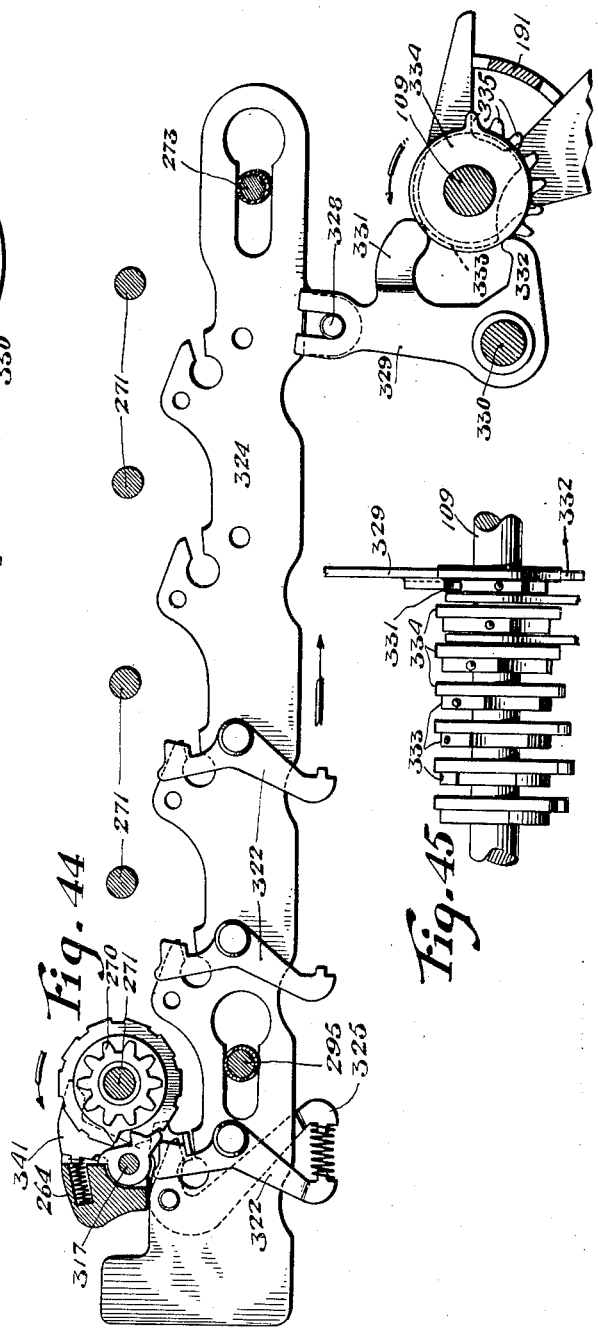
Inventor
Frederick L. Fuller
By
Attorneys

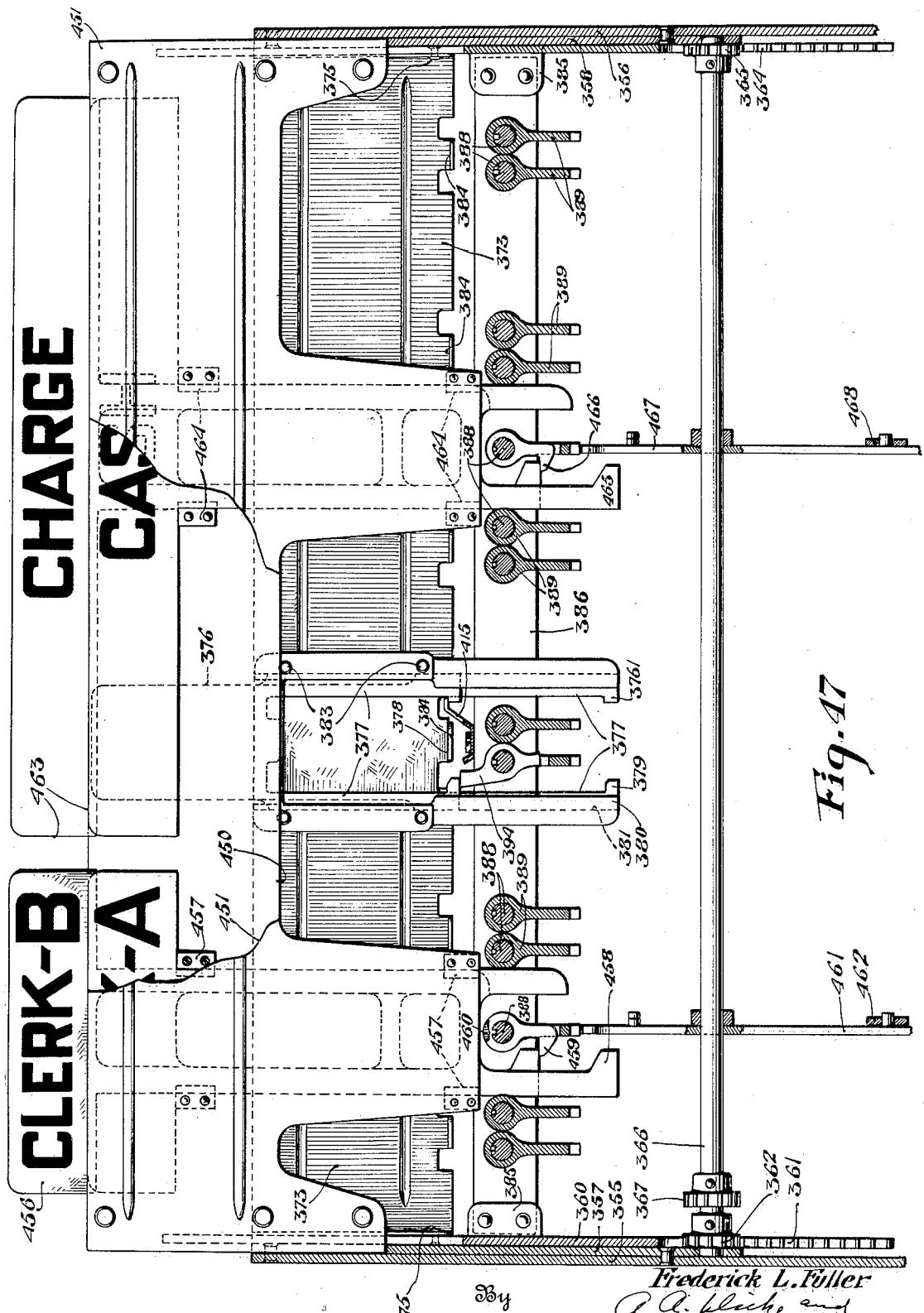

Aug. 1, 1933.  F. L. FULLER  1,920,464
CASH REGISTER
Filed Dec. 3, 1926  22 Sheets-Sheet 20
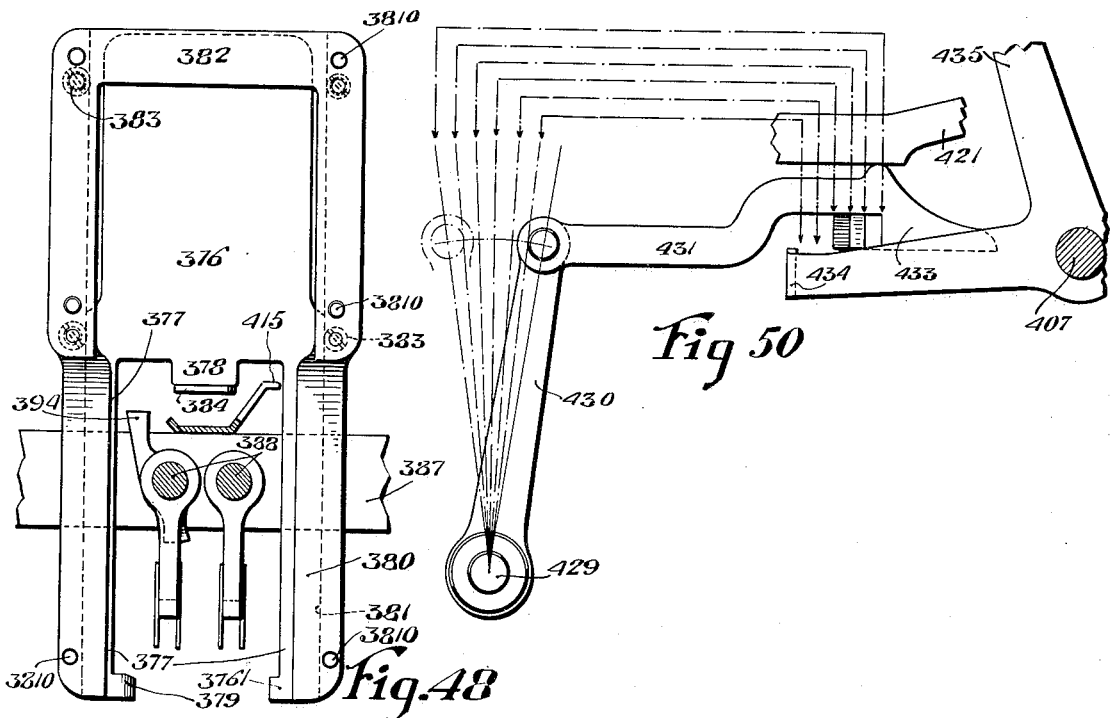
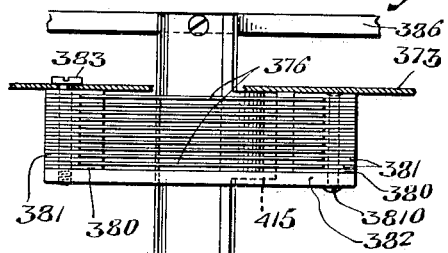
Inventor
Frederick L. Fuller
By A. A. Olicky
H. C. Miesen
Attorneys

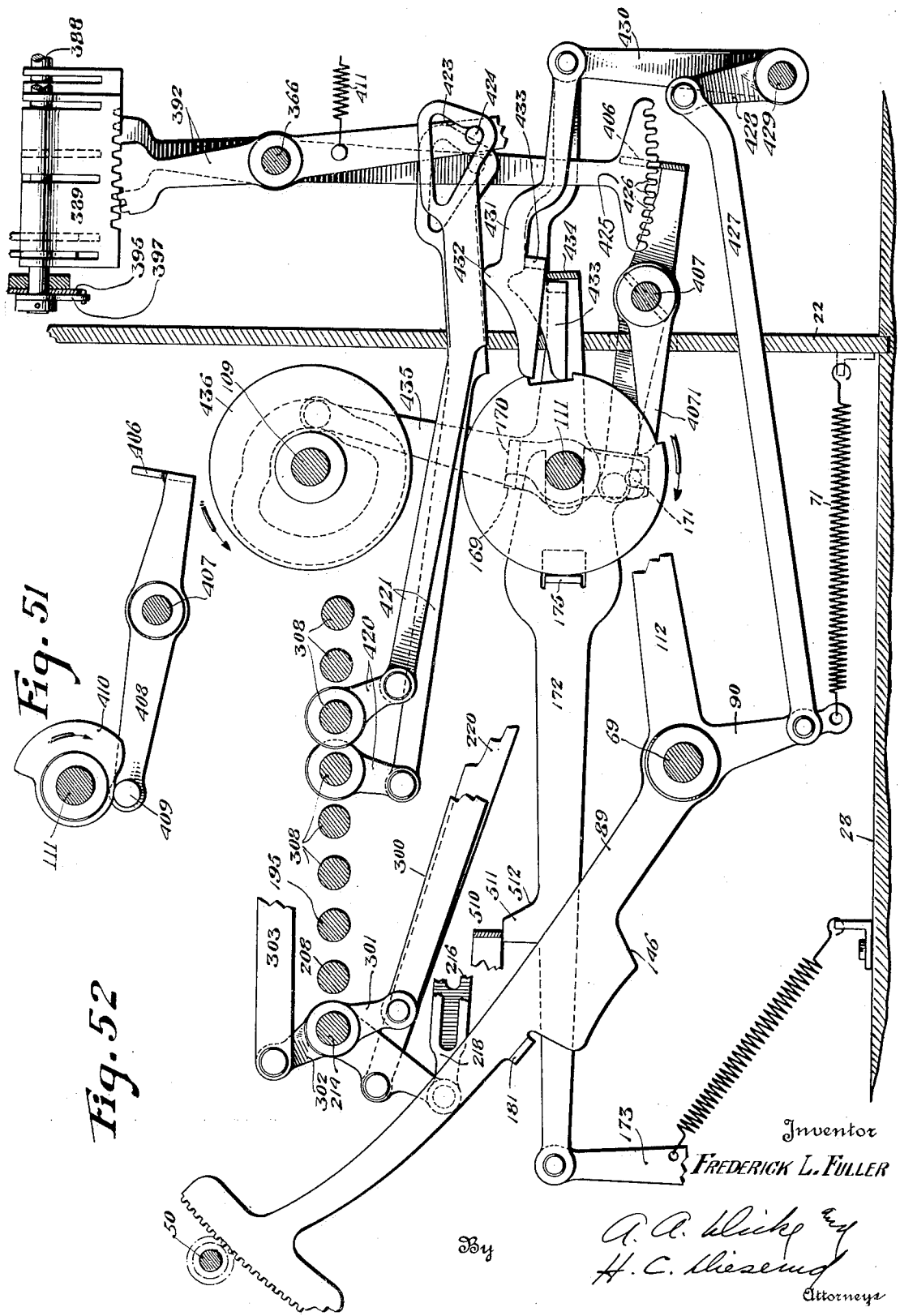

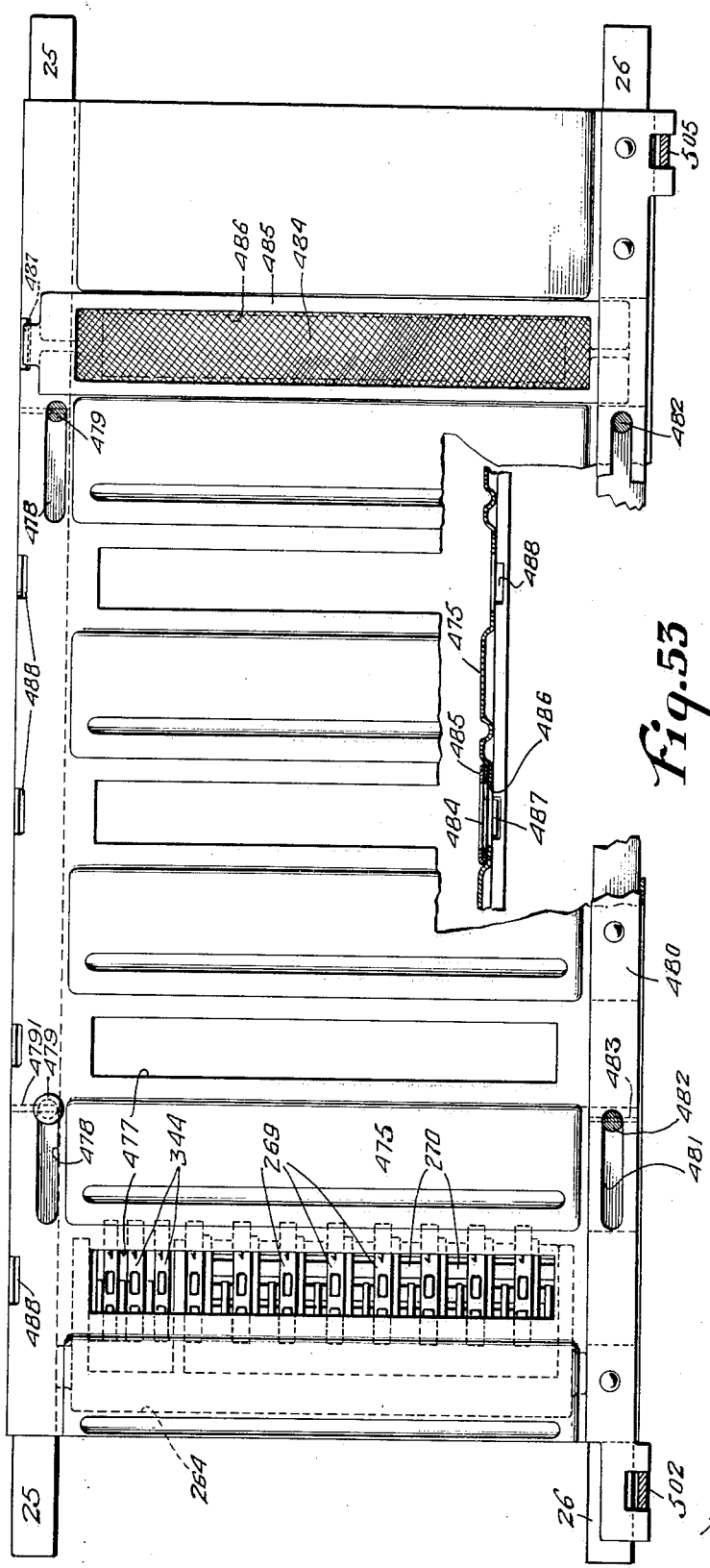
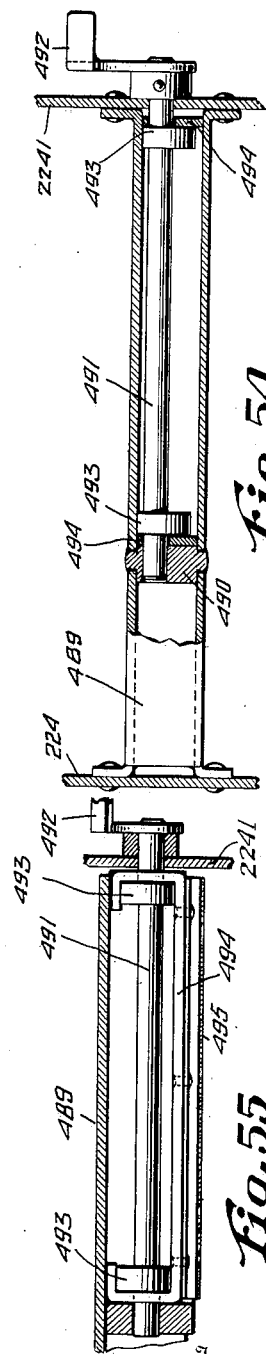

Patented Aug. 1, 1933

1,920,464

UNITED STATES PATENT OFFICE 1,920,464

CASH REGISTER

Frederick L. Fuller, Ilion, N. Y., assignor, by mesne assignments, to The National Cash Register Company, Dayton, Ohio, a Corporation of Maryland Application December 3, 1926. Serial No. 152,384

32 Claims. (Cl. 235—2)

This invention relates generally to accounting machines and has particular reference to improvements in machines of the ten key type.

The main object of the invention is to provide a machine of the kind mentioned which is suitable for recording, registering and indicating the transactions occurring in stores and similar places of business.

In the illustrative form of embodiment disclosed herein, one series of ten keys is employed to control the amount differential mechanism of the machine. It is specifically an object to provide an improved form of key controlling mechanism in which the arrangement and design of the parts is such that the space and number of parts usually required by the keys and associated devices is considerably reduced and furthermore in which the construction is simplified and the operation of the keys to perform the different functions is facilitated.

In the form of the invention as herein disclosed a series of ten keys is adapted to successively control the positioning of a series of type carriers and selector wheels which, after being positioned under control of a depressed key, are stepped laterally to carry one of the type carriers and one of the wheels into engagement with detaining devices, while the remaining carriers and wheels of the series are turned to zero positions. After a number of carriers and wheels have thus been set and shifted into engagement with the detaining devices other mechanism is brought into play to control the differential operation of a totalizer and positioning of indicators in accordance with the setting of the selector wheels.

In connection with the differential mechanism, an object is the provision of a novel form of escapement mechanism for positively moving the selectors, which are moved into positions controlled by the keys, into operative relationship with the racks which control the differential positioning of the accumulating and indicating mechanism.

With respect to the differential mechanism, it is also an object to provide an improved means for limiting the movement of the type carriers and selectors according to the value of the key operated. In the improved mechanism, stops controlled by the amount keys permit the differential positioning of the desired group of type carriers and selector wheels under the influence of a spring. Those type carriers and selector wheels which are not to be set by a particular depression of a key are not restored backwardly to normal positions as in prior constructions, but are given movements of complementary extents to those imparted under control of the keys. The type carriers are provided with a double set of characters, thereby reducing the extent of angular movement necessary for the setting up of a particular type element and therefore the extent of movement of a spring operated driving rack for the group of type carriers when it is desired that the machine be permitted to register numbers of high denominations.

It is a further object of the machine to provide an auxiliary set of indicators which exhibit digits corresponding to the keys operated so that the amount which has been set up may be verified as to its correctness, prior to the operation of the main driving mechanism of the machine.

In connection with the auxiliary set of indicators, by means of which the operator may be able to determine the amount set up in the machine, it is a further object to provide an improved form of correcting or eliminating mechanism whereby the operator, prior to an operation of the machine, may operate certain mechanism to cause all the selector wheels, which have been set by the operation of the keys ready to transfer their movements to the adding racks, to be thrown out of co-operative relationship with the racks and returned to normal position without having any effect upon the totalizer wheels.

In connection with the accumulating mechanism of the machine, it is furthermore an object to generally simplify the adding devices, to provide means for preventing overthrow of the parts, provide means for insuring certainty and accuracy in the operation of the mechanism, and furthermore, provide simple and effective means for returning the item wheels to zero.

Still another object of the machine is to provide a differential mechanism of the same construction as used in the accumulating section, but under control of an auxiliary set of keys whereby other characters may be brought to printing position and then printed in juxtaposition to the printed items. In the illustrative embodiment, this mechanism has been designated as a "Ledger" device, but on account of the flexibility of the arrangement disclosed it may be put to a large number of uses, depending upon the system of business in which the machine is used.

It is furthermore an object of the present invention to provide two separate and independent classes of keys, forming what is known in the art as a "divided key bank." The purpose of these keys is to permit one class of keys to designate the transaction entered in the machine, while the other, in the illustrative machine, has been adapted to designate the several clerks who operate the machine. In connection with the divided key bank, it is an object of the invention to provide an improved form of machine unlocking mechanism, whereby any clerk's key may release the machine for operation. The groups of clerk's and transaction keys control an improved form of differential mechanism, whereby type carriers associated with the two groups may be differentially positioned so that when printing is effected, characters representing the clerk operating the machine and the type of transaction entered, may also be printed in juxtaposition to the printed item.

The machine is also equipped with an improved form of indicating mechanism, the indicators being of the tablet type presenting a plane surface to the eye, easily readable at a distance and so arranged that when the indicators are viewed at an angle one indicator of a group will not obscure the indicator of the adjacent group. A duplex indication is provided whereby the amounts are readable both at the front and the rear of the machine and an improved form of cipher indicating mechanism is provided so that for the groups of indicators higher than the dimes denominations, the ciphers will only be indicated when they form a necessary part of the number to be indicated.

An improved form of clerk's and transaction indicating mechanism is also provided so that the clerk operating the machine together with the type of transaction entered may be indicated both at the front and back of the machine. The supplemental indicating mechanism, for this purpose, is simple in construction requiring few parts which are easy to manufacture and in fact, the design of the whole indicating unit is such that the indicators may be formed of very thin material greatly reducing the weight of the unitary structure as compared with any previous mechanism capable of performing substantially the same functions as the indicating mechanism herein disclosed.

The illustrative embodiment is also provided with a series of clerk's totalizers, one for each clerk's key, and a totalizer which has been designated as the "grand" totalizer, and which is actuated together with one of the clerk's totalizers when the machine is operated by the crank handle or a suitable motor. In connection with the employment of these devices, it is an object of the present invention to provide an improved form of totalizer selecting mechanism wherein the plurality of totalizers are capable of a preliminary adjustment to establish cooperative relationship between any one of said totalizers and a common totalizer operating means. Means have also been provided to disable the selected clerk's and grand totalizers when certain transactions are entered in the machine.

A further object of the machine is to provide a series of item counters carried by the associated totalizer frames and these are provided to designate the number of times that each clerk's totalizer is operated as well as the number of times that the grand totalizer is operated.

It is still a further object of the present invention to provide an improved form of item counter operating mechanism and means for selecting the counter to be operated.

An incidental object of the invention is the provision of an improved form of totalizer with an improved transfer mechanism.

In order that the machine may be adapted to print items, ledger numbers and special characters upon a record strip contained within the machine, it is a further object to provide an improved form of printing mechanism simple in construction, requiring very few parts, the design being such that assembly will be greatly facilitated and the cost of manufacture will be greatly reduced.

The printing mechanism is provided with total printing means whereby the amount standing upon the various totalizers and item counters may be directly printed upon the record strip contained within the machine. The inking devices for the total printing mechanism comprise a plurality of individual, relatively stationary inking strips carried by a plate, the inking strips being normally positioned over the totalizers. Since it is necessary at times to elevate the record strip printing mechanism in order to replenish the paper supply, or to substitute a new inking ribbon for an old or worn out one, and since this would tend to give unauthorized persons access to the total printing elements, permitting them to change at will the amount standing upon the totalizer elements and the item counters an improved mechanism is incorporated in the printing section of the machine whereby, when the printer unit is elevated, a portion of the ribbon supporting plate will be advanced so that an integral portion thereof will directly overlie the total printing elements, thus effectively safeguarding them against fraudulent manipulation.

In order that the machine which is adapted to carry out the foregoing objects shall be properly safe-guarded and only authorized persons may have access to various mechanisms so that mis-operations, either accidental or intentional may be minimized or entirely eliminated, it is an object of the present invention to provide a system of locks and interlocks of simple but effective construction. When the machine is released for operation the printing unit is locked against upward movement, thereby preventing access to the totalizers and item counters located beneath and conversely, when the printer unit is displaced from its normal position the machine will be locked against operation. An interlocking mechanism is also provided between the main operating crank and the error key so as to prevent a simultaneous operation of both which would probably result in the disarrangement of some of the mechanisms in the machine.

Many other objects and advantages of the present invention will appear from the detailed description of a preferred form of embodiment which will hereinafter be given. By the many improvements incorporated in the present machine the novel design results in a cash register capable of registering amounts of high denominations and one which is considerably reduced in space and weight, requires fewer parts, and employs parts which are easy to manufacture and assemble.

With these and incidental objects in view the invention consists in certain novel features of construction and combination of parts, the essential elements of which are set forth in the appended claims. A preferred form of embodiment of the invention is hereinafter described with reference to the drawings which accompany and form part of the specification.

Of said drawings:

Fig. 1 is a perspective view of the machine to which the present invention is applied showing the arrangement of the controlling keys. It also shows the operating handle for the machine, the error key, a lever for manually spacing the record strip and the windows through which the amounts which are to be entered in the machine may be viewed. This view also shows the hinged cover for concealing the mechanisms located beneath it and the manner in which the indicator mechanism indicates the amount previously entered in the machine and other information pertaining to that transaction.

Fig. 4 is a top plan view of a section of the machine showing details of construction of the differential mechanism and showing clearly the type carriers which are adjusted differentially to print the desired amounts upon the record strip.

Fig. 5 is a view in side elevation showing a portion of the differential mechanism and the connection to the amount keys for controlling it. This view also illustrates the interlocking mechanism between the "No sale" key and any of the amount keys and also shows a device for locking all the amount keys when an operation of the machine has commenced.

Figure 1:
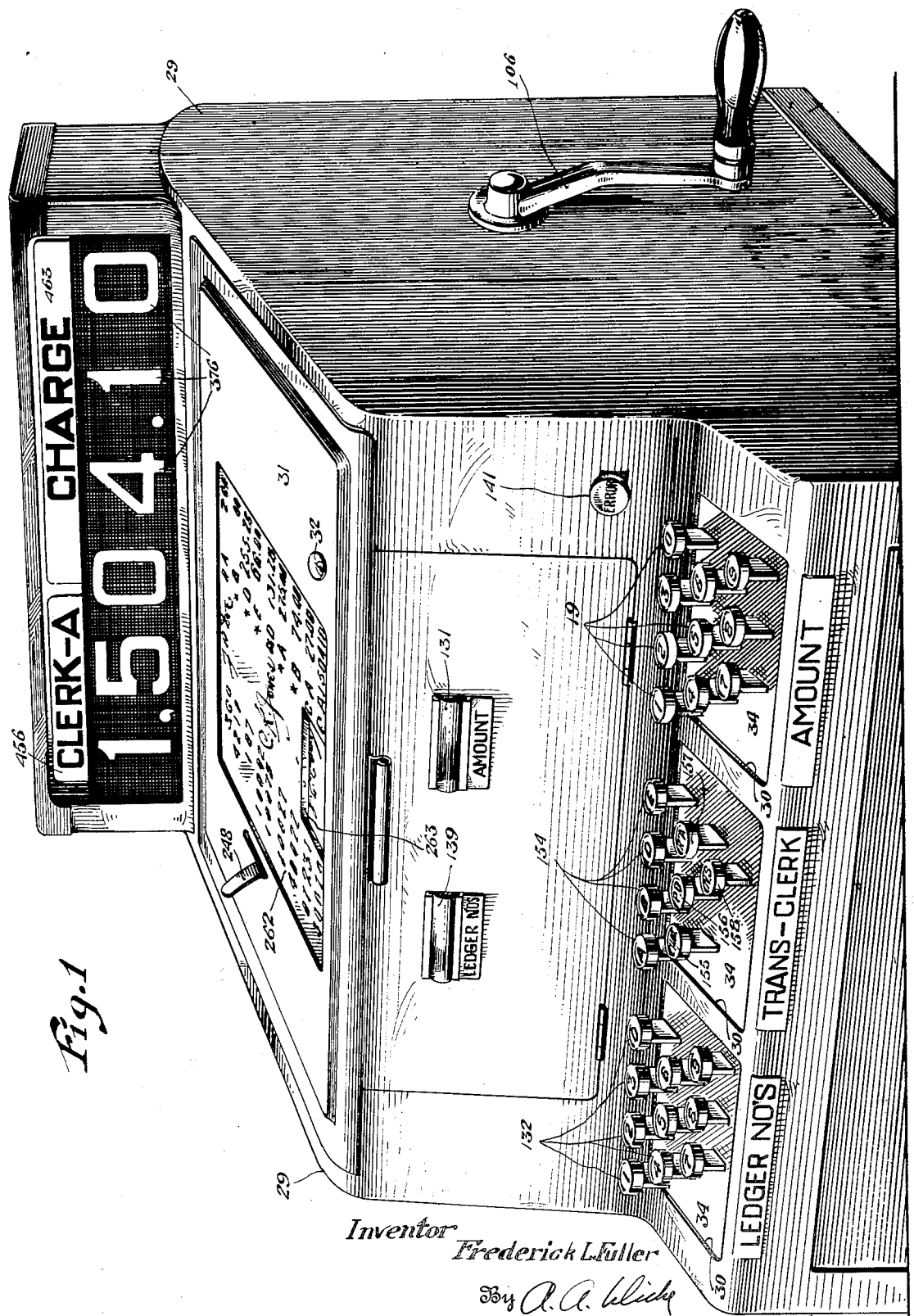

Fig. 6 is a section of the machine taken at substantially the right hand end. This view shows particularly the error key and the associated mechanism whereby, in case an error should be made, the differentially positioned members may be restored to their normal positions. Besides showing details of construction of the interlocking mechanism between the printer frame and the operating shaft, it also shows a portion of the mechanism for selecting tablet indicators and exposing ciphers when necessary.

Fig. 7 is a detail view from the top of a portion of the differential mechanism and shows the spirally arranged fingers which form part of the differential mechanism.

Fig. 8 is a detail in side elevation of the parts shown in Fig. 7 showing the spirally arranged fingers in connection with a controlling slide, for the purpose of illustrating how the fingers may be differentially stopped and then given a movement of a complementary extent.

Fig. 8A is a cross sectional view taken on the line 8A—8A of Fig. 8.

Fig. 9 is a view in side elevation showing the geared connection between an item type carrier, a reading wheel and a selector, the latter being utilized for the purpose of permitting a differential movement of a transmitting rack also illustrated in this view.

Fig. 10 is a view in side elevation showing the various controlling slides for controlling the differential positioning of the selectors and a part of the escapement mechanism for permitting a step by step movement to be given to the type carriers after they are differentially positioned.

Fig. 11 is a sectional view showing the restoring sleeve which is provided with slots for receiving the pawls carried by the differentially positioned type carriers.

Fig. 12 is a cross sectional view showing an assembly of the type carriers and associated reading wheels so arranged that they are movable as a unit from one supporting sleeve to the associated receiving and restoring sleeve.

Fig. 13 is a sectional detail view of one of the type carriers provided for the ledger device showing its connection to the reading wheels and the means for aligning it to its proper position.

Fig. 14 is a detail of the construction utilized for preventing improper positioning of the resetting shaft and also for limiting its movement.

Fig. 15 is a view in side elevation showing the driving segments associated with the amount key differential mechanism and the various cams for returning and operating them. This view also shows a portion of the grand totalizer engaging mechanism.

Fig. 16 is a detached view, in side elevation, illustrating the differential mechanism controlled by the bank of clerk's and transaction keys for permitting a differential adjustment of their associated type carriers.

Fig. 17 is a top plan view of a portion of the mechanism associated with the clerk's and transaction keys and also illustrates the driving segments related to the amount and ledger differentials. The view illustrates a number of parts related to the indicating mechanism, particularly the cam for giving a reciprocating movement to the indicator carriage and for controlling the indication of a cipher when necessary.

Fig. 18 is an end view of part of the machine in side elevation, showing the tablet selecting mechanism for the amount indicators and showing quite clearly the operating handle and its gearing to the main operating shafts.

Fig. 19 is a perspective view showing the form of each amount tablet indicator and the means for retaining all of them in their normal positions.

Fig. 20 is a view in perspective showing one of the selecting fingers and the construction utlized so that it may not only be adjusted differentially but rocked as well, so as to be engaged or disengaged from the feet of the tablet indicators.

Fig. 21 is a view in side elevation showing the machine unlocking mechanism as well as the details of the differential mechanism for adjusting the clerk's and transaction type carriers. This figure also illustrates the interlocking mechanism between the printer frame and the machine unlocking device and a part of the member adapted to lock the "No sale" key in case an amount key should have been depressed.

Fig. 21A is a detail of the cam for restoring the clerks and transaction type carriers to normal.

Figs. 22 and 23 illustrate the details of the single key mechanism whereby it will be impossible to depress more than one clerk's key or transaction key at a time, while the depression of one clerk's and one transaction key is permitted if desired.

Fig. 24 is a top plan view of one of the operating shafts showing the various operating cams assembled thereon.

Fig. 25 is a top plan view, partly in section, of the rear portion of the machine showing the assembly of the various groups of tablet indicators used for the purpose of providing a front and back indication. This view also illustrates the nested bails operable by the clerks' and transaction keys for effecting a differential adjustment of the associated type carriers and selection of the corresponding tablet indicators.

Fig. 26 is a detail of the operating shaft carrying the cams utilized for the purpose of restoring the clerks' and transaction keys to their normal positions at the end of the operation of the machine.

Fig. 27 is a top plan view of the machine showing the various groups of indicators and also shows, besides the arrangement of the controlling shafts, the devices used for the purpose of permitting their differential adjustment, and the means by which they are restored to normal positions at the end of the operation of the machine.

Fig. 28 is a view in side elevation taken at one end of the machine illustrating certain details of the item and total printing mechanism, the totalizer selecting mechanism, and the devices used for permitting a differential adjustment of the transmitting racks and for restoring them to their normal positions at the end of the operation of the machine.

Fig. 29 is a detail of the cam for restoring the transmitting racks back to their normal positions after they have been differentially positioned.

Fig. 30 is a detail showing the assembly of the totalizer selecting fingers carried by the member utilized to rock them during each operation of the machine so that the desired selecting finger will operate its associated totalizer controlling plate.

Fig. 31 is a view in side elevation taken at the left side of the machine showing the paper feeding mechanism, the manually operated spacing lever, the platen operating device, and the locking plate utilized for the purpose of normally retaining the totalizers in their normal positions.

Fig. 32 is a sectional view through the printing mechanism taken on the line 32—32 (Fig. 31) showing the printer supporting side plates, the means for locking the printer against upward movement and the method of supporting the ribbon supporting plate.

Fig. 33 is a detail view of the paper feeding mechanism.

Fig. 34 is a top plan view showing the arrangement of the various totalizers and item counters, the details of construction of the totalizer selecting mechanism and the knobs used for the purpose of resetting the totalizer elements.

Fig. 35 is a sectional view taken at different distances from a fixed plane and shows the normal relationship between the transmitting racks and the totalizer pinions, a part of the transfer mechanism and the means for operating one of the item counters.

Fig. 36 is a sectional view showing the relation between a totalizer pick-up pawl, carried by one of the wheels, and the totalizer resetting shaft.

Figs. 37, 38 and 39 illustrate in detail the transfer mechanism and show the different positions that the various parts assume during a transferring operation.

Fig. 40 is a top plan view of a part of a totalizer showing the relationship between the totalizer element, operating pinion and associated mechanisms.

Fig. 41 is a view in side elevation showing a series of consecutive numbering counters and the means for operating a selected one.

Fig. 42 is a sectional view taken along the line 42—42 of Fig. 41.

Fig. 43 is a detail view showing the complementary cams for actuating the consecutive number operating slide.

Fig. 44 is a detail of one of the transfer slides and the means for operating it during an operation of the machine.

Fig. 45 is a top plan view of a portion of the operating shaft showing the complementary cams carried thereby for reciprocating the transfer slides seriatim.

Figure 46:
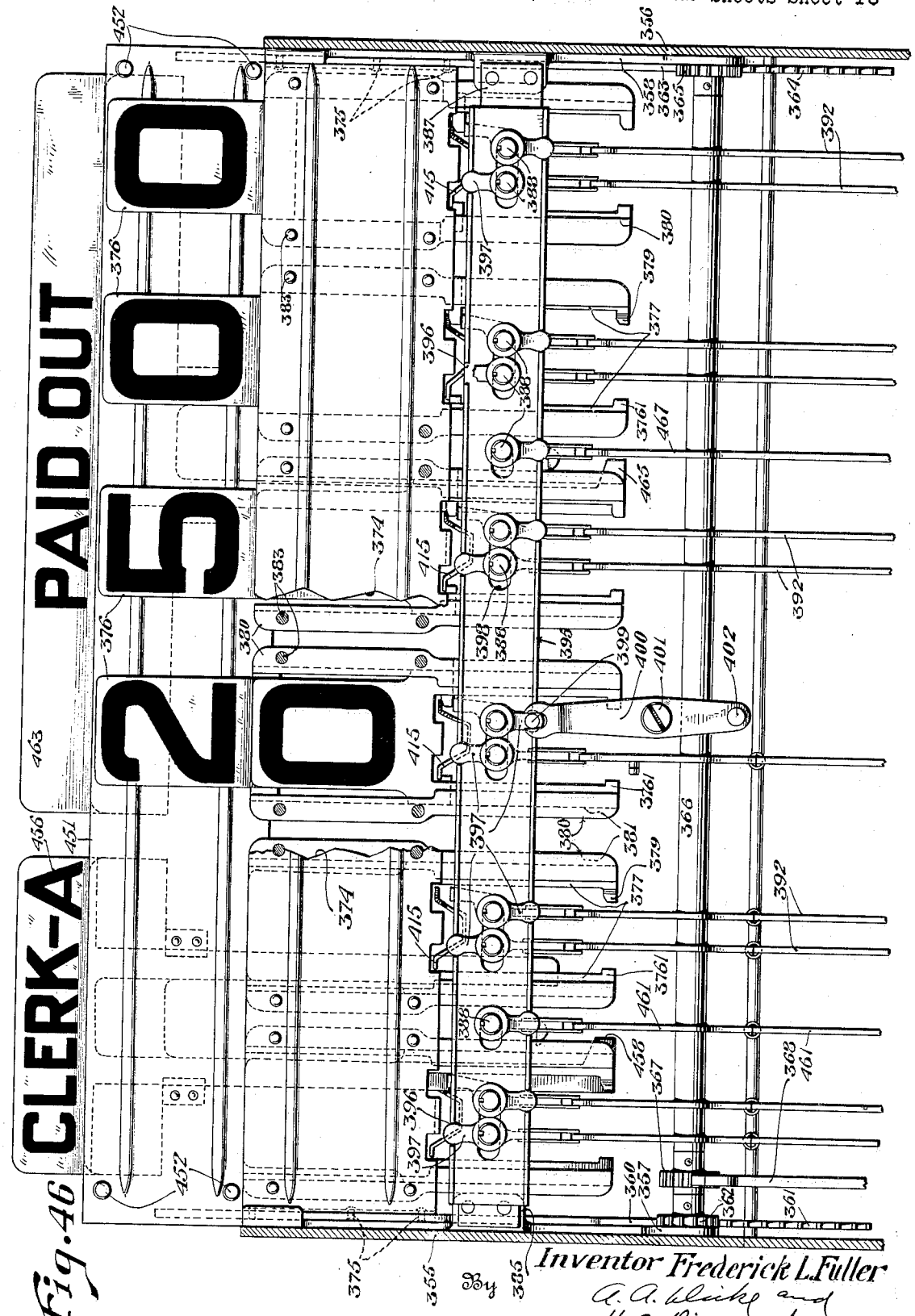

Fig. 46 is a front elevation of the indicating mechanism showing the arrangement and relation between the amount tablets and clerk's indicators, the segment utilized for the purpose of differentially selecting them and the mechanism employed for the purpose of rocking the selecting fingers in and out of co-operative relationship with the feet of the indicator tablets.

Fig. 47 is a sectional view, in side elevation, taken through the indicating mechanism showing the form of the clerk's indicating tablets and their supporting frame as well as the supporting members for the amount tablet indicators. This view also shows the members for raising the indicator carriage.

Fig. 48 is a detail view in side elevation showing the method of mounting and supporting a group of indicators.

Fig. 49 is a top plan view showing the method employed for spacing the indicators and the stop device for preventing elevated indicators from rising with the indicator carriage.

Fig. 50 is a detail view showing the zero levers for permitting the exhibition of ciphers in the denominational orders higher than the dimes when they form a necessary part of the number to be exhibited.

Fig. 51 is a detail view of the cam utilized to operate the aligning bar to hold the differentially adjusted indicator segments.

Fig. 52 is a view in side elevation of the mechanism utilized to exhibit ciphers in certain denominational orders when they form a necessary part of the number to be exhibited. The mechanism is shown in a part operated position, showing the action of the mechanism when a certain amount is entered in the machine.

Fig. 53 is a top plan view of the ribbon supporting plate. Part of it is broken away and shown in side elevation to show how the ribbon supporting frames fit in depressions in the plate. This view also illustrates how the ribbon supporting plate is guided during the time it is being advanced so as to conceal the totalizers to prevent fraudulent manipulation of the totalizer elements.

Fig. 54 is a detail view showing one of the levers and eccentrics operated thereby for operating a platen to print a total upon the record strip.

Fig. 55 is another detail view showing the construction utilized for the purpose of effecting a total printing operation.

For convenience of description the principal elements of the machine will first be enumerated and their general purpose, arrangement and co-operation will be briefly explained in order to indicate the general operation of the machine as a whole, after which, the preferred construction of these parts will be described more in detail, together with the function, construction and operation of certain secondary mechanisms associated therewith.

Briefly stated, in general terms, the invention relates to a ten key accounting machine in which ten amount keys are provided, each representing one of the digits "0" to "9" inclusive, and in which is also provided an auxiliary set of keys, designated as "ledger keys". In addition, a separate bank of keys is provided for representing the classes of transactions, such as, "Charge", "Paid out", "Received on acct," and "No sale". Four keys are also provided to represent clerks, all of which possess the function of releasing the machine for operation by the crank handle.

The amount keys are so constructed as to permit the differential positioning of a group of item type carriers, the extent of the movement of the group being commensurate with the value of the key operated. Further movement of the depressed key will result in the restoration of all of the type carriers with the exception of one, which, while it stands in its differentially moved position, is shifted into co-operation with an actuator. Successive depression of the keys related to the ledger device will also set up an auxiliary set of type wheels. The final operation of the machine, as far as the controlling keys are concerned, is to depress one of the clerk's keys to release the machine for operation but in the event that the transaction is other than a "cash" transaction, it is necessary to depress the proper transaction key. Interlocking devices are provided to prevent the operation of the "No sale" key if an amount key has previously been depressed, and conversely, an operation of any of the amount keys if the "No sale" key has first been operated.

The numbers which are set up in the amount or ledger differential mechanisms may be read by means of auxiliary indicators or reading wheels, and if it has been discovered that an error has been made in setting up the amount, the differentially positioned members may be restored to their normal positions by the simple manipulation of an error key, which may be operated either before or after a clerk's key has been operated. If the error should not be discerned until after a clerk's or release key has been depressed, it will be necessary to operate the crank handle which will merely result in the indication of the clerk operating the machine and the class of transaction.

The extent of movement of the item wheels is controlled by the amount keys and through an escapement and feed mechanism they are successively shifted laterally, step by step, into operative relation with the actuators, the denominational order being governed by the number of successive depressions of the keys prior to the operation of the handle. There are as many actuators as there are item wheels so that upon an operation of the main operating mechanism the item wheels are rotated to zero position to impart their differential movement to the actuators which insert the amounts into a grand totalizer and one of a plurality of totalizers selected by the clerk's keys. After the item wheels are rotated to zero position the actuators are returned to normal without disturbing the amount inserted in the totalizers and the item wheels which are now disengaged from the actuators are shifted laterally back to their normal positions by means of a worm screw.

Even though the amount keys control the amounts added on the different totalizers, if any of the special keys representing a "Paid out", "Charge" or "No sale" transaction should be operated, the totalizer engaging mechanism is automatically disabled so that the amount set up on the item type carriers will not be registered on the totalizer.

The item type carriers controlled by the amount keys and the type carriers controlled by the ledger keys, are adapted to print upon a record strip. The clerk's and transaction keys also have associated therewith type carriers which may be brought to such a position that a character will also be printed upon the record strip designating the clerk operating the machine and the class of transaction. After an entry has been printed, the record strip is fed so as to bring the entry into view at the top of the machine. The glass through which the printed characters are visible is provided with a cutaway portion permitting entries in the form of autographic notations to be made upon the record strip in connection with each printed item. The glass is of such dimension that the last ten transactions entered in the machine may be read without withdrawing any portion of the printed record strip from the storage roll.

While a special set of reading wheels is provided to indicate the amount which is to be entered in the machine a separate set of indicators is provided to indicate the last amount which has been entered in the machine, together with legends and characters designating the class of transaction and the clerk who operated the machine. The special indicator, printed records and the usual indicating mechanism afford complete information relative to the transactions about to be entered and those which have already been entered.

The indicating mechanism is so arranged that the amounts may be read in the correct denominational order from the front of the machine as well as the back, and the clerk's and transaction indicators are similarly arranged. The characters placed upon all the tablet indicators are of such dimensions that they are readable at some distance from the machine.

Each time that an amount is entered in the grand totalizer and one of the clerk's totalizers, a unit is entered in the item counters carried by the associated totalizers so that the number of cash sales entered by each clerk may readily be known as well as the total number of cash sales transacted by all the clerks.

At the termination of a day's business the amounts standing on the totalizers and special counters are printed by means of the manipulation of special total printing levers located beneath the hinged cover. After printing upon the record strip which contains the printed items the totals standing upon the totalizers and special counters, the printed strip containing a record of both the items and totals is simply drawn out of a receptacle and detached from the rest of the roll.

Upon the completion of the total printing operation resetting knobs are rotated so that all the elements of the totalizers will be restored to zero but the reading on the consecutive numbering counters will not be disturbed.

In order to conceal the various manipulative devices against unauthorized operation a hinged cover is provided and, if desired, a lock of any pattern may be provided so as to securely lock the cover.

The general organization and operation of the machine as a whole having been thus outlined the preferred construction of the various parts above referred to will now be described in detail.

Framework

Figure 2:
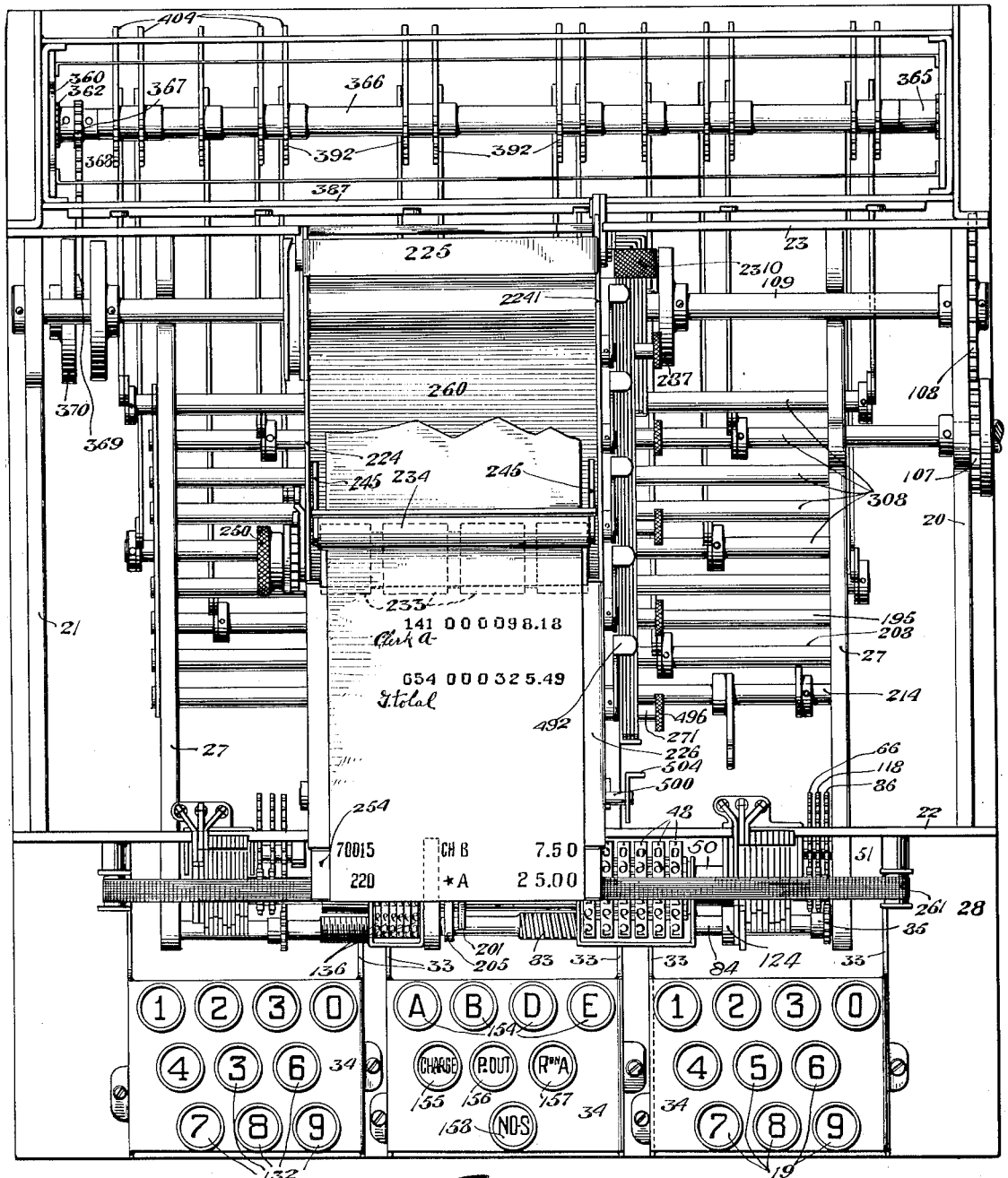
Fig. 2 is a top plan view of the machine, the cabinet having been removed. This view shows the three banks of controlling keys, a portion of the printing mechanism and the controlling shafts and their connections to the segments for differentially selecting the indicators.

Fig. 2 discloses the relative arrangement of some of the members comprising the framework of the machine in which it will be noted that there are provided two main side frames 20 and 21 which extend between a front frame 22 and a rear frame 23. Also extending between the front and the rear frames are four parallel intermediate frames 24, 25, 26 and 27 (Fig. 27) utilized to support certain of the various mechanisms and to give strength and rigidity to the framework. All of the frame members just referred to rest upon and are attached to a base 28 (Fig. 6). The machine is also provided with other frame members and supporting brackets and these will be referred to hereinafter as the description of the machine progresses.

As best shown in Fig. 1, the mechanism is enclosed by a cabinet 29 which may be made of any desired material. The cabinet 29 is apertured at 30 to receive the keys and is furthermore apertured at its upper end, both front and rear, so as to permit viewing of the raised indicators. The printing, resetting, and other associated mechanisms are concealed by means of a hinged cover 31, the cover carrying a glass 262 to permit the reading of a number of amounts printed upon the record strip, said glass also being cut away at 263 so as to permit other entries on the record strip in the form of autographic notations. In order to prevent unauthorized persons from having access to the mechanisms located beneath the cover 31 there may be provided a lock, such as indicated at 32, which may be of any desired form or pattern.

Keys

As illustrated in Fig. 1, the various depressible keys comprise in the main, three banks, the right hand bank being comprised of ten keys for controlling the amounts entered in the machine. The next bank, to the left of the amount keys or the intermediate bank, comprises a series of eight keys which may be described broadly as a "divided key bank" and of these eight keys, four are designated as clerk's keys for identifying the clerk operating the machine, while the remaining keys are adapted to designate the particular transaction registered and recorded. The series of ten keys to the extreme left are designated "ledger keys" and are to provide means whereby certain designations or numbers may be printed in connection with the amount of the transaction, these characters designating cost or stock numbers or any other significant characteristic, depending upon the system in operation.

Figure 3:
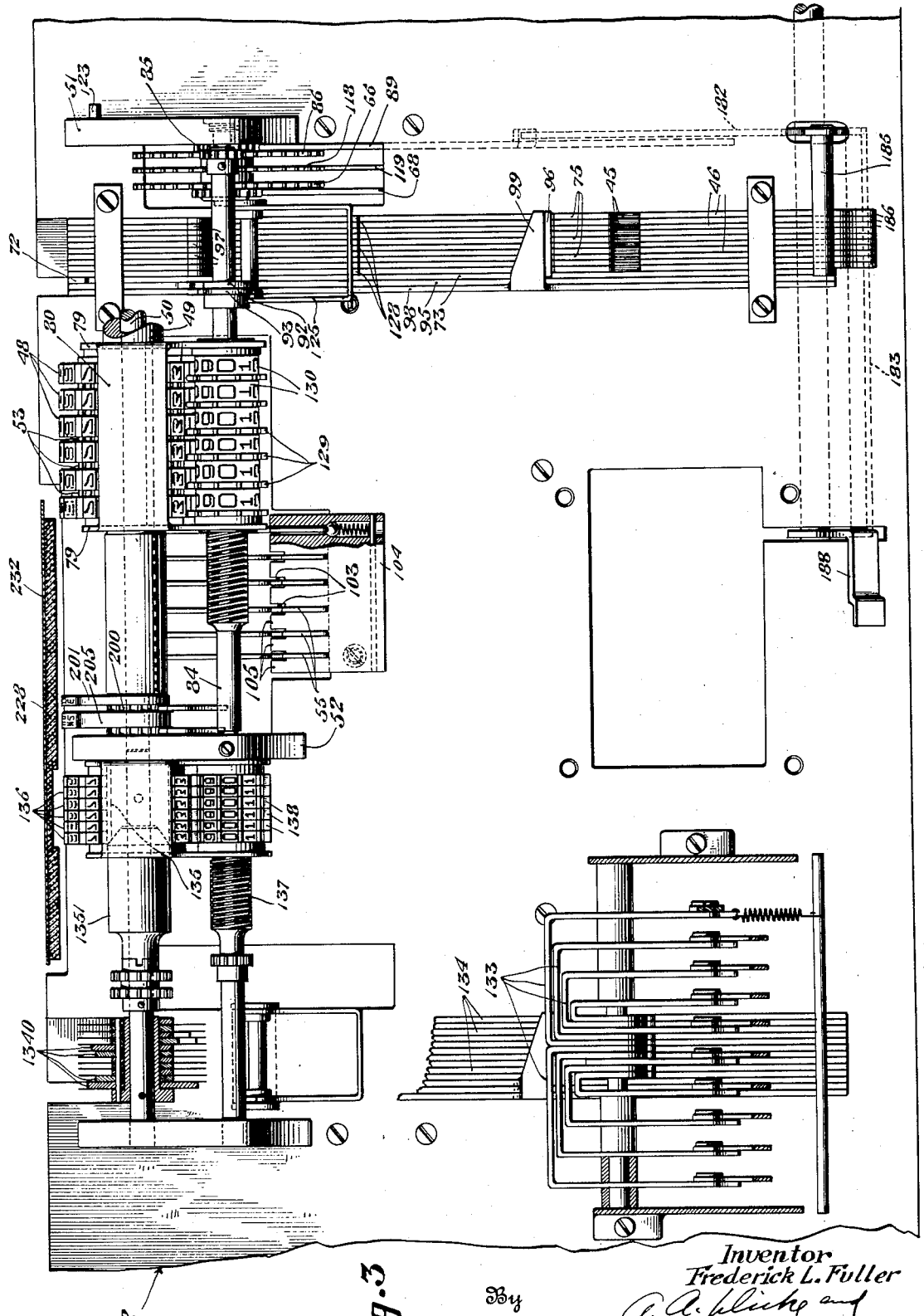
Fig. 3 is a view from the front of the machine, in elevation and partly in section, showing details of the differential mechanism for controlling the amounts to be inserted in the machine and showing a duplicate differential mechanism controlled by an auxiliary set of keys whereby ledger numbers may be printed in connection with amounts.

The construction of the keyboard unit for the amount keys is best shown in Figs. 2 and 5 wherein it will be noted that the supporting framework for the keys 19 comprises two side plates 33 and a transverse plate 34 suitably slotted at 35 to receive the upper ends of the key stems. The lower end of each key, as shown in Fig. 5, is provided with an open slot 36 engaging a transverse rod 37 suitably held in the side plates 33. Connected to each key is a bell-crank 38 which is supported by means of a transverse rod 39 also journaled in the side plates 33 of the keyboard frame. Loosely mounted upon a transverse rod 40 also carried between the side plates 33 are a series of nested yokes 41 which extend downwardly at one end to form arms 42 which are connected to their associated bell-cranks 38 by means of links 43. The opposite end of each yoke terminates in a rearwardly extending arm 44 fitting in a slot 45 formed in one of a series of movable controlling slides 46 (Fig. 3). When pressure is removed from any key it is restored to its normal elevated position by means of a spring 47 connected to its associated yoke. By means of the train of mechanism just described, it will be noted that when an amount key is depressed it will be operated against the tension existing in the spring 47 rocking the associated bell-crank 38 and, through the link 43, rocking its associated yoke 41 and, by means of the finger 44, elevating its associated controlling slide 46 to perform the various functions which will hereinafter be described in detail.

As best illustrated in Fig. 1, the stems of the amount and ledger keys are provided with key heads carrying suitable indicia to designate the value of each key, while in the case of the divided key bank, the key heads carry initials and legends to designate the functions of those keys.

Differential mechanism

As previously stated, in the present form of embodiment shown in the drawings ten amount keys are provided. Each key 19 represents one of the digits "0 to 9", inclusive, and has control over a differential mechanism whereby the type carriers are set to the corresponding printing points and, in turn, differentially control the indicating mechanism and the actuation of the totalizers. When the various keys are depressed they are capable of directly causing the setting up of the type carriers to the proper printing point, by simply striking the keys in the order that the digits occur reading from the left of the number and without previously determining the denomination of the number, or numbers, to be printed, indicated and added.

The operator has only to strike the keys in succession corresponding to the digits, reading from the left of the number, in order to cause a differential and selecting action to take place, and then by an operation of a crank an impression is taken from the selected and differentially positioned type after which the type carriers are restored to their normal position.

In the illustrative embodiment the type carriers 48 (Figs. 3 and 4) are shown in the form of wheels, supported by a sleeve 49, the sleeve being carried by a shaft 50 journaled in frames 51 and 52 attached to the front frame 22. Six type carriers have been shown in the present embodiment although more or less may be used. The type are arranged in two sets around the periphery of each wheel 48, the cipher being normally at the printing point and the characters on each wheel increase in regular numerical order up to the number "9" and then a repetition of these characters constitutes the remaining set. The arrangement and location of the type on one wheel are similar in all respects to those on each of the other wheels, each wheel representing one of the denominational orders, units, tens, hundreds, thousands and tens of thousands. Each wheel has rigidly attached thereto (Fig. 9) a gear 53 meshing with a gear 54. The gears 54, are, in the present specification, termed "selectors" and while this term appears in the claims it is to be understood that any of the other corresponding movable elements may be construed as falling within the scope of this term. The selectors 54 are six in number corresponding to the number of type carriers and the selectors 54 are normally out of engagement with the teeth of transmitting racks 55 (Fig. 4) and lie in a group to one side, i. e., to the right of the racks as viewed from the front of the machine.

When a key is operated the type carriers and therefore the whole group of selectors and type carriers is rotated a distance corresponding to the number character of said key, as will be described in detail hereinafter. For instance, if a key bearing the number "3" is struck, the group of selectors will rotate through an angular distance equal to three tooth spaces, thereby bringing all the type carriers to the "3" position, because the number "3" stands three spaces away from the printing point, which is the cipher, as has already been stated before. This rotation of the group of selectors 54 takes place in a clockwise direction as viewed in Fig. 9 and as they complete their rotation they are given as a group a longitudinal movement one step upon the sleeve 49 to bring the first selector 54 in mesh with the first rack 55 at the right of the group of the selectors 54. Then by giving the disengaged selectors and type carriers, which it will be remembered also stand at "3" a movement in the same direction to an extent equal to the complement of the amount set up, they will be brought to normal position and the ciphers of the type carriers will again stand at the printing point.

In printing the number "3456" for instance, it is only necessary to depress the keys "3", "4", "5" and "6" in the order named. When the "3" key is depressed the operation above described will take place. When the "4" key is depressed next in order, all of the disengaged selectors which are now at normal will rotate clockwise (Fig. 9) and likewise the type carriers will be moved a distance corresponding to the space between the printing point or cipher and the type bearing the character "4" on the type carrying wheels. At the completion of this rotation the whole group of selectors will be given another step of longitudinal movement and the first selector 54 will now mesh with the second rack 55, and the second selector will now engage the teeth of the first rack from which the first selector has been shifted. Further operation will permit the disengaged selectors and type carriers to be brought to their normal positions through completion of their partial rotation. When keys "5" and "6" are depressed successively, actions similar to those described take place, the whole group of selectors excepting the first two which stand at the desired printing position, rotating distances corresponding respectively to the distances or spaces the type "5" and "6" lie from the printing point, the rotary movement for the key "6" being greater than that for the keys "5", "4" and "3", and after each rotary action the described lateral shifting movement takes place so that after the "6" key is struck there will be four selectors having corresponding printing wheels standing at the proper printing point and the several selectors will have been rotated or displaced from normal position an amount equivalent to the numerical value of the keys successively depressed.

Briefly summarizing, therefore, the selectors rotate or are displaced a number of units corresponding to the value of the keys struck and after having been rotated the selectors 54 are moved laterally into mesh with their associated racks 55. When all of the desired selectors have been set and shifted to proper position they are all rotated back to normal position and a differential movement will be imparted to each of the racks and thus to elements of the selected totalizer which will have been meshed with the racks. Prior to the return rotation of the selectors and connected type carriers an impression will have been taken from the latter to print one row of figures while after the type carriers are restored to their zero positions the whole group of selectors and type carriers will be moved laterally to their disengaged position. Subsequent to this the means for rotating the positioned type carriers and selectors to zero will be restored to normal position, as will be described in detail hereinafter.

From the above, it will be seen that it is not necessary to determine the denomination of the number before striking the keys. Only ten amount number keys are required in the machine and these are effective to set up the differential elements for each numerical order. The foregoing is a general description of what the improved mechanism is intended to accomplish and the mechanisms employed for carrying out the various operations will now be described.

The tube 49, as previously stated, carries the item printing wheels 48 and has a splined connection therewith comprising, as shown in Fig. 9, a spring-pressed pawl 56 the engaging end of which is adapted normally to fit in one of a plurality of longitudinal slots 57 formed in the tube 49 and by the splined connection just described, the wheels may partake of the same movement as the tube 49 which is differentially moved and operated by mechanism which will now be described. Due to the splined connection between the various type wheels 48 and the sleeve 49 the whole group of type wheels will rotate in the direction of the arrow shown in Fig. 5, the degree of rotary movement corresponding to the value of the key operated. To this end certain mechanism, under control of the "1" key, for example, will permit the type carriers to be rotated through an arc equal to one tooth and the "3" key through an arc equal to three teeth and so on up to and including the "9" key.

For this purpose there is connected with, as an extension of the tube 49, a short sleeve 58 (Fig. 8A) upon which is mounted a series of elements 59 carrying oppositely disposed stops or fingers 60 which provide two sets of similarly arranged differential stops (Fig. 8). Between the adjacent elements 59 are located spacing members in the form of circular disks 63. The elements 59 are connected to each other, so that they all may rotate as a unit, by means of pins 61 passing through all of the elements 59, circular disks 63 and into a collar 62 keyed or otherwise secured to the sleeve 58. The fingers or stops 60, one set of which, as shown in Figs. 8 and 10, are designated by the numerals "0 to 9" inclusive are helically arranged about the supporting shaft so that the difference in their respective locations serves to provide means whereby to control the different degrees of rotary movement to be imparted to the sleeve 49, and, therefore, to the type carriers and the selectors operated thereby. For this purpose each of the controlling slides 46, previously referred to, is provided with a projection 64 (Fig. 10) which is in the plane of its associated stop finger 60 and the raised projection 64 will be guided against lateral displacement in its upward movement by means of the spaced circular disks 63. The projections 64 associated with the slides 46 all terminate at the same distance from a vertical plane passing through the center of the tube 49, but since the stop fingers 60 are helically arranged on the tube the projection 64, which is active due to the depression of a particular key, will sooner or later stop the tube 49, when released for its rotary movement, at a point depending upon which key, slide, and stop finger are active. For instance, for the "9" key it will be obvious that there will be a maximum movement of the tube, and, therefore, the type carriers and selectors, due to the fact that the "9" stop finger is at a greater distance from the projection 64 of the slide connected to the "9" key than the corresponding distance for any other key. For the "1" key there will be a minimum of movement allowed, since the finger designated by "1" (Figs. 8 and 10) will engage the projection 64 early in the movement of the tube and likewise the type carriers and selectors will be rotated to the minimum extent.

Supposing, for instance, the "3" key is depressed, it will be clear from Fig. 5 that it will operate the bellcrank 38 belonging thereto, and through the link 43 and the yoke 41 it will elevate the corresponding slide 46, raising the projection 64 so that as the sleeve 49 is released and revolves the finger 60 designated by the numeral "3" (Figs. 8 and 10) will strike said projection and since the type wheels are splined to the tube they will revolve likewise. So, also, the connected selectors will be rotated through the proper angle and will be arrested in position with their teeth in line with the spaces of the transmitting racks ready to engage therewith when shifted axially along the shaft. The means whereby the sleeve 49 and the members carried thereby are locked and released for rotary movement will now be described.

Connected to the tube 58 by a clutch connection (Fig. 4) is a pinion 65 loosely mounted upon the shaft 50 and meshing with a larger pinion 66 which in turn, is loosely mounted upon a stud 87 carried by the forwardly extending frame 51. Attached to the side of the pinion 66 is a somewhat smaller pinion 67 in mesh with a segment 68 loosely mounted upon a shaft 69 (Fig. 6) extending transversely of the machine and journalled in the two main side frames 20 and 21. The segment 68 is provided with a downwardly extending arm 70 to which is attached a spring 71, the other end of the spring being attached to the back frame 23.

As will be obvious, the spring 71 tends to rock the segment 68 downwardly and through the intermediate gears 67, 66 and 65 tends to rock the tube 58 counter-clockwise as viewed in Fig. 10, but is prevented from so doing by means of a zero stop finger 72 which is integral with a slide 73 (Fig. 3). The slide 73 is adapted to be raised by the depression of any of the amount controlling slides by virtue of the fact that it is provided with a transverse lug 74 (Fig. 10) adapted to be operated by the shoulder 75 of any of the amount controlling slides 46.

The finger 72 is adapted to alternately engage either of two zero stop fingers 76 (Fig. 10). The construction is such that when the parts are at rest one of the two oppositely disposed fingers 76 engages the zero stop 72 so that the spring 71 is ineffective through the train of mechanism just described, to rotate the barrel. Whenever a key is depressed, such as, the "3" key, for example, it will be clear that the appropriate slide 46 is immediately raised, bringing its projection 64 in the path of the "3" finger 60 while, at the same time or slightly thereafter, the shoulder 75 of the slide 46 operated by the "3" key will contact with the lug 74 elevating the slide 73, thereby disengaging the zero stop 72 from its associated finger 76 and permitting the spring 71 to rotate the tube and all the parts carried thereby until the "3" finger 60 strikes the projection 64, at which time all the type carriers will stand at the "3" position and the selectors 54 will have been moved through an angular distance equivalent to "3" teeth. After this action has taken place all of the type carriers and selectors will be shifted laterally one step by mechanism to be hereinafter described.

At this time it will be noted that the projection of the "3" finger 60 will now contact with the projection 64 of the amount controlling slide raised by the "3" key and, furthermore, the finger 76, which previously engaged the zero key stop 72, will now be three units away from its normal position while the oppositely disposed finger 76 will be seven steps away from the zero stop 72. During the last portion of the return movement of the key a spring 77 extending between a rearward extension of the zero stop slide 73 and a bracket attached to the frame 22 will draw the zero stop 72 downwardly again bringing it in the path of the oppositely disposed finger. While the zero stop is being so positioned, the return movement of the key will positively draw the projection 64 downwardly away from the "3" finger 60 again unlocking the tube 49 and parts carried thereby, but the tube will not be released until the zero stop is in the path of the next zero finger 76. This will permit the spring 71, through the train of mechanism just described, to rotate the tube and stop fingers until the finger 76, which was seven steps away from the stop 72, will strike this zero stop, during which movement the tube and associated parts will be given a number of units of movement which is the complement of the amount of the key depressed. Therefore, this will permit all of the disengaged selectors to rotate from the "3" position to the zero position and the type wheels will now have their ciphers standing at the printing point and the associated selectors will again be standing at their normal positions. At this time all of the fingers 60 will again be standing in normal positions but, of course, on account of the half rotation given to the tube 49 the other set of fingers 60 will now be in a position to cooperate with the projection 64 of a subsequently elevated slide. The means for restoring the segment 68 to its normal position and thereby retensioning the spring 71 will be explained hereinafter.

In the preceding description the action of the various mechanisms have been given under a condition when one of the amount keys has been depressed. At times it is necessary to depress an "0" key appearing in the number which is to be printed, indicated and added and since the action of the mechanism is slightly different from that which has already been given the following description is given.

It will be noted from an inspection of Fig. 7 that between the stop fingers 60 related to the "1" and the "9" keys there are provided oppositely disposed fingers 60 for the slide 46 operated by the "0" key. It will also be noted that the "0" finger 60 is normally (Fig. 8) disposed in line with the projection 64 integral with the zero slide 46 and therefore, when the zero key is depressed the projection 64 of the zero slide 46 will pass to the rear of the "0" finger 60 and even though the zero stop 72 is subsequently raised the tube 49 and parts carried thereby, will be prevented from rotating, due to the contact of the "0" finger 60 with the projection 64. Since the tube 49 will not rotate there will be no movement imparted to the selectors and type wheels and the ciphers will remain at the printing point, but the wheels will nevertheless be shifted laterally as a group to bring the next selector in mesh with the transmitting rack 55.

The shifting movement of the selectors step by step along the tube 49 as a group takes place as a result of the continued depression of the keys after the selectors have been turned through angles corresponding to the values of the keys operated. The mechanism whereby this feeding or shifting movement is effected will now be described in detail.

*Escapement action of selectors*

The type carriers 48 as a group are confined between side plates 79 (Figs. 3, 4 and 12) of a carriage yoke frame 80 loosely mounted upon the tube 49. Secured between the side plates 79 in such a manner as to prevent rotary movement is an internal worm nut 81 (Fig. 12) meshing with a worm screw 83 integral with a shaft 84 journaled between the frames 51 and 52 (Fig. 4). It will also be noted from Fig. 9 that the side plates 79 extend rearwardly and carry a shaft 82 which is the supporting means for the selectors 54 and by virtue of this construction the selectors and type carriers move laterally simultaneously. The shaft 84 carries at one end a pinion 85 (Figs. 3, 4 and 5) meshing with a larger pinion 86 loosely mounted upon the stud 87, the pinion 86 having attached thereto a somewhat smaller pinion 88 meshing with the teeth of a segment 89, which, as shown in Fig. 6, is loosely mounted upon the transverse shaft 69. The segment 89 is provided with a downwardly extending arm 90 to which is attached one end of a spring (like the spring 71), the other end of the spring being connected to a portion of the rear frame 23. The tendency of the spring is to rock the segment 89 downwardly and through the train of mechanism just described, rotate the shaft 84 and by means of the screw 83 engaging the nut 81 feed the carrier 80 and parts confined between the side plates thereof, but this movement is normally prevented by means of an escapement mechanism which is controlled by the adding keys as will now be described.

The shaft 84 carries two escapement fingers 92 and 93 (Fig. 10) which have a definite angular relation with each other, the escapement finger 92 being normally in engagement with a dog 94 which is an integral part of a slide 95 (Fig. 3) and which is elevated upon the operation of any of the amount keys by virtue of the fact that it is provided with a lateral lug 96 adapted to be operated by the shoulder 75 of any of the amount key controlling slides 46. As will be noted, the escapement finger 92 is in the same plane as the dog 94, but the second escapement finger 93 is in the plane of a dog 97 which is an integral part of a slide 98 provided with a transverse lug 99 also adapted to be operated by any of the amount key controlling slides. Both slides 95 and 98 are drawn downwardly to their normal positions by means of springs 100 and 101 (Fig. 4) which extend between rearwardly extending arms integral with the sides and a bracket attached to the frame 22.

It will be noted at this point that the lug 74 extends downwardly somewhat further than the lugs 96 and 99 so that the slide 73 will be raised almost immediately when one of the amount keys are depressed. This movement almost immediately disengages the zero stop from the finger 76 releasing the tube 49 for rotation but previous to unlocking it a projection 64 will have been brought into the path of its associated finger 60. When the selectors and type carriers have been rotated forwardly through the proper angle and have been accurately arrested by the proper finger 60, the dog 94 is then disengaged from the escapement finger 92 but, prior to complete disengagement, the escapement dog 97 will have been raised to bring it in the path of the movement of the escapement finger 93 so that the spring will act upon the segment 89 and through the train of mechanism just described will rotate the shaft 84 until the finger 93 strikes the dog 97, at which time the shaft 84 will be locked against further movement. Due to the normal angular relation between the finger 97 and the escapement dog 93 the shaft 84 will thus be given its first partial feeding movement and in the illustrative embodiment this is substantially 120° of angular movement which occurs at substantially the extreme downward depression of one of the amount keys.

When the depressed amount key begins its upward movement it will be obvious that the spring 101 will draw the slide 98 downwardly thereby disengaging the dog 97 from the escapement finger 93, but since the escapement dog 94 will have been simultaneously placed in the path of the escapement finger 92 by its spring 100 the shaft 84 will be released for further rotary movement until stopped by the co-action of the finger 92 with the escapement dog 94, and this second movement in the illustrative machine comprises an angular movement of 240° occurring substantially at the beginning of the return movement of the depressed key.

By the operation of the dogs 94 and 97 the carriage is given a complete step of movement each time a numeral key is depressed and returned and in this way the whole group of selectors will be moved one step and the selector at the extreme left of the group will engage the first one of the transmitting racks 55, i. e., the one at the right of the group.

After the shaft 84 has been given a complete rotation to shift the type wheels and selectors laterally as a group, the spring 77 acting on the slide 73 will bring the stop 72 in the path of the oppositely disposed fingers so that when the projection 64 is disengaged from the finger 60 with which it co-operates the tube 49 and the type carriers carried thereby will be given their complementary movement thus rotating all of the disengaged selectors and type carriers back to the normal position and at this stage of the operation of the machine the key will have been returned to its normal position and the parts will again be ready for the next operation which occurs when an amount key is subsequently depressed.

Attention is directed at this time to the fact that the spring connected to the segment 89 is normally under full tension ready to move the carriage step by step as the escapement mechanism is operated by the keys and, at the same time it contracts slightly as it imparts the step by step movement to the selector carriage. The means for restoring the segment 89 to normal and thus re-tensioning the spring will be explained hereinafter.

It will be observed from Figs. 9 and 12 that the type carriers 48 are mounted upon the sleeve 49 and are free to shift along it and in the normal position of the parts the pawl 56 carried by each type carrier 48 is normally in engagement with one of the two longitudinal slots 57 formed in the supporting sleeve 49. Pinned to the shaft 50 is a similar sleeve 102 also formed with two longitudinal slots 103 and, as shown in Fig. 4, the corresponding slots 57 and 103 are slightly out of alignment. The slots are offset so that the pawl 56 of a type carrier standing at zero will not engage notch 103 in sleeve 102 and thus be conditioned for operation upon rotation of sleeve 102. The description of the registering function performed by sleeve 102 to be given hereinafter, will make clear the purpose of avoiding immediate engagement of pawls 56 with sleeve 102.

As has been stated hereinbefore, when the tube 49 is rocked differentially a similar movement is imparted to all the type carriers through the medium of the spring-pressed pawl connections 56 and after the type carriers have been differentially positioned they are as a group, given a partial lateral movement and, as a result of the shifting movement just described, the type carrier 48 at the extreme left will become disengaged from the tube 49 and during the shifting movement the engaging end of the pawl 56 will slide longitudinally, guided in its movement by the particular slot 57 that the pawl 56 happens to engage. It will be observed from Fig. 12 that the tube 102 at one end contacts directly with the end of the tube 49, but at this end it is cut conically or bevelled so that the engaging end of the shifted pawl upon striking the bevelled portion will ride up and thus engage and rest upon the periphery of the tube 102 so that it is no longer connected with the tube 49, so far as the rotation of the tube 49 is concerned and the shifted type carrier will now be supported by the tube 102 and will remain in its advanced or forward position to which it has been rotated.

The first partial shifting movement of the shaft 84 will move the first type carrier laterally a sufficient distance so that the selector 54 in engagement therewith will be brought directly against an aligning bar 104, (see Figs. 3 and 9). The aligning bar is attached to the front frame 22 and is suitably slotted so as to receive one end of the transmitting racks 55 and has locking portions 105 which engage the interdental spaces of those selectors 54 which have been carried onto the tube 102 when the shaft 84 is given its second step of movement. During the last portion of this movement these selectors 54 will leave the locking portion 105 and then engage the teeth of the transmitting racks 55 and these selectors are, therefore, still held against return movement or rotary displacement. On the return of the depressed key, however, all of the other selectors and associated type carriers will be given their complementary movements so they will be brought back to their normal positions as has been described in the immediately preceding section. When all the keys corresponding to the digits of the number to be added are operated and the selectors have been rotated through the different angles corresponding to the value of the keys depressed and have gotten into engagement with the transmitting racks, then the machine is further operated to transmit these values to register them on the totalizer elements.

For this purpose, it is simply necessary to rotate all the advanced selectors back to normal position thereupon that selector which had been set or rotated forward, for instance, three teeth or spaces, and that which has been advanced or set in advance rotation four spaces and the one which has been set forward, say five spaces, according to the depression of the 3, 4 and 5 keys will, in returning to normal position regulate the movement of the transmitting racks 55 through degrees of movement corresponding, respectively, to the degrees that the respective selectors have been advanced, the first, through the spaces of three teeth, the next, through the spaces of four teeth and the other, through five teeth and this movement will be transmitted to the totalizer elements to register the value of the operated keys and control suitable indicating mechanism, whereby the amount will be publicly indicated.

After the selectors have been advanced or set up in succession according to the keys operated, a further operation of the machine comprises the operation of a crank hande which causes the return of the differentially positioned selectors to normal position for effecting registration, as above explained, and other functions.

The operating handle 106, as shown in Fig. 1, projects through the machine cabinet so as to be manually operated and is provided with a gear 107 (shown in Fig. 2) meshing with a gear 108 attached to an operating shaft 109 journaled between the main side frames 20 and 21. The gear 108 meshes with a similar gear 110 (Fig. 18) attached to the end of a second operating shaft 111 also journaled between the main side frames. By the gearing just described, two rotations of the crank handle will effect a complete rotation of the driving shafts 109 and 111.

Each of the segments 89 and 68 (Figs. 15 and 17) is provided with rearwardly extending arms 112 and 113, respectively. The arm 112 carries a roller 114 (Fig. 6) which is in the plane of a cam 115 (Fig. 15) attached to the operating shaft 111 and the arm 113 of the segment 68 is also provided with a roller co-operating with an eccentrically mounted disk (Fig. 17) or cam 116.

As shown in Figs. 4 and 5, the shaft 50 to which is pinned the tube 102 has attached thereto a gear 117 meshing with a gear 118, which, in turn meshes with the teeth of a segment rack 119, the rearward arm of which is provided with a roller in engagement with a cam slot in a box cam 120, (Fig. 15) the configuration of the slot being such that the segment 119 is positively reciprocated during each operation of the crank handle thereby rocking the tube 102 for effecting the resetting of the selectors and type carriers as will now be described.

After the type carriers have been set to the desired positions the crank handle is operated, and through the connections described will rotate the shaft 111 so that the cam 120 will rock the segment 119 thereby rocking the tube 102 clockwise, as viewed in Fig. 11. Previous to this rocking movement it will be remembered that the pawls 56 of the type wheels which have been shifted onto tube 102 will be variously positioned about the periphery of the tube in accordance with the values of the keys depressed, and in Fig. 11 the pawl 56 (shown in full lines) which is at the left represents one carried by a type carrier which has been set to the "9" position, while the pawl 56 to the right represents one which has been advanced to the "3" position. The action of the mechanism is to first rock the tube 102 in the direction shown by the arrow so that one of the slots 103 will engage the variously positioned pawls 56 wherever they may be and will return the type carriers and selectors to normal position and the selectors 54 will transmit this movement to the transmitting racks 55, which will thus be differentially moved to extents corresponding to the keys which have been operated.

At substantially the time the tube 102 is being rocked clockwise the cam 116 (Fig. 15) operating on the arm 113 will actuate the segment 68 and through the gears 66 and 65 will rock the tube 49 clockwise, as viewed in Fig. 9. It will be remembered that when the keys are successively depressed the segment 68 will be intermittently drawn down by its spring 71, and if six keys should have been depressed successively, some of the energy existing in the spring will have been spent. Since it is necessary to restore the spent energy for the next operation of the keys, the tube 49 is rocked clockwise, as explained, and re-tensions the spring 71. The arm 113 of the segment will, of course, be positioned at a point away from the cam 116 depending upon the number of keys depressed and the cam 116 will, of course, sooner or later contact the arm 113 to effect the clockwise rotation of the shaft 49. If six keys should have been depressed the tube 49 will have been given three complete turns in a counter-clockwise direction and the gearing is so arranged that the tube 49 will now be given three complete revolutions by the cam 116 so that, at the termination of the clockwise movement of the tube 49 the slots 57 will be in line with the slots 103 of the restored tube 102 and the pawls 56 will be able to slide from one slot to the other. The cam 115 will then act upon the arm 112 of the segment 89 and will rotate the shaft 84 in a direction reverse to that imparted to the shaft when the step by step movement was given to it, thereby restoring the carrier 80 to its normal position and carrying the whole group of selectors to disengaged position and also moving the selected type carriers 48 from their shifted position to their normal position, at which time they will all be carried by the tube 49. After this operation the segment 119 will again be rocked so that the tube 102 will be rocked counter clockwise restoring it to its normal position wherein the slots 103 are out of alignment with slots 57.

It will be noted that a reverse movement is given to the tube 49 from that imparted to it, when it is differentially rotated to set up the various type carriers and while this reverse movement is effected there will be no interference between the fingers 60 and the projections 64 since the projections are at their normal positions (Fig. 10) and in fact, locked against movement as will be subsequently described and, during this rotation the fingers 76 associated with the zero stop will merely ratchet under the zero stop 72, this being permitted by means of the spring 77. At the extreme end of the operation of the shaft 84 the finger 92 will engage the dog 94 holding the shaft 84 in the position shown in Fig. 10, and at this time all of the type carriers and selectors are at their normal and disengaged positions, ready for a subsequent operation of the keys.

At this point attention is directed to the fact that in Fig. 11 the pawl 56 on the left is assumed to be the one carried by the type carrier which is given nine steps of movement to bring the "9" type to the printing point and that the pawl 56 to the right represents the one carried by the shifted type carrier, which has been brought to the "3" position. It will be noted that, with respect to the upper slot 103, the right pawl 56 of a shifted type carrier standing at "three" appears to have been given a greater movement in a counter-clockwise or setting direction than the pawl of a type carrier standing in the "9" position. It should be borne in mind, however, that the pawl 56 sometimes engages the upper slot 57 (Fig. 9) of the tube 49, and at times, the lower slot. The reason for this is, that when a "7" key, for example, is first depressed the pawl 56 of the left hand wheel will remain in a position 7 steps away from the upper slot 57, in a counter-clockwise direction, whereas, the remaining or disengaged type carriers are then given their complementary movements and the pawls 56 of these will still engage the same slot 57. Upon the entry of another amount the pawl 56 of the next wheel from the left will be moved still further counter-clockwise and left at a position determined by the key depressed, so that when the selected type carrier is shifted laterally the associated pawl 56, if it should happen to be one moved by the depression of the "3" key, will occupy the position shown in Fig. 11. For this reason two slots 103 are provided so as to engage the variously positioned pawls and by reverse movement of the sleeve 102 differentially move the selectors to their home positions, less than 10 steps.

It follows from the construction just described that the differential movement imparted to the transmitting racks 55 is dependent upon the angular position of the various selectors and the distance between the pawls 56 and one or the other of the slots 103 in the tube 102. Therefore, in order to insure proper operation it is essential that the tube 102 be positioned properly and receive the proper degree of movement. To this end the shaft 50 carries at one end a disk 121 (Fig. 14) provided with an arcuate slot 122 co-operating with a pin 123 carried by the forwardly extending frame 51. The co-action of the pin and the disk serve to limit the rocking movement imparted to the shaft 50 and in addition prevents any improper setting or manipulation of the tube 102 whereby fraudulent operations might be effected, since the tube 102 is located under the hinged cover and accessible to the operator of the machine.

Lock for unoperated amount keys

It is desirable to lock the unoperated amount keys during the shifting movement of the type carriers. To this end the shaft 84 (Figs. 2 and 10) carries a cam disk 124 coacting with an arm integral with a bail 125 loosely mounted on a rod 126 carried by a bracket attached to the front frame 22. It will be obvious that during the shifting movement of the carrier 80 caused by the rotation of the shaft 84 the cam disk 124 will rock the bail 125 counter-clockwise thereby bringing it above projection 128 of all the amount controlling slides 46.

Visual indicators

It is desirable to be able to know the amount which has been set up by the successive depression of the keys so that if correct, the machine may be further operated by the crank handle but in the event that the amount has been incorrectly set up the error may be rectified by the operation of an error or correcting key, as will be described in detail hereinafter.

In order to be able to read the amount represented by the adjusted type carriers each type carrier has geared thereto, as best shown in Figs. 3, 9 and 12, pinions 129 loosely mounted on the worm nut 81 carried by frame 80 and surrounding shaft 84. Attached to these pinions are reading wheels 130 bearing upon their periphery numbers representing the various positions which the type carriers may be adjusted to. The reading wheels are normally concealed by means of the cabinet 29, but as they are stepped along with the frame 80, they come in range of a slot formed in the cabinet, which is covered as shown in Figs. 1 and 6, by a lens 131 that magnifies the characters carried by the wheels 130 so that they may be easily read.

Ledger device

As previously stated in the early part of the specification there is provided in the illustrative machine, a series of "Ledger" keys shown in Fig. 1 and designated by reference character 132. These keys are utilized to provide means whereby certain designations or numbers may be printed in connection with the amount of the transaction, or if so desired, the keys may represent letters whereby words or abbreviations may be printed in connection with amounts. The use of these keys will, of course, depend upon the particular system of business in which the machine is employed and in the present embodiment, these keys are intended to print numbers adjacent to the printed amounts.

These keys have a differential mechanism associated therewith which is quite similar in construction and principle of operation to the differential mechanism described in connection with the amount keys and for this reason it will be but briefly explained and referred to.

The keys are adapted to adjust their associated yokes 133 (Fig. 3) which raise the related slides 134 permitting the sleeve 135 (Fig. 13) and the series of stop fingers 1340 to be turned through different degrees until stopped by projections on the slides 134 (similar to projections 64) according to the value of the key operated and permitting the selected type carrier 136 to be adjusted correspondingly. The selected type carrier, after it has been differentially positioned, is shifted along by means of a worm screw 137 until the carrier is freed from the sleeve 135 and is carried by sleeve 1351 in exactly the same manner as described in connection with the amount key bank. About the only difference between this construction and that of the amount section is that the differential stop fingers are here carried by a sleeve pinned to the supporting shaft and through the latter are connected to the sleeve 135 whereas sleeve 1351 (corresponding to tube 102) may turn independently of the shaft. In order to be able to determine the numbers set up there are provided reading wheels 138 which are visible through a slot in the cabinet covered by a lens 139 (Fig. 1). The pair of segments 681 and 891 for the ledger section, corresponding to the segments 68 and 89 of the amount section, as well as the restoring cams 1161 and 1151 therefor, are best shown in Fig. 17.

The printing wheels 136 and reading wheels 138 associated with the ledger device are aligned by means of a series of spring-pressed aligning fingers 140 (Fig. 13) which take the place of the aligning bar 104 for the printing wheels of the amount key bank. With the exceptions just noted, the construction and operation of the differential mechanism associated with the ledger device is precisely the same as that related to the amount key bank, it being understood that during the operation of the crank, the type carriers which have been set up by the depression of the ledger keys will be returned to their normal positions along with the amount type carriers.

Correcting or eliminating mechanism

This mechanism relates to means for rectifying an error made by the operator before an operation of the machine has begun, that is to say, should the operator have struck the keys incorrectly and the selectors have become engaged with the transmitting racks, it is possible by the present improvement to return the selectors and type cariers to their normal positions without transmitting their values to the totalizer elements, this operation being possible without requiring any operation of the crank handle, and by simply manipulating an "Error" key.

The error key 141, as shown in Fig. 1, projects through the machine cabinet 29 so as to be exteriorly manipulated. The stem of the key (Fig. 6) passes through a slot in the cabinet and is articulated to a bell-crank 142 securely attached to a transverse shaft 143, which, as shown in Fig. 17, is journaled between the side frames 20 and 21. Secured to the shaft 143 is an arm 144 provided with a stud 145 underlying the segments 68 and 89. As best shown in Fig. 15, the segment 89 is provided with a downward extension 146 and the segment 68 is also provided with a similar extension 147 which, in the normal position of the parts, are not in the path of the movement of the stud 145 when the correcting key 141 is operated. However, as the keys are successively depressed the segments 68 and 89 will be intermittently drawn downwardly by means of their springs thereby bringing their associated extensions 146 and 147 in the path of the stud 145. If, after a key, or several keys have been successively depressed it is discerned that an error has been made and it is desired to rectify the same, the error key 141 is drawn outwardly thereby rocking the shaft 143 so that the stud 145 will first engage the extension 146 rocking the segment 89 upwardly and, through the train of mechanism already described, shifting the carriage 80 back to its normal position carrying with it all the shifted type carriers and selectors. Since, in any position of a differentially positioned type carrier the associated pawl rests upon the periphery of the tube 102, shifting of that type carrier will move its pawl so that it engages the tube 49. Shortly after the shifted type carriers have been moved so that they are all positioned on the tube 49 the stud 145 will engage the extension 147 thereby rocking the segment 68 upwardly and rotating the sleeve 49 to restore the energy in the spring 71, the last operation being exactly the same as when the crank handle is operated.

In order to compel the operator to make a complete operation of the error key once the movement has commenced the rearward arm of the bell-crank 142 is provided with ratchet teeth co-operating with a full stroke pawl 148. (Figs. 6 and 17.)

*Interlock between error key and operating shaft*

As best shown in Fig. 6 the stud 145 co-operates with a cam slot 149 formed in a bell-crank 150 loosely mounted upon the shaft 69, said bell-crank being provided with a lug 151 at the end of its rearwardly extending arm. It will be seen that when the error key is pulled outwardly the bell-crank 150 will be rocked clockwise so that its lug 151 will pass into a notch 152 formed on a disk 153 secured to the shaft 111 which is rotated upon each operation of the machine; thus, operation of the machine is effectively prevented. Furthermore, it will be seen that if the error key should be at its normal position and the operation of the machine is begun, the periphery of the disk 153 will engage the lug 151 thereby preventing any intentional or accidental movement of the error key.

As will be noted in Fig. 17, the shaft 143 at its left is provided with a similar arm 144L provided with a stud 145L which, when the error key is operated to rock the shaft 143 will, through the stud 145L reset to normal the segments associated with the differential mechanism controlled by the ledger keys, and it will be obvious, therefore, that the manipulation of the error key will also return to normal position any of the shifted type carriers associated with the ledger device.

While the construction shown in the illustrative embodiment is such that the error key is common to both banks, it is quite evident that a separate error key for the ledger keys and operating independently of the error key for the amount key bank may be readily added, thereby permitting errors to be corrected in either bank without affecting the setting of the other type carriers.

*Clerk's and transaction keys*

In the machine illustrated there is provided a bank of keys which may broadly be termed a "divided key bank" whereby it is possible to depress both a clerk's and transaction key in connection with the amount keys.

The clerk's keys of which there are four, designated in Figs. 1 and 17 by reference character 154, are apportioned for clerk's "A", "B", "D" and "E", the key caps being appropriately lettered. In order to designate the type of transaction entered in the machine four keys are provided which are designated by reference characters 155 for the "Charge" key, 156 for the "Paid out" key, 157 for the "Received on acct" key and 158 for the "No sale" key.

The key frame for holding the keys of both sets is similar in construction to that for the amount keys and, as shown in Fig. 21, each key operates a bell-crank 159 forcing a detent plate 160 rearwardly against the tension of its spring 161 so that the rearward end, which terminates in a hooked portion 162, will engage a plate 163 carried by the back frame 23, thereby holding the key depressed.

It is possible by the present construction to depress a clerk's key and a transaction key, but it is not possible to depress more than one clerk's key or more than one transaction key by reason of the fact that each detent plate 160, for the clerk's keys, is provided with an upwardly extending portion 164 which is normally in such a position that when the detent plate 160 of a depressed key is forced rearwardly it will engage the beveled edge of a single key pendant 165 (Figs. 21, 22 and 23) thereby locking the rest of them against oscillation in the event that it should be attempted to depress another clerk's key. Similar key pendants to effect a similar result are provided for the transaction keys to co-operate with downwardly extending portions 164 carried by the plates 160 associated with these keys. This sort of mechanism is well known in the art and for this reason it is only briefly explained herein.

*Machine lock*

In the preceding description it was assumed that the operating handle is normally unlocked for operation, but certain mechanism is employed whereby the crank cannot be operated until one of the clerk's keys has been depressed. To this end it will be noted that the key detent plate 160 associated with each of the clerk's keys is provided with a shoulder 168 adapted to co-operate with a projection 169 (See also Fig. 17) of a bail 170 loose upon the shaft 111. One arm of the bail 170 is bifurcated at its lower end to receive a pin 171 carried by a locking plate 172 slotted at its rear end to receive the shaft 111 and attached at its other end to an arm 173 clamped to a sleeve 174 which is supported by the shaft 143 previously mentioned. The locking plate 172 is provided with a lug 175 (Fig. 21) normally engaging a notch formed in a locking disk 176, and it will be clear that when one of the clerk's keys is depressed the rocking of the bail 170, through the pin and slot connection, will shift the locking plate 172 forwardly, as viewed in Fig. 21, thereby withdrawing the locking lug 175 from the notch in the locking disk 176. It will be recalled that the clerk's key will be held in its depressed position by virtue of the fact that the hooked portion 162 engages the plate 163 and thus the lug 175 and associated notch will be held in disengaged position permitting the further operation of the machine by the crank handle

Lock for amount and ledger keys when crank handle is unlocked

In order to lock both the amount and ledger keys whenever a clerk's key has been depressed, to release the machine for operation, the sleeve 174 has attached thereto an upwardly extending arm 177 (Fig. 6) formed with a locking lug 178, which, when the locking plate 172 is shifted forward by the depression of a clerk's key, will pass through a slot formed in the front frame 22 and engage notches 179 (Fig. 5) formed in all of the controlling slides 46, thereby effectively preventing any operation of the amount keys. As will be seen in Fig. 17, the sleeve 174 has attached at its other end a similar arm provided with a locking lug 180 also adapted to engage the notches in the controlling slides associated with the ledger keys thus simultaneously locking them against operation when the machine has been released for operation.

Interlocking mechanism between "No sale" and "Amount" keys

It is desirable, in the type of machine illustrated, to prevent the operation of both the "No sale" key and one of the "Amount" keys, for the purpose of preventing an incorrect indication, registration and printed record of any commercial transaction, as, for example, "No sale $5.00", etc.

To this end the segment 89 (Fig. 15) is provided with a lug 181 normally contacting with the upper end of an arm 182 which is formed as part of a yoke 183 loosely mounted on the sleeve 174 (Fig. 17). The yoke 183 has integral therewith a forwardly extending arm 184 provided with a stud 185 which, as shown in Figs. 5 and 17, normally extends over the feet 186 of all the controlling slides 46. Therefore, it will be noted that when one of the amount slides is raised the co-action of the foot with the stud 185 will rock the yoke 183 clockwise, against the tension of its connected spring 187, and will draw the arm 182 rearwardly (as viewed in Fig. 15) away from the lug 181, and when the shifting movement of the carriage takes place, the segment 89 will drop downwardly bringing the lug 181 in front of the arm 182, this being permitted because, as shown in Fig. 15, the upper forward edge of the arm 182 is concentric with respect to the shaft 69 on which the segment 89 is pivoted, so that further downward movement of the segment 89, caused by the successive depressions of the amount keys will not rock the arm 182 further. However, when the yoke 183 is given its first movement by the elevation of one of the amount key controlling slides it will bring a forwardly extending arm 188 (Figs. 5, 17 and 21) in back of a projection 189 carried by the detent plate 160 associated with the "No sale" key, thereby locking the "No sale" key against operation when an amount key has been depressed.

Conversely, it will be noted, by reason of the construction just described, that when the "No sale" key is first depressed the extension 189 will pass over the arm 188 thereby locking the yoke 183 against movement and by virtue of the stud 185 overlying the feet 186 of the amount key controlling slides, none of the amount keys may be depressed when a "No sale" key has first been depressed and latched.

Adjustment of clerk's and transaction type carriers and releasing mechanism for clerk's keys It is desirable to print adjacent to the amounts, a letter identifying the clerk operating the machine and characters designating the type of transaction entered. Mechanism for accomplishing this will now be described in detail, reference being had particularly to Figs. 16 and 21.

As illustrated in Fig. 21, each of the key detent plates 160 is provided with an L shaped slot 187¹, the vertical portion of which normally engages a pin 188¹ carried by a plate 189¹ bifurcated to form a jaw 190 to engage one of a series of nested bails 191 (See also Fig. 25) loosely mounted upon the shaft 109. Each bail at the point where it engages its associated jaw 190 is provided with a segmental portion 192 equivalent to the width of the jaw, the other bails at this point being suitably cut away so that when one bail is rocked the remaining bails will not be operated. By virtue of this construction, each key when depressed will positively rock its bail 191 counter-clockwise, as viewed in Figs. 16 and 21, thereby controlling the differential adjustment of the associated type carrier. The four innermost bails 191 are associated with the four clerk's keys, while the four outer bails are operated by their corresponding transaction keys.

As shown in Fig. 21, there is provided a slide 193 formed with teeth on its lower side meshing with the teeth of a segment 194 which is pinned to a shaft 195 journaled in the intermediate frames 24 and 27 (Fig. 27). The shaft 195 has also attached thereto an arm 196 (Fig. 28) to which is connected a spring 197, the spring tending to rock the shaft 195 clockwise and the slide 193 rearwardly, but being prevented due to the fact that the slide at its extreme end is provided with a lug 198 (Fig. 16) normally in engagement with the shoulder of a spring-pressed detent 199 pivoted to the frame 23. The upper edge of the slide 193 is provided at its extreme forward end with teeth meshing with the teeth of a pinion 200 attached to a printing segment 201 mounted on the shaft 50 and carrying printing characters representing the various clerks operating the machine. As best shown in Figs. 16 and 25, each of the clerk's bails 191 is provided with a projection 202 which is of a width sufficient to engage a projection 203 of the detent 199 and is also adapted to co-act with a foot 204 of the slide 193 so as to act as a stop whereby the slide will be differentially positioned in accordance with the bail which has been raised.

Summarizing, therefore, when a clerk's key is operated, it will, through the plate 189¹ and the jaw 190 rock its associated bail 191, the projection 202 of the latter contacting with the projection 203 of the detent 199 so as to disengage the forward end of the detent from the lug 198, it being understood that by this time the hook 162 will have been caught over the plate 163 to hold the key latched and the associated bail will have been elevated sufficiently so as to bring it in the path of the foot 204 integral with the slide 193. At substantially the time the slide 193 is unlocked the spring 197 will rock the segment 194 clockwise forcing the slide 193 rearwardly until the projection 204 contacts with the projection 202 of the raised bail 191 at which time the type carrier 201 will be properly positioned. It will be clear that when the innermost bail is elevated there will be no movement of the slide 193 and when printing is effected, the type normally positioned under the platen, which in the present instance is the letter "A", will be printed upon the record strip. The other bails 191 related to the keys of the clerk's group will sooner or later stop the slide 193 in its rearward movement thus permitting a differential postioning of the slide and type segment. The mechanism for differentially positioning the type carriers for the transaction keys is similar to that described in connection with the clerk's keys and for this reason will be only briefly explained.

Adjacent to the slide 193 is positioned a similar slide 1931 formed at its forward end with rack teeth also meshing with a pinion attached to a segment 205 (Fig. 16) carrying on its periphery characters representing the type of transaction to be entered in the machine, the normal position of the segment presenting a character at the printing line to indicate a "Cash" transaction. The lower portion of the slide is provided with teeth meshing with the teeth of a segment 207 (Figs. 21 and 28) carried by a shaft 208 parallel to the shaft 195, and which has similarly attached thereto an arm 209 to which is connected a spring (like the spring 197) which tends to rock the aforementioned slide rearwardly. It is prevented from doing so, however, by means of a detent 210 (Fig. 16) which is disabled whenever one of the transaction keys operates its associated bail 191. In a similar manner the slide 1931 is equipped with a foot 211 which is stopped by means of any of the elevated bails associated with the transaction keys, so as to permit the spring connected to the arm 207 to differentially adjust the transaction type carrier 205 from the position where it normally indicates a "Cash" transaction so that when the printing impression is effected a character will be printed upon the record strip designating the particular type of transaction entered in the machine.

Since it is desirable to release the depressed clerk's and transaction keys, during an operation of the machine, to permit a subsequent depression thereof, the operating shaft 111 carries two cams 212 and 213 (Figs. 21, 25 and 26). During the rotation of the shaft 111 one of the cams 212 or 213 will engage the horizontal edges of the shoulders 168 of the detents 160 of the depressed clerk's and transaction keys, elevating the rear ends of the detents and disengaging the hooked portions 162 from the plate 163, thus permitting the springs 161 to force the detent plates forwardly and return the depressed keys to normal position.

In order to positively return the type carriers 201 and 205 from their differentially moved positions to normal the following mechanism is employed. Loosely mounted on a shaft 214 journaled between the frames 24 and 27 is an arm 215 (Figs. 27 and 28) to which is connected a slotted link 216, the rearward end of which engages a pin 217 carried by the end of the arm 196. The arm 215 also carries another slotted link 218 which in turn engages a pin 219 attached to the arm 209. The arm 215 has connected thereto at substantially its mid-point a pitman 220 bifurcated (Fig. 29) at its extreme end to receive the shaft 111 and carrying a roller co-operating with the race of a box cam 221 carried by the operating shaft 111

The result of the construction just described is that at a certain point in the operation of the crank handle the cam 221 acting upon the pitman 220 will draw the slotted links 216 and 218 rearwardly and by the engagement of the forward end of the slots in the links with the studs 217 and 219 carried by their respective arms 196 and 209, will rock the segments 194 and 207 positively in a forward direction thereby restoring the slides and the type segments 201 and 205 to their normal positions at which time the slides will be latched by the detents 199 and 210.

*Printing mechanism*

The recording mechanism utilized in this type of machine is capable of printing the items registered in the machine, the special characters designating the clerk operating the machine and the type of transaction entered, and, in addition, is capable of printing the numbers adjusted by the ledger keys. Means are further provided for printing upon the record strip the total standing upon the totalizers accumulated during a particular period as well as amounts standing on various consecutive number counters, but this mechanism will be described in the section designated "Total printing".

Referring now, particularly, to the construction of the printing mechanism whereby the amounts of sales, ledger numbers and special characters are printed upon a record strip, the entire impression making and paper feeding mechanism are supported by side plates 224 and 2241 (Figs. 28 and 31) joined together by means of integral plates 225 and 226 (Fig. 2). The frame is pivoted at its rear end by means of a rod 227 journaled in brackets integral with the back frame 23 so that the whole printing mechanism may be swung about this rod as a pivot. The width of the rubber impression block or platen 228 for effecting impressions is shown in Fig. 3, wherein it will be noted that it is sufficient to take an impression simultaneously from all the shifted amount type carriers 48 and the ledger type carriers 136, and, furthermore, from the two special type carriers 201 and 205, which are located between these two groups. As shown in Fig. 3, the rubber block 228 is suitably cut away over the normally positioned legder type carriers 136 so that if none of these type carriers are shifted from their normal positions no impression will be made upon the record strip.

The paper storage roll 229 (Fig. 28) is supported by a rod 230 formed at one end with a knurled knob 231 (Fig. 2) a portion of the rod 230 being threaded so as to screw into one of the side plates 224 or 2241, thereby holding the storage roll 229 in its proper position between the side plates. The paper is drawn from the storage roll and under the platen block 228 over a writing table 232 and then between a plurality of spaced feeding rollers 233 (Figs. 2 and 28) and a co-operating spring-urged roller 234. The rollers 233 are attached to a shaft 235 journaled in the side plates 224 and 2241, the shaft having attached thereto at its end a ratchet toothed wheel 236 (Fig. 33). Rotatably mounted upon the shaft 235 is an operating plate 237 carrying a stud 238 which is the pivotal point of a spring-pressed feeding pawl 239 engaging the teeth of the ratchet wheel 236. The operating plate 237 is provided with a lug 240 co-operating with an extension 241 of a pitman 242 carrying a roller co-operating with a cam slot formed in one side of a disk 243 attached to the operating shaft 111 (Fig. 31). In order to prevent retrograde movement of the feeding rollers 233 and shaft 235 there is provided a retaining pawl 231 pivoted upon a fixed stud 244 and co-operating with the teeth of the ratchet wheel 236.

The roller 234 which co-operates with the feeding rollers 233 is carried by arms 245 (Figs. 2 and 31) attached to a shaft 246 which carries at the end outside of the plate 224 an arm to which a spring 247 is attached. The spring 247 serves to perform two functions, first, to force the roller 234 against the rollers 233 and, second, to urge the retaining pawl 241 against the teeth of the ratchet wheel 236.

It will be evident that when the operating shaft 111 is rotated the pitman 242 will be moved forwardly (Fig. 31) and through its extension 241 co-operating with the lug 240 will rock the operating plate 237 counter-clockwise, and since the feeding paw 239 is in engagement with the teeth of the ratchet wheel 236 it will rotate the ratchet wheel 236 and the shaft 235 and, due to the fact that the paper passes between the rollers 233 and 234, it will be fed an increment so that the matter printed upon the record strip will be spaced apart at regular intervals.

It is frequently desirable to feed the paper a greater amount than that effected during the regular operation of the machine, and to this end the following mechanism is provided. A manipulative lever 248 which projects through the cabinet cover 31 is loosely pivoted upon the shaft 234 and is provided with a foot 249 also adapted to engage the lug 240 and from the foregoing it is evident that each time the lever 248 is moved rearwardly, it will rock the operating plate 237, thereby manually feeding the record strip as desired. When a new supply of paper is provided it is necessary to insert the end between the rollers 233 and 234 so as to insure the proper feeding operation. In order to perform this quickly and without requiring successive manipulation of the spacing lever 248 the shaft 235 is provided at its extreme left end with a knurled knob 250 (Fig. 2).

Before the paper is fed, printing is effected from the type carriers which have been brought to the printing point by means of the platen 228. For effecting a movement of the platen at the desired time, which is before the shifted amount and ledger type carriers and the transaction and clerk's type carriers are restored to their normal positions, the following mechanism is employed. Journaled between side plates 224 and 2241 is a shaft 251 (Fig. 31) to which is secured a platen supporting frame member 252 (Fig. 21) provided with an integral downwardly extending arm 253. The forward end of the platen supporting member 252 is undercut transversely at its top and by means of the writing table 232, which is attached to the top of the platen supporting member, there is provided a longitudinal slot in which may be inserted a plate 254. The plate 254 is provided with a rounded portion at its front and bent lugs 255 which serve to keep and hold the rubber impression block 228 in place. The downwardly extending arm 253 is provided with a stud 256 (Figs. 15 and 31) fitting in a fork 257 formed in a pitman 258 which is provided with a roller co-operating with a slot formed in the other side of the cam 243 attached to the operating shaft 111.

Before the item printing wheels 48, ledger printing number wheels 136 and character printing wheels 201 and 205 are returned to their normal positions, the pitman 258 is moved rearwardly (Fig. 15) thereby rocking the shaft 251 and forcing the platen 228 against the adjusted type carriers, thereby effecting an impression on the record strip after which the feeding mechanism comes into operation so as to feed the paper an increment. Upon being fed in this manner a portion of the printed record strip passes into a receptacle 260 (Figs. 2 and 28) extending between the side plates 224, 2241.

It is to be understood that an inking ribbon 261 (Fig. 31) is passed between the paper strip and the type carriers and any of the forms of ribbon mechanism well known in the art may be utilized for this purpose. Since the inking ribbon and the means for feeding it are no part of the present invention, details of this mechanism will not be given.

While not an indispensable feature, it is desirable in the present embodiment to combine the recording of the characters on the record strip with the autographic feature, that is, entering of notations adjacent each printed item as a means for identifying each transaction. The record strip is of such a width that any desired notation may be entered adjacent the printed item after the printed amount has been entered in the machine. As previously described, the printing mechanism is concealed by means of a hinged cover 31 apertured to receive a glass 262 which is further provided with a writing slot 263 (Figs. 1 and 28) through which notations may be made, the plate 232 serving as a very satisfactory writing table.

*Multiple totalizers*

The illustrative machine is equipped with a plurality of totalizers, four of which are apportioned to the various clerks operating the machine whereby these totalizers may individually accumulate the amounts of the sales transacted by the respective clerks. In addition to these totalizers a separate totalizer, designated as the "Grand" totalizer, is provided for accumulating the amounts of all the cash sales entered in the machine by all the clerks. For certain transactions which may be recorded in the machine, such as "Charge", "Paid out", and "No sale" where no receipt of money is involved the totalizer engaging and operating devices are disabled to prevent the selected clerk's totalizer as well as the grand totalizer from being operated, since they are intended only to indicate the amounts of cash received.

The various totalizers are best shown in Figs. 28 and 34 and, as will be observed, they are located in a horizontal plane, one behind the other, reference character 264 designating the "Grand" totalizer, and 265 the four totalizers apportioned to clerks A, B, D and E. Each totalizer comprises a frame which is journaled between the totalizer support frames 25 and 26 by means of journal pins 266 held in fixed position by set screws 267 and 268. The pins 266 are the pivot points of each totalizer and the latter are adapted to be rocked about these points as a center so as to bring the totalizer pinions in mesh with the actuating racks at the desired time. Each totalizer comprises a series of eight wheels 269 and attached pinions 270 which are loosely mounted upon a shaft 271 which is carried by the totalizer frame. Each of the wheels 269 is formed with raised printing characters so as to effect printing upon a suitable impression material.

The teeth formed at the forward ends of the transmitting racks 55 (as shown in Figs. 4 and 9) mesh directly with the shifted selectors 54 and each rack, of which there are six, one for each selector, is guided in its longitudinal movements by means of flanged rollers 272 mounted on a rod 273 and a shaft 295 (Figs. 34 and 35) which are carried by and extend between the totalizer supporting frames 25 and 26. The rod and shaft also act (as best shown in Fig. 21) as supports and guides for the racks or slides for adjusting the clerk's and transaction type carriers. As will be noted from an inspection of Figs. 34 and 35 all of the amount actuating racks 55 are provided on their upper sides with teeth, each rack being in the plane of a series of corresponding totalizer pinions 270, so that when the selected totalizer is rocked about its pivotal point the pinions of that totalizer will engage the teeth of the corresponding transmitting racks 55.

*Totalizer selecting mechanism*

In order to select a particular totalizer for operation so that the amount of the transaction may be accumulated by a clerk's totalizer the following mechanism is employed. As best shown in Fig. 28, each of the four innermost bails 191 is provided with an upstanding portion 274 provided with an open-ended slot in which fits the ball-ended portion of one arm of a bell-crank 275. There are four of these bell-cranks which are carried by means of a stud 276 attached to the supporting frame 26. Mounted upon a stud carried by a forwardly extending bracket integral with the back frame 23 is an upstanding arm 277 provided with a yoked portion 278 (Fig. 30) which carries a pin 279 forming the pivotal point of a series of selecting and controlling fingers 280. There are four of these fingers and each is in the plane of a projection 281 of the associated bell-crank 275.

Mounted adjacent the totalizer supporting frame 26 are a plurality of totalizer controlling slides 282 (Figs. 28 and 34) slidably mounted by means of pins 283 attached to the frame 26 and fitting in elongated slots formed in the slides. Four totalizer controlling slides are provided and each is equipped with a rearwardly extending finger 284 (Fig. 28) in the plane of its associated selecting finger 280 and above the finger 284 is a notch 285. Each slide is provided with a cam slot 286 engaging the totalizer wheel supporting shaft 271 of its respective totalizer and a series of openings to surround the remaining shafts 271 without interference therewith. The cam slot 286 is so formed that when its slide 282 is moved forwardly it will rock the totalizer frame about its pivotal point 266 thereby forcing the totalizer pinions into mesh with their corresponding racks and when the slide is driven in the opposite direction the frame will be rocked in a reverse direction, thereby disengaging the totalizer pinions from the transmitting racks.

The arm 277, as best shown in Fig. 15, carries a roller cooperating with a slot formed in a box cam 287, the slot in the box cam being so formed that during each revolution of the shaft 109 the arm 277 will be oscillated. It will also be noted in the figure just referred to that there is provided an additional slide 288 which is mounted next to the frame 26, this slide being provided with a cam slot 289 engaging the totalizer wheels supporting shaft 270 of the grand totalizer. The slide 288 is provided at its forward end with a lug or overturned portion 290 passing in front of the forward ends of the slide 282 (Fig. 28) so that any movement of one of the clerk's totalizer controlling slides 282 will also impart a similar movement to the grand totalizer controlling slide 288.

Since each totalizer frame possesses considerable weight and would drop into mesh with the actuating racks if no means were provided to prevent it, each totalizer is normally locked at one end by means of the slots 286 or 289 in its associated controlling slide engaging the totalizer wheel supporting shaft 271 and is locked at its other end against downward movement by a slide 291 (Fig. 31) provided with a plurality of locking slots 292, each engaging its respective totalizer wheels supporting shaft 271 so that when the slide is in its normal position none of the totalizer frames can, by virtue of their weight, drop into mesh with the transmitting racks. The locking slide 291 is guided in its longitudinal movement by means of studs 293 carried by the left totalizer supporting frame 24 and is provided at its lower edge with teeth meshing with the teeth of a mutilated pinion 294 carried by the short shaft 295 which, as previously stated, passes through the frames 25 and 26 and is a support for the racks 55. As best shown in Fig. 15, the shaft 295 has attached thereto at its opposite end a pinion 296 meshing with the teeth formed on the lower end of the grand totalizer controlling slide 288.

It will be recalled that when a clerk's key is depressed the associated bail 191 (Fig. 28) will be rocked clockwise and the extension 274 and bell-crank 275 will, by means of the projection 281 raise its corresponding selecting finger 280 upwardly to bring its extreme forward end in cooperation with the finger 284 of the associated totalizer controlling slide 282. Since the clerk's key is latched in its depressed position, the selecting finger 280 will remain in co-operative relationship with the finger 284 and when the machine is further operated by the crank handle, the arm 277 will be rocked forwardly thereby forcing the desired totalizer controlling slide forwardly and through the cam slot 285 cooperating with the shaft 271 will rock the desired clerk's totalizer about its pivotal point forcing the totalizer pinions into mesh with the actuating racks. The transmitting racks 55 are then forced rearwardly so as to differentially adjust the totalizer pinions, as will be described in detail hereinafter.

It will be obvious from Figs. 15 and 28 that when the clerk's totalizer controlling slide is moved forwardly the extreme forward end of such slide will, by contacting with the lug 290 of the grand totalizer slide 288 force it forwardly and by virtue of the slot 289 formed therein engaging the shaft 271 simultaneously force the grand totalizer into engagement with the transmitting racks.

When the arm 277 commences its forward movement so as to move the desired clerk's and grand totalizer slides the rack teeth formed on the lower end of the latter slide will, through the pinion 296, rock the shaft 295 to move the locking slide 291 (Fig. 31) forwardly thereby unlocking all the totalizers at one end. However, since only the clerk's totalizer and grand totalizer are operated, the others will be locked against movement due to the fact that their controlling slides remain in their normal positions and retain the totalizer supporting shafts elevated.

After the desired clerk's totalizer and grand totalizer have been thrown into engagement, which occurs during the first partial movement of the operating handle, the differential movements of the totalizer elements will take place. It will be remembered that previous to this the shifted selectors were rotated through different angles corresponding to the value of the different keys depressed and were placed into engagement with the transmitting racks, whereupon the machine is ready to be operated to transmit these values to the totalizer elements 269.

It will also be recalled that the return to normal position of the engaged selectors is due to the reverse movement of the sleeve 102 (Fig. 11) which picks up the variously positioned pawls thus driving the selectors 54 differential distances and when this is taking place the selectors will drive the transmitting racks 55 rearwardly and by reason of the teeth provided at the upper ends of the racks meshing with the pinions 271 of the engaged totalizers, they will actuate the registering pinions differentially. After the pinions have been differentially adjusted the totalizer engaging mechanism again comes into operation and disengages the selected clerk's totalizer and the grand totalizer from the racks and the mechanism employed to effect this will now be described.

The bail 278 of the arm 277 is provided with an upstanding lug 297 (Figs. 15 and 28) adapted to cooperate with a shoulder 298 of a notch formed in each of the clerk's totalizer controlling slides 282 as well as the grand totalizer slide 288. The edge 299 of these notches is concentric with respect to the pivotal point of the arm 277 so that rocking of the arm 277 will not move forwardly any of the totalizer controlling slides which are not selected for operation. However, after the totalizer controlling slides have been moved forwardly to force the totalizers into engagement with the transmitting racks and the latter have been operated, as explained, the arm 277 is given its reverse movement and since the lug 297 is in engagement with the shoulders 298 of the controlling slides which have been moved forwardly, it will force the slides rearwardly to their normal positions.

After the totalizers have become disengaged the differentially moved racks are then positively returned to their normal positions and, for this purpose, the mechanism illustrated in Fig. 28 is employed wherein it will be noted that attached to the shaft 214 on which the arm 215 is loosely mounted is an arm 302. Connected to the arm 302 is a shiftable plate 303 provided at its extreme end with a stud 304 cooperating with a slot 305 of an arm 306. Each rack 55 is formed at its lower end with teeth meshing with rack segments 307 (Fig. 28), attached to the parallel jack shafts 308 (Fig. 27) journaled in the frames 24 and 27 and passing below the counter supporting frames 25 and 26. As will be observed from Fig. 27, there are provided six segments 307 one for each rack for the various denominations and a corresponding number of parallel jack shafts 308 to each of which is attached a finger 309 (Fig. 28). The fingers 309 are arranged alternately at opposite sides of the bar 303 and are each adapted to cooperate with studs 310 similarly disposed and carried by the bar. Attached to the shaft 214 is an arm 301 to which is connected a pitman 300 (Figs. 21 and 21A) having a roller at one end cooperating with a box cam 3021 attached to the shaft 111.

During the time that the selectors 54 are driving the racks 55 the pitman 300 (Fig. 21A) is moved rearwardly by means of its associated cam 3021 rocking the arm 301 forwardly, the shaft 214 clockwise, and the arm 302 rearwardly to shift the member 303 to the right, as viewed in Fig. 28. The cam 3021 is so designed that the member 303 will be given a maximum movement, equivalent to nine steps of the rack 55, and since the studs 310 and fingers 309 receive a movement at the same rate of speed there will be no interference when the selectors drive the transmitting racks 55 rearwardly. If one of the racks should be moved only one step, the corresponding finger 309 will be left at that position, but its associated stud 310 will be given its maximum rearward movement.

When the selected totalizer wheels 48 have been shifted back to their normal positions upon the tube 49, the pitman 300 will be moved in a reverse direction thereby shifting the member 303 forwardly and since at this time the selectors 54 are out of engagement with their associated transmitting racks 55, the cooperation of the studs 310 with the fingers 309 and slot 305 with its stud 304 will rock the various shafts 308 and by means of the segments 307 force the transmitting racks 55 back to their normal positions.

The shaft 308 at the extreme right (Fig. 25) is not provided with a finger 309, but an arm 306, formed with the previously described slot 305. This construction is utilized in order to give a parallel movement to the member 303 thus dispensing with an extra arm 302 and finger 309 if this construction were not employed. However, the cooperation of the stud 304 with the end of the slot 305 will return the rearmost shaft 308 in exactly the same manner that the studs 310 do in cooperating with their associated fingers 309.

*Totalizer disengaging mechanism*

Upon an operation of those transaction keys which do not involve the receipt of money certain mechanism will come into play which prevents the clerk's totalizer as well as the grand totalizer from being operated by racks. The mechanism for accomplishing this function comprises a series of bell-cranks 311 (Figs. 28 and 34) each of which has a connection with its corresponding bail 191 related to a transaction key, exactly like that described in connection with the clerk's totalizer selecting mechanism. There are three of these bell-cranks 311, one for each totalizer throwout key, namely "Charge", "Paid out" and "No sale". They are all provided with lugs 312 which are of a sufficient width to underlie all of the selecting fingers 280. Therefore, when a clerk's key has been depressed to select its particular totalizer, and a transaction key is thereafter depressed, the bell-crank 311 which is rocked by virtue of the corresponding transaction bail being rocked counter-clockwise will, through its lug 312 raise all the selecting fingers 280 upwardly bringing their forward ends in cooperation with the notches 285. Therefore, when the machine is further operated all the selecting fingers 280 which have been elevated will merely pass idly into the notches 285, thereby preventing any movement of the clerk's totalizer controlling slides or grand totalizer engaging slide. As a result, no totalizer will be operated during this operation of the machine and the differentially moved racks will be reciprocated idly back and forth. If so desired, a transaction key may be depressed prior to a clerk's key, but as far as the action of this mechanism is concerned the result will be exactly the same, since the finger 312 will elevate all of the selecting fingers 280 into line with the notches 285 and the subsequent movement of the clerk's bail 191 will be idle.

In order to prevent the friction existing between the various slides 282 and 288 from moving rearwardly any slide which is not to be operated, the several slides may be spaced apart by means of washers or any other suitable spacing devices. For a similar purpose each totalizer controlling slide except the outermost one, is provided with projections 313 and 314 (Fig. 28) which separate the fingers 280 and projections 281, thereby eliminating the possibility of one carrying an adjacent one with it.

*Transfer mechanism*

The illustrative machine is provided with transfer mechanism whereby if the sum of items entered on any wheel amounts to more than "9" a unit will be transferred to the wheel of the next higher order. The mechanisms for effecting transfers between successive denominational orders of the totalizers are alike and in view of this fact the transfer mechanism of one totalizer, between the units and tens order only will be described.

Each totalizer printing wheel 269 has attached to it at one side a transfer disk 315 (Figs. 37, 38, 39 and 40) which carries a trip tooth 316. Loosely pivoted upon a shaft 317 which is in alignment with the journal pins of the totalizer is a trip pawl 318 provided with a trip tooth 319 in the line of travel of the trip tooth 316 and adapted to engage therewith as the totalizer wheel 269 passes from its "9" to its "0" position. The trip pawl 318 is loosely mounted upon the shaft 317 and is provided with a foot 320 which is in the plane of and adapted to engage a shoulder 321 of a bell-crank member 322 pivoted by a pin 323 on a transfer operating slide 324. Each slide 324, of which there are seven in number (Fig. 34) is slotted so as to be guided in its longitudinal movement by means of the shaft 295 and rod 273 previously referred to. Mounted on the opposite side of each slide 324 is a transfer pawl 325 which, in the normal position of parts (Fig. 37) has its lug 326 engaged by the shoulder 321 of the member 322. The transfer pawl 325 is provided with a transfer tooth 3261 which is in the plane of the pinion of the next higher order. A spring 327 is inserted between the lower ends of the transfer pawl 325 and the member 322.

Each transfer operating slide 324 is provided at its rearward end with a stud 328 engaging the open-ended slot of an associated arm 329 loosely mounted upon a shaft 330 extending between the totalizer supporting frames 25 and 26 (Fig. 44). The arm 329 is provided with extensions 331 and 332, which are, respectively, in the plane of a cam 333 and a disk 334, the latter being provided with a projection 335. The members 333 and 334 are all carried by the operating shaft 109 (Fig. 25) which as stated before, is given a complete rotation upon each operation of the machine. The projections 335 are spirally arranged about the shaft so that in a cycle of rotation of the shaft 109 the projections will operate the transfer slides seriatim, first the tens transfer slide, then the hundreds, etc. as is well known in the art.

The sequence of operation of parts during a transfer operation is best shown in Figs. 37, 38 and 39, Fig. 37 showing the normal position of the totalizer and the transfer mechanism.

If, for example, nine has been standing upon the units totalizer wheel, as shown in Fig. 37, and a unit is added thereto during the time the racks 55 are being moved rearwardly to effect adding, the trip tooth 316 of the units totalizer wheel will contact with the trip tooth 319 of the trip pawl 318 and force the foot 320 against the shoulder 321 at the upper end of the member 322, rocking the latter counter-clockwise. As the lug 326 is thus disengaged from the shoulder 321, the tension in the spring 327 will cause the lug 326 to act upon the bevel edge 336 of the shoulder, forcing the parts to the position shown in Fig. 38, the transfer tooth 3261 being elevated from the normal position of the parts shown in Fig. 37. The upward movement of the transfer tooth is stopped by the co-action of the lug 326 with a stop shoulder 337 of the slide 324. When the totalizer pinions are disengaged from the transmitting racks the slide 324 is moved rearwardly from the position shown in Fig. 38 to the position in Fig. 39, and at this time the transfer tooth 3261 will engage the pinion of the next higher order wheel to advance said pinion one step. While the transfer tooth 3261 is imparting a unit's movement to the tens wheel it is, by virtue of the contact of the upper edge 338 of the shoulder with a tooth of the pinion 270 being rocked downward at the same time and sufficiently to cause the lug 326 to again be caught by the shoulder 321. The pivoted pawls are now cocked for subsequent transfer operation after which the slide 324 is again moved forwardly to normal position.

To preclude the possibility of over-carrying by rapid operations of the machine, the upper edge 338 of the transfer tooth 326 is eccentric with respect to the totalizer shaft 271 so that even though considerable momentum might be imparted to the tens totalizer pinion by a rapid transfer operation the tooth 339 (Fig. 39) of the pinion which is adjacent to the tooth, which has been engaged by the transfer tooth 3261 will not be able to pass over the edge 338 of the transfer tooth. In order that the totalizer pinion may properly position itself during a transfer operation, a gap 340 is left between the lug 326 and a shoulder 339 of the transfer slide, but even though these two parts may be brought in contact by the momentum imparted to the transfer pinions the tooth 339 cannot pass over the edge 338 to add more than a unit to the totalizer wheel.

To prevent accidental displacement of the totalizer pinions from their set positions when disengaged from their transmitting racks as well as to assist in preventing over rotation of the totalizer wheels due to momentum, there is provided a series of pawls 341 (Fig. 39) which are loosely mounted upon the shaft 317 and urged rearwardly by springs 342 so that their wedge-shaped ends 343 engage the interdental spaces of the corresponding totalizer pinions.

As has been previously stated a transfer device is provided for each totalizer between the units and tens order and a similar type of transfer mechanism is also provided for the tens, hundreds and thousands denominational orders, so that at the end of an operation of the machine all the transfers will have been effected and the amount standing on the totalizer pinions will represent the amount of all the items entered in the machine up to that particular time.

*Consecutive number counters and operating devices*

The illustrative machine is provided with a series of consecutive numbering counters which are adapted to register the total number of times that cash sales have been entered in the respective clerk's totalizers and, furthermore, the total number of all the cash sales which have been entered in the machine.

The special counters are of the multiple pawl, deep notch transfer type, well known in the art and described in many patents, one of which is the patent to Thos. Carney #876,295, dated January 7, 1908. The consecutive numbering counters and the means for operating them are exactly alike and a description of one will suffice for all.

The consecutive numbering wheels 344 (Fig. 34) of which there are three wheels for each counter, are provided with raised printing characters like the totalizer elements 269, and are mounted in alignment with the totalizer wheels and carried by the totalizer wheel supporting shaft 271. Each wheel has attached thereto a ratchet wheel 345 (Figs. 41 and 42) co-operating with a multi-prong actuating pawl 346. The actuating pawl 346 is spring-urged and pivotally mounted by means of a pin 347 in a bail 348 loosely mounted upon the shaft 271. The pin 347 extends to one side of the bail and is normally out of co-operating relationship with a notch 349 formed in a consecutive number operating slide 350. The slide 350 is also guided in its longitudinal movement by means of the rods 273 and shaft 295.

The slide 350 has attached to it a stud 351 co-operating with an open-ended slot formed in an arm 352 loose upon the shaft 330 and formed with rearward extensions 353 (Figs. 41 and 43) in the plane of the complementary cams 354 which are attached to the operating shaft 109. During each operation of the shaft 109 the arm 352 is oscillated thereby rocking the operating slide 350 and if, previous to this, a totalizer has been rocked into engagement it will also carry with it the consecutive number counter bringing its stud 347, carried by the bail 348, in co-operating relationship with the notch 349 in the slide 350 and when the arm 352 is rocked by the cams 354 the slide 350 will be operated so that a unit will be added to the corresponding counter.

It will be obvious that the counters carried by the various clerk's totalizers will register the number of times that each clerk's totalizer is operated and thus the number of cash sales made by each clerk. The counter carried by the grand totalizer will be actuated each time that the grand totalizer is operated thus indicating the total number of cash sales which is the aggregate of the number registered by the individual clerk's counters.

*Indicator mechanism*

The illustrative machine is provided with an improved mechanism whereby the amount, nature of transaction and clerk operating the machine may publicly be indicated. The transaction and clerk's indicator, which are of the tablet type, extend transversely of the machine and are readable both at the front and back of the machine. The amount indicators employed in the present invention also consist of tablets slidably mounted in a frame carried by a vertically movable indicator carriage. During the first half of the operation of the machine the indicator carriage is given a vertical movement carrying with it all of the tablet indicators mounted therein. A selecting finger which has suitable connections to the differential mechanism is adjusted differentially while all the indicators are being elevated so as to select the indicator corresponding to the key depressed. During the second part of the operation of the machine the indicator carriage is lowered and such indicators as have been selected will be retained in their upper or exposed positions, thereby exhibiting the indicators identifying the amount keys last depressed.

The denominational groups of indicators have been so arranged that the indication of the amount of the sale may be read in the correct denominational order at both the front and back of the machine. To effect this result, twelve groups of amount indicators are provided, there being two groups for each denominational order; the cents, dimes, dollars, tens of dollars, hundreds and thousands of dollars. The mechanism for obtaining the results just described will now be described in detail.

As shown in Fig. 27, there are attached to the rear frame 23 two rearwardly extending brackets 355 and 356 to which are attached plates 357 and 358 by any suitable fastening means, the plates being provided at their upper ends with lugs or ears 359. Fitting between the lugs or ears 359 of the plate 357 is a plate 360 which, as shown in Figs. 18 and 46, is provided at its lower end with a rack bar 361 meshing with a gear 362. Also fitting between the ears 359 of the plate 358 at the other side of the machine is a similar plate 363 (Fig. 46) likewise provided with rack teeth 364 meshing with a pinion 365 similar to the pinion 362. The pinions 362 and 365 are secured to a shaft 366 which is journaled between the lower ends of the stationary plates 357 and 358. Meshing with another pinion 367, also attached to the shaft 366, is a segment 368 which, as shown in Figs. 17 and 18, is formed as a part of an arm of a bell-crank 369 which carries at its opposite end a roller 370 cooperating with a cam slot 371 formed in a cam 372 attached to the operating shaft 111.

Extending between the two side plates 360 and 363 are cross members in the form of plates or flashes 373 and 374 (Figs. 18, 46 and 47) which are attached at their opposite ends to the side plates 360 and 363 by means of rivets 373. The cross members 373 and 374, in conjunction with the two side plates 360 and 363, constitute an indicator carriage. It will be clear, therefore, that when the machine is operated the cam 372 will rock the segment 368 and through the connections just described will give the carriage a complete reciprocation, during each operation of the machine, to perform functions which will now be described.

Referring to Fig. 46, it will be noted that the amount indicators 376 are of the tablet type, the upper or substantially rectangular portion bearing idicia upon one side so as to indicate the amount represented by each particular indicator. Ten indicators are supplied for each denominational group, the foremost indicator bearing the character "0", the adjacent indicator bearing the integer "1", and the remaining indicators bearing indicia coresponding to their order in the group.

Since the indicators are alike in form and the method of supporting all of the groups of them is precisely the same, a description of one group only will be given.

As just stated, the upper portion of each tablet indicator 376 is substantially rectangular in form and each indicator tablet is provided below its rectangular portion with a pair of parallel stems 377 (Fig. 19), a stop lug 378, a foot 379, and a second stop lug 3761; the purpose of which will be explained hereinafter.

In order to guide the indicator tablets 376 in their longitudinal movements, there is provided a series of plates 380 which are spaced apart by plates 381 (Figs. 48 and 49) thus forming a series of guide slots in which fit the indicator tablets 376, all of the plates being held together in spaced relation by rivets 3810. Each group of assembled plates is supported and positioned by means of a U-shaped framepiece 382 having screws 383 passing through it and the assembled guides into either the side plate 373 or 374. By this construction the frame-piece 382 serves to retain the parts in their proper relationship.

The result of this construction is that each indicator of a denominational order is spaced apart from the adjacent one so that each may be operated independently of the other and when they are all in their normal positions, that is, when no indicator tablet of that group is exhibited to view, the stop lugs 378 will by virtue of the weight of the tablets, rest upon a lug 384 bent inwardly from either the cross member 373 or 374, this position being shown in Figs. 19 and 48.

So far as has been described, it will be evident that, during the operation of the machine, the indicator carriage as a whole will be raised during the first part of the operation of the machine carrying with it all of the amount indicators, due to the fact that lug 384 engages the extensions 378 and during this movement an arm, which is under control of the differential mechanism, is set so as to select and hold the particular indicator which is to remain in its uppermost or exposed position, while the remaining tablets are returned to their normal or lower position. The mechanism for accomplishing this will now be described in detail.

The plates 357 and 358, which it will be remembered, are stationary, have integral therewith at substantially their mid-portions ears or bent lugs 385 (Figs. 25, 46 and 47). Attached to these ears are two cross supporting plates 386 and 387 in which are journaled a series of parallel shafts 388. As shown in Fig. 20, loosely mounted upon the shaft 388 is a differentially movable member 389 formed with a slot 390, and at its lower end provided with rack teeth 391. The rack teeth 391, as best shown in Figs. 6 and 18, mesh with the teeth of an associated segment 392 loosely mounted upon the shaft 366.

Fitting in the slot 390 formed in each member 389 and mounted on the shaft 388 but having a splined connection 393 (Fig. 20) therewith, is a selecting finger 394. The member 389 is adapted to be moved differentially along the shaft 388, thus properly positioning the selecting finger 394 under the foot 379 of the selected indicator tablet which has been raised with the entire group. As best shown in Fig. 25, the feet 379 of the various tablets are suitably bent so as to be spaced apart, the spacing being greater than the width of the selecting finger 394, so that when the latter is properly positioned it will cooperate with the foot of only one tablet, thereby selecting and retaining that particular tablet in elevated position.

In order to give the shafts 388 a rocking movement so that the selecting fingers 394 will be brought into and out of cooperative relationship with the feet 379 there is mounted on one side of the cross member 387 a channel bar 395 (Figs. 25 and 46) formed with a plurality of slots 396 in which fit arms 397 secured to each of the shafts 388. The channel bar 395 is formed with a plurality of elongated slots 398 in which fit the shafts 388 so that they act as a guide for the bar 395. In order to slide the bar 395 at the desired time one of the arms 397 is provided with a stud 399 engaging an open-ended slot formed in a double arm 400 pivoted by a screw 401 to the rear frame 23 and carrying a stud 402 cooperating, as shown in Fig. 25, with a cam slot 403 formed in the periphery of the cam 243 previously mentioned and, which it will be remembered, is attached to the operating shaft 109. By virtue of this construction it will be noted that the channel bar 395 is reciprocated and through the arms 397 will reciprocate the shafts 388 at the desired time and by means of the splined connection between the shaft 393 and the selecting finger 394 will effect a similar movement of the latter.

The lower end of each segment 392 (Figs. 6 and 18) is extended downwardly to form a segment 404 provided with aligning teeth 405 which are adapted to be engaged by an aligning bar 406 (Figs. 6, 17 and 18) in the form of a yoke attached to a transverse shaft 407. One end of the yoke 406 has integral therewith a forwardly extending arm 408 provided with a roller 409 cooperating with a cam 410 (Figs. 17 and 51) attached to the operating shaft 111. The shaft 407 has also attached to it an arm 4071 (Fig. 21) which, by means of a spring 4072 (Fig. 18) attached to the bar 406, is urged against the underside of the member 172.

Figs. 6 and 18 of the drawings illustrate the segment 392 and tablet selecting mechanism associated with the cents bank of keys which is precisely the same as the tablet selecting mechanism for the dimes bank. The mechanism for differentially adjusting the segments 392, related to the remaining denominational groups, differs slightly in operation, in order to effect another result, and for the present there will only be described the tablet selecting mechanism related to the cents and dimes denominational groups.

Connected to each of the segments 392 associated with the units and dimes banks below their pivotal points 366 is a spring 411 (Fig. 18) which urges each segment when unlocked counter-clockwise until a stud 412 carried at the lower end cooperates with the rearward end of a closed slot 413 formed in a differentially moved link 414. Each link 414 is connected to its associated shaft 308 by an arm 416 (Figs. 6 and 27). It should be noted that there are two arms 416 and links 414 associated with each shaft 308 to control both front and rear indication for each denominational order. The cooperation of the stud 412 with the rear end of the slot of the normally positioned link 414 so positions the segment 392 that the selecting finger 394 will be directly in line of the travel of the foot carried by the "0" indicator. Therefore, when the segment 392 associated with either the cents and dimes bank is in the position shown, which position it assumes when the "0" or foremost indicator will be exhibited to view.

When the machine is released for operation by the depression of a clerk's key the member 172 will be shifted forwardly disengaging its underside from the arm 4071 so that the spring 4072 will rock the aligning bar 406 downwardly, thereby disengaging the aligning bar 406 from the teeth of the aligning sement 405 and releasing the same.

It will be remembered that each rack 55 and shaft 308 and likewise the link 414 is returned to normal at each operation of the machine, but the differential positioning of the link 414 will regulate the position of the segment 392 and even though the segment 392 will subsequently be locked by the bar 406, as will be described hereinafter, the link may be restored to normal. Hence if an indicator other than "0" has previously been selected the pin 412 will be at a distance from the rear end of the slot 413 in the normally positioned link. When the bar 406 is forced downwardly to release the segments the spring 411 will rock each segment 392 thus disengaging the selecting finger from the foot of the previously elevated indicator (if it should be other than "0") and if no friction between the indicator stems and guides should exist the indicator will be permitted to drop to its normally concealed position. The spring 411 will rock the segment 392 until the stud 412 strikes the end of the slot 413 at which time the selecting finger 394 will be in the line of travel of the foot of the "0" indicator. It will be understood that if the "0" indicator has previously been elevated the segment 392 will remain stationary, the selecting finger 392 remaining under the foot of the elevated "0" tablet.

If an amount should only be entered in the units totalizer wheel that integer will be exhibited together with the "0" indicator of the dimes bank while only the integer will be printed. If it is desired to print the zero in the dimes order with the integer, it is only necessary to depress the "0" key prior to the integer it is desired to register.

Therefore the depression of the clerk's key will unlock the segments 392 so that the springs 411 will bring the selecting fingers 394 into a position where they are directly in the plane of the feet of the "0" indicators.

When the crank handle is operated the segment 368 (Fig. 18) will drive the shaft 366 and through the side plates 359, 360 and parts carried thereby, comprising the indicator carriage, will lift the carriage upwardly and since the lugs 384 (Fig. 47) which are integral with the cross members 373 and 374 underlie the extensions 378 of each of the amount indicators, the elevation of the indicator carriage will carry with it all of the indicators which are in their normally lowered or concealed positions. Also, at the commencement of the operation of the machine, the cam 403 acting upon the double arm 400 will, through the stud 399 rock the channel bar 395 (Fig. 46) and through the arms 397 will rock all of the shafts 388 and the selecting fingers 394. If a selecting finger should be co-operating with the foot of a previously elevated "0" tablet it will withdraw therefrom permitting the "0" indicator to drop to normal or until stopped by the lug 384 on the plate 373 or 374, assuming that no friction exists between the indicator stem and the guiding plates.

At this point it will be obvious that if no friction exists between the indicator stems and guiding plates depression of a clerk's key and a partial operation of the machine will result in the dropping of all the indicators. This may be regarded as undesirable, as it permits a clerk to immediately destroy the amount last indicated in the cents and dimes order and, for this reason, among others, this friction element may be permitted or even created between the indicators and guides so that the indicator will remain in any position to which it is adjusted. However, due to the fact that this friction will cause an elevated indicator to rise with the carriage it is necessary to hold the elevated indicator stationary relative to the carriage so that as the carriage rises the remaining indicator plates will be brought into line with that previously exposed. The plates 373 and 374 will, at this time, cover the elevated tablets and thus act in the manner of a flash, as is well known in the art.

To hold the elevated tablets stationary while the carriage rises there may be attached to the cross bars 386 and 387 plates 415 (Figs. 46, 48 and 49) having stops which overlie and are in the line of travel of the stop lugs 3761 of a group of indicators. By virtue of this construction, it will be obvious that when the indicator carriage is moved upwardly the stop 415 co-operating with the foot 3761 of the previously elevated tablet (which cannot drop on account of friction) will prevent further upward movement of the raised tablet and since, at this time, it is stationary while the indicator carriage is being moved upwardly, the tablet will be forced back to its normal position.

During the time the indicator carriage and the lowered indicators are being elevated the links 414 are being differentially positioned so that the finger 394 will be moved correspondingly in accordance with the key depressed. If a zero appears in that particular denomination the segment 392 and therefore the finger 394 will remain at its zero position.

Upon the beginning of the second half of the operation of the machine, when the carriage is at its uppermost position, the differentially positioned fingers 394 will again be rocked under the feet 379 of the indicators to be elevated and simultaneously the cam 410 (Fig. 51) will be effective to force the aligning bar 406 upwardly, locking the segments 392 and selecting fingers 394, after which the carriage will descend, carrying with it all of the indicators with the exception of that indicator which is held elevated by reason of the fact that the selecting finger 394 is placed in the line of travel of the foot 379 associated with the selected indicator. When the carriage is at its normal or lowered position, there will be one indicator of a group exhibited to view and the others will have been brought downwardly by the restoring movement of the carriage to their normally concealed positions.

Cipher indicating mechanism

So far as has been described it will be noted that mechanism has been providing for indicating at two sides of the machine a zero or any integer for the cents and dimes denomination. In addition to this, mechanism has also been provided whereby the amounts for the remaining denominations may be indicated in combination with mechanism whereby the indication of the zeros of the denominations higher than the dimes, will only be indicated in case such zeros form a necesary part of the number to be indicated, and in this manner superfluous figures are dispensed with.

Prior to the construction illustrated in the present invention accounting machines which were equipped with indicating mechanisms, for indicating the amounts registered and printed, were so constructed that even in cases where the zeros formed no necessary part of the number to be indicated, they were nevertheless brought to view, so that a line of zeros would appear in conjunction with the printed amount. For instance, if the registered amount should be .06 and the indicating capacity of the machine should be six denominations the indication would appear thus: 0, 0 0 0.0 6 wherein it will be noted that the line of zeros confuse the number indicated and possibly the numeral "6" would not ordinarily be noticed. In order to overcome this and other disadvantages inherent in the indicating mechanisms illustrated in the prior art, the present invention includes suitable mechanism for normally preventing the indication of ciphers to the left of the dimes denomination, except in the event that the amount registered should involve a significant figure above the dimes denomination, at which time the indication of ciphers above dimes would be permitted where such ciphers form a necessary part of the number to be indicated. The mechanism whereby the results just described may be obtained will now be explained in detail.

From what has been said before it will be noted that the first two shafts 308 from the rear part of the machine (Figs. 6 and 27) are related to the cents and dimes denominations and it will be recalled that the next four shafts 308 are those related to the remaining denominations, dollars, tens of dollars, hundreds of dollars and thousands of dollars. Each of the last mentioned shafts have connected at their right, arms 420 connected to links 421 each of which is provided at its extreme end with a triangular shaped slot 422, the rear of which is formed with a cam portion 423. The cam slot of each link 421 cooperates with a stud 424 carried by a related segment 425. Each segment 425 (Fig. 52) is provided with a downwardly extending segmental portion provided with teeth 426 also cooperating with the aligning bar 406, previously described, and the normal position of the parts, as viewed in Fig. 6, is such that when the link 421 is at normal and the segment 425 is unlocked the spring connected to the segment (similar to spring 411) will rock the segment 425 counter-clockwise to such a position that the related selecting finger 394 will be so located that it will not cooperate with the finger 379 of any of the amount indicator tablets. As shown in Fig. 6 the lower end of the segment 425 is positioned one step further to the rear than the lower end of segment 392.

If no amount should be inserted in the totalizer higher than the dimes denomination it will be obvious that the shafts 308, the arms 420 and the links 421 will remain in the position shown in Fig. 6, wherein the spring 411 will retain the segment 425 in the position shown and since the selecting fingers 394 of the banks higher than the dimes will thus be placed where they do not cooperate with any of the fingers 379 of the amount tablets, and since any elevated tablets will be forced to their normal positions during the operation no indicators in these banks will be exposed and the only amount indicators that will be exposed to view will be those pertaining to the cents and dimes banks, and these may be either zero or any integer depending upon the one or two amount keys successively depressed. In the event that an operation should be a "No sale" operation in which, it will be remembered, no amount can be registered due to the interlock mechanism, two zeros will appear for the cents and dimes denominations, since it will be recalled that the selecting finger for these two banks will then be placed in the line of travel of fingers 379 of the "0" tablets of the cents and dimes denominational group.

Since the selecting fingers related to the tablet indicators of the denominations higher than the dimes denomination are so positioned normally that they do not cooperate with the feet of the zero tablets it is necessary to provide mechanism whereby the selecting fingers will be positioned to retain the "0" tablets elevated in the event that the zero key for that denomination has been operated. To this end the downwardly extending portion 90 of the segment 89 has attached thereto a link 427 (Figs. 6 and 17) which is connected to an arm 428 attached to a transverse shaft 429. The shaft 429 (as shown in Fig. 17) is journaled between the supporting brackets 355 and 356. Along the shaft 429 at the desired points, are also attached upstanding arms 430 to which are connected zero levers 431 the forward ends of which pass through a slot formed in the rear frame 23. There is a zero lever provided for each denomination higher than the dimes and each is provided with a projection 432 which normally underlies the lower edge of the differentially moved link 421 of that order (Fig. 52). Each zero lever is provided with a shoulder 433 which is adapted to cooperate at the desired time with a bail 434, which, as shown in Fig. 17 extends transversely across the machine and is provided with an arm 435 (Fig. 52) carrying a roller at its upper end cooperating with a cam slot in a box cam 436 attached to the operating shaft 109.

It will be observed from Fig. 50 that the shoulders 433 of the various zero levers have their rearward edges at successively increasing distances from the bail 434, that is to say, it will require a movement of three steps of the shaft 429 to bring the zero lever 431 associated with the dollars bank to cooperate with the bail 434 and a movement of four steps will be necessary to bring the zero lever of the tens of dollars so as to cooperate with the bail, etc. When two keys are successively depressed it will be remembered that the segment 89 will be given a movement of two steps in the downward direction, thereby rocking the link 427 and the shaft 429 correspondingly, and through the arms 430 drawing rearward all the zero levers 431 and at this time the shoulder 433 of the dollars zero lever will be in close contact with the bail 434, but will not cooperate therewith. If an amount, such as $50.00 for example, should be registered in the machine the zero key will be depressed successively three times after first depressing the five key and upon the second depression of the zero key the zero levers for the dollars will have been moved sufficiently to bring the shoulder 433 of the dollars lever over the bail 434. When the zero key is again depressed the shaft 429 and zero levers will be given another step of movement and the zero lever for the dollars order will be moved rearwardly another step but the shoulder 433 of this lever will still cooperate with the bail 434 and likewise the zero lever of the tens of dollars order will be brought into cooperation with the bail 434.

When the crank handle is operated the bail 434 will be lifted upwardly (Fig. 52) and since the zero lever of the dollars denomination underlies the link 421 related to that bank, the bail 434 cooperating with the shoulder 433 will elevate the link 421 and through the cam edge 423 of the triangular slot 422 will cooperate with the stud 424 carried by the segment 425, thereby rocking the segment clockwise (as viewed in Fig. 52) moving the selector finger one step rearwardly until it is in the line of the finger of the "0" tablet.

Simultaneously the zero lever of the tens of dollars will be elevated bringing the selecting finger for the tens of dollars tablet indicator under the foot of the "0" indicator for that bank, but at this time the adding racks 55 are being forced rearwardly which results in a clockwise movement of the associated shaft 308 and through the arm 420 will draw the link 416 forwardly and since the end of the triangular slot 422 cooperates with the stud 424 it will rock the associated segment 425 clockwise bringing the selecting finger under the foot of the "5" tablet since it has been assumed that a "five" key in the tens of dollars denomination bank has been operated.

With the exception of the special mechanism whereby the ciphers are not brought into view unless they form a necessary part of the registered number, the action of the mechanism for selecting the desired tablets for amounts of one dollar or more is substantially the same as that described in connection with the cents and dimes banks and for this reason the explanation will not be repeated.

*Multiple indication*

In order to indicate both at the front and back of the machine a duplicate set of indicators are provided. The arrangement of the indicators to effect this is best shown in Fig. 25 and of the indicators for indicating at the front of the machine reference character 437 designates the cents group, 438 the dimes, 439 the dollars, 440 the tens of dollars, 441 hundreds of dollars and 442 thousands of dollars.

From Fig. 27 it will be noted that there are a pair of links 414 and 421 connected to each shaft 308 the extra set being provided to control the indication exhibited at the rear of the machine. For this reason a duplicate set of indicators are provided and in Fig. 25 the cents group of indicators are designated by reference character 443, the dimes 444, dollars 445, tens of dollars 446, hundreds of dollars 447 and thousands 448. The different groups of indicators for the back of the machine are, in respect to their denominational order, reverse from the front permitting the amounts to be read in the correct order, both front and back. Furthermore, a zero eliminating mechanism has also been provided for the indicators of the orders higher than the dimes that provide a back indication, but the action and operation of these parts is exactly the same as that which has just been described and accordingly no further explanation will be given.

*Clerk's and transaction indicating mechanism*

The illustrative machine is also provided with an auxiliary set of indicators whereby the clerk operating the machine and the type of transaction entered therein will be suitably indicated both at the front and the rear of the machine.

To this end there is provided a supplemental indicator carriage comprising side plates 450 and 451 (Figs. 18, 27 and 47) which are suitably spaced apart at intervals by cross members 452. The supplemental carriage is located within the amount indicator carriage and is of sufficient length to extend between the bracket 355 and 356 (Fig. 27). The lower edges of the plates 450 and 451 normally rest upon the lower edge 453 (Fig. 18) of a notch formed in the stationary plates 357 and 358. Extensions 454 of the side plates of the amount indicator carriage side plates 360 and 361 fit in between the two parallel side plates 450 and 451. The shoulders 455 adjacent the extension 454 are adapted to cooperate at the desired time with the lower edges of the side plates 450 and 451 of the clerk and transaction indicator carriage.

The result of this construction is that when the amount indicator carriage is elevated the shoulders 455 cooperating with the lower edges of the side plates 450 and 451 will thereby raise the clerk and transaction indicator carriage and later permit it to be lowered during the continued operation of the machine. Therefore, it will be noted that while the amount indicator carriage is immediately raised when the crank handle is operated, the transaction and clerk indicator carriage will remain idle for a part of the time until the shoulders 455 cooperate with the underside of the plates 450 and 451.

As shown in Fig. 47, the stems of the clerk's indicators 456 of which there are four, one for each clerk's key, fit between the plates 450 and 451 and the stems fit in guiding slots formed in a plurality of guiding blocks 457. The stems fit rather tightly in the guiding members so that on account of the friction existing, the clerk's indicators may be retained in any position to which they are adjusted. Each indicator stem is provided with a foot 458 cooperating with a selecting finger 459 which is carried by a sleeve 460 which may be differentially moved by a segment 461 and also given a rocking movement since it has a splined connection to one of the reciprocating shafts 388. The lower end of the clerk's segment 461 has a pin and slot connection to a link 462, which is similar to the link 414 explained in connection with the amount indicators, but the link 462 is connected to the shaft 195 (Fig. 27) which, it will be remembered, is differentially positioned whenever a clerk's key is operated. In order to prevent an elevated clerk's indicator 456 from being raised upwardly when the clerk's and transaction indicator carriage is raised, the foot 458 is of such dimensions that it cannot pass above the sleeve 460.

When the "A" key has been depressed at the previous operation of the machine the finger 459 will be positioned so that it will be under the foot 458 of the indicator related to clerk "A". However, when one of the other clerk's keys is depressed the shaft 195 will be moved differentially, as explained heretofore, and the link 462 will permit a spring connected to the segment 461 to move it differentially since the segment has previously been unlocked by the aligning bar 406 (Fig. 18) which, it will be remembered, is operated by the depression of a clerk's key. The selecting finger 459 will then be positioned in the path of the foot of the appropriate indicator and when the machine is further operated the selecting finger 459 will be rocked out of the path of the foot 458 of the selected tablet which may be the same as the previously elevated tablet, but this indicator will not drop due to frictional resistance. As the machine is further operated, the transaction and clerk's indicator carriage will be elevated and since the foot 458 of the previously elevated tablet cannot pass above the sleeve 460 it will be held stationary and will be forced back into the carriage as the latter moves. When the carriage is at its uppermost position the differentially positioned selecting finger 459 will be rocked back under the foot 458 of the appropriate indicator and when the indicator carriage is restored to its normal position, the desired indicator will be held in elevated position and the segment 461 will again be locked by the aligning bar 406 to permit the link 462 to return to its normal position without disturbing the cooperative relationship between the selecting finger 459 and the foot of the elevated indicator tablet.

It should be pointed out that only a single set of indicators are provided for the clerk's, but the tablets are provided on both faces with indicia designating the various clerk's so that they are readable both at the front and back of the machine. It will also be understood that when the plates 450 and 451 rise they will cover up the previously elevated tablet thereby acting in the manner of a flash, as is well known to those skilled in the art.

An indicating mechanism is also provided for indicating the type of transaction entered in the machine, but it is similar to that explained in connection with the clerk's indicators and for this reason it will only be briefly explained. The four transaction indicators 463 (Fig. 47) are also carried by the transaction and clerk's indicator carriage and have their stems cooperating with slots formed in guiding blocks 464. Each indicator is provided with a foot 465 adapted to cooperate with a selecting finger 466 differentially positioned by a segment 467 which cooperates with a slotted link 468 which, as shown in Fig. 27, is attached to the shaft 208, which, it will be remembered, is differentially positioned by mechanism under control of the transaction keys. Normally, the indicator tablet bearing the word "Cash" will be elevated, but if one of the other transaction keys should be operated it will permit a differential positioning of the segment 467 so that the selecting finger 466 will engage the foot 465 of the desired transaction indicator so that there will be indicated, at the end of the operation of the machine, the type of transaction entered therein.

It should also be pointed out that the clerk's and transaction indicator carriage does not receive as great a reciprocating movement as the amount indicator carriage, the reason for this is that the clerks' and transaction indicators are not as wide as the amount indicators and for this reason it will only require a smaller movement of the clerk's and transaction indicator carriage to force one of the previously raised indicators back into the carriage and expose a new one.

Total printing mechanism

In cash registers the total of the sales registered and other information is usually obtained by reading the amount standing upon the totalizer elements and other registering devices. It is preferable, however, to have this information printed upon a record bearing material as it then forms a permanent and unchangeable record bearing material as it then forms a permanent and unchangeable record which may be referred to at any desired time. For this reason the illustrative machine is provided with a simple and effective printing mechanism for printing upon the record strip the amounts accumulated by various totalizers and the numbers standing on the various item counters.

Referring to Fig. 32 it will be noted that resting upon the upper edges of the totalizer support frames 25 and 26 is a ribbon supporting plate 475 which is bent downwardly at both sides to form guiding lugs 476 overhanging the frames 25 and 26, so that the plate 475 may be retained in its proper position without danger of any lateral displacement thereof. The ribbon supporting plate 475 lies directly over the various totalizers and item counters (Fig. 28) and is provided with a corresponding number of apertures 477 (Fig. 53). The plate 475 is provided at one side with a plurality of guiding slots 478 in which fit headed screws 479 carried by the support frame 25 and pinned or locked in place by pins 4791 driven through the support frame 25 and passing into the shanks of the screws. At the other side of the plate there is riveted a plate 480. The plate 480 and the ribbon supporting plate 475 are slotted at 481 to receive screws 482 also locked in place by pins 483. By this means the ribbon supporting plate 475 and parts carried thereby may be moved rearwardly from its normal position to perform a function which will be described hereinafter. In the normal position of the parts the apertures 477 overlie the printing line of each printing totalizer wheel and associated item counter wheels.

The inking ribbons 484 for printing from the item counters and totalizers each comprises a narrow strip of ribbon (Fig. 53) which is held or fixed in a frame 485 apertured at 486 and which is formed by bending so as to grip the ribbon. This unit construction permits the detachment of an old ribbon from the printer and the insertion of a new one. There is a ribbon frame for each printing line and each fits in its associated depression 486 formed in the plate 475 and is held in a fixed position due to the fact that the frame 485 is received at one end by an undercut in the plate 480 and at the other end by a lug 487 integral with the frame 485 fitting in a slot 488 formed in the plate 475. There is a ribbon frame for each printing line so that one can be removed or replaced independently of any other.

In order to print the totals and numbers standing upon the item counters there is securely fixed between and carried by the side plates 224 and 2241 (Figs. 53 and 54) a number of box-like frames 489 each of which is open at its lower end. Journaled between a member 490 carried by each box 489 and the side plate 2241 is a shaft 491 provided at one end with a finger-piece 492 and carrying eccentrics 493 (See also Fig. 28). The eccentrics 493 cooperate with a U-shaped frame or yoke 494 which is provided at its lower end with an impression block 495 directly overlying the inking ribbon 484 the record strip and the type printing elements carried by the associated totalizer and item counter.

It will be understood that the record strip passes between the rubber impression block 495 and the ribbon 484 and when it is desired to obtain an imprint from a particular totalizer and associated item counter the related finger-piece 492 is rocked and through eccentrics 493 will move the platen block 495 downwardly thereby effecting an imprint upon the record strip. In the same manner when it is desired to effect printing from any other totalizer and associated counter the proper lever 492 is manipulated so that the information desired will be printed upon the record strip. By then manipulating the spacing lever 249 the printed characters (See Fig. 2) may be brought into view and the order in which they appear upon the record strip will be a means of designating the amounts standing upon different totalizers and associated item counters. If so desired an autographic notation may be made adjacent each printed total to suitably identify each totalizer and counter.

Resetting devices

At the termination of a day's business or any arbitrary period it is desirable that after the totals have been obtained from the various totalizers and item counters that the various registering elements be returned to zero prior to the registration of the sales accumulated during a subsequent period. To this end each totalizer is provided with a manipulative device which is adapted to reset the totalizer elements to their zero positions.

To this end each totalizer wheel supporting shaft 271 extends outwardly and is provided at its end with a knurled knob (Fig. 34). As best shown in Fig. 36, each of the totalizer elements 269 carries a pivoted pawl 497 which is springpressed against the shaft 271. Each shaft 271 is provided with a series of notches 498 one for each wheel of the totalizer. When the wheels are turned in the registering operations of the machine the pawls 497 will slip idly over the shaft 271 due to the fact that the resetting pawls are normally out of the path of the associated notches 498. However, when the shaft 271 is first shifted by means of the knob 496 so as to bring the notches and pawls in cooperative relationship and then turned by means of the knurled knob 496 the abrupt wall of each notch will contact with the end of its pawl 497 and pick up the totalizer element in whatever position it may be standing at the beginning of the movement of the shaft and carry it around with the shaft so that nearly a complete revolution of the shaft in the proper direction will serve to reset the totalizer elements to zero or initial position in the opposite direction from that of adding. This method of resetting is well known in the art and is a common expedient found in cash registers.

Attention is directed to the fact that the item counter wheels are not provided with any resetting pawls or associated notches in the supporting shafts 271 so that when the shaft is rotated to reset the totalizer elements the item counter elements will not be restored to zero positions but will continue to accumulate units and the total number of sales registered by any item counter during a specific period may be readily ascertained by mental subtraction of two printed total counts.

Precautionary devices

The mechanism as thus far described is substantially complete and practically operative, but some devices which may be called precautionary devices are desirable to prevent any possible mis-manipulations of the machine.

As has been premised hereinbefore the machine is provided with a hinged cover 31 which when raised will give access to the printing mechanism, the total printing levers and the resetting devices.

In some instances it would be of particular advantage for persons to fraudulently manipulate the totalizer elements, if that could be done, so as to indicate a total less than that actually registered. In order to guard against such mis-operation and others which might otherwise be possible, due to the fact that certain mechanisms are located under the hinged cover which may be raised at times, additional mechanism is provided.

It has already been stated that the printing mechanism is movable as a unit about its pivotal point 227 and since the totalizer and item counter elements are directly underneath the printing mechanism they would normally be exposed whenever the printing mechanism is raised. To prevent this the side plates 224 and 2241 are each provided with studs 500 (Fig. 32) cooperating with locking arms 501 and 502 (See Figs. 6, 21 and 28), both of which are attached to a short transverse shaft 503. The locking arm 502 passes through a square notch formed in the forward portion of plate 480 (Fig. 53) and is also provided with a finger-piece 504 (Fig. 6). The plate 480 at its rearward end is also provided with a similar notch engaging a downwardly extending arm 505 (See Fig. 6) provided with a locking extension 506 normally cooperating with a shoulder 507 formed as part of the side plate 2241. It will be noted that when the parts are in the position shown in Fig. 6 the printer will be locked against upward movement by the cooperation of the locking arms 501 and 502 with their associated locking studs 500, but whenever the finger-piece 504 is moved rearwardly to disengage the locking arms from cooperation with their associated studs the plate 480 will be forced rearwardly and since it is attached to the ribbon supporting plate it will force the latter rearwardly guided by the slots 481 cooperating with the screws 482 so that an integral portion instead of an opening of the supporting plate will now be located over each of the totalizers and counters. At this time the totalizers and counters will be covered so that it will not be possible to surreptitiously rotate the elements.

When the parts are in this position it will be possible to rock the printer about its pivotal point 227 due to the fact that the locking extension 506 is disengaged from the shoulder 507 and when the printer is elevated from its normal position the co-action of a concentric edge 508 with the locking lug 506 will retain the locking arm 505 and therefore, the ribbon supporting plate in its rearwardly advanced position, retaining the totalizer elements covered as long as the printer frame remains out of its normal position. The printer frame is lifted upwardly in order to replenish the paper supply, and, furthermore, in order to permit the insertion of new inking ribbon supporting frames 245 when necessary.

As shown in Fig. 21, the arm 502 extends rearwardly forming an extension 509 provided with a lug 510. The pitman 172, which it will be remembered, is utilized for the purpose of unlocking the machine for operation is provided with a locking extension 511, the forward edge 512 of which is concentric with respect to the shaft 503. The result of this mechanism is that when the arm 502 is moved rearwardly to unlock the printer for operation the lug 510 will pass in front of the extension 511 thus preventing a release of the machine by the depression of one of the clerk's keys.

Conversely, it will be obvious that when the machine is released for operation the upper edge of the extension 511 will pass under the lug 510 retaining the locking arms 501 and 502 in locking relationship with their associated studs 500 and for this reason it will be impossible to raise the printing mechanism whenever the machine has been released for operation, and, furthermore, while the crank handle is being turned, since it will be remembered the pitman 172 is retained in its locking position when shifted until the final movement of the crank handle and shaft 111.

It will be obvious, due to the construction previously described in connection with the printer platen 252 which, it will be remembered, is carried by the shaft 251, that if no means were provided to prevent it, the platen and parts carried thereby would rock downward whenever the printing mechanism is elevated. In order to limit the rocking movement of the platen the arm 253 is provided with a shoulder 513 adapted to cooperate with a lug 514 (Figs. 21 and 31) integral with the side frame 2241. This will also serve as a means to locate the stud 256 in the fork 257 of the operating pitman 258 when the printer is restored to its normal position.

*General summary of operation*

The nature of the improved mechanism is such that in order to make the foregoing description as clear as possible it was necessary to state the operation considerably in detail as an incident to explaining the various features of construction. A complete statement of the operation is therefore believed to be unnecessary. However, a résumé of the general operation of the machine will be given to co-ordinate the operations and functions of the various parts which have been described in detail.

It will be assumed, for example, that clerk D desires to enter a "Cash" transaction of $25.06 covering the cost of an article of which the stock number is 2874. It will be remembered in entering an amount the keys are successively depressed and are struck in the order of the digits, reading from the left of the number without regard to the denomination of the number. The operator will first depress the "2" amount key so that it will be operated against the tension existing in the spring 47 (Fig. 5) rocking the associated bell-crank 38 and through the link 43 rocking its yoke 41 and by means of the finger 44 elevating its associated controlling slide 46. When the amount controlling slide 46 is elevated the projection 76 will engage the lug 74 so that the slide 73 will be raised almost immediately so as to disengage the zero stop 72 (Fig. 10) from the finger 76. Previous to this disengaging action, the projection 64 of the amount controlling slide will have been brought into the path of the finger 60 which is situated two steps away so that when the zero stop 76 releases the tube 49 for rotation by means of the spring urged segment 68, (Fig. 5) the tube 49 and all of the type carriers will be rotated until the finger 60 strikes the projection 64, at which time the selectors and type carriers have been rotated forwardly through the proper angle. The type carriers will now be positioned so that "2" is at the printing point. After this action the dog 94 (Fig. 10) is disengaged from the escapement finger 92 so that the spring acting upon the segment 89 (Fig. 6) will, through the gear train previously described, rotate the shaft 84 until the finger 93 strikes the dog 97 at which time the shaft 84 will be locked against further rotation. This comprises the first partial feeding movement of the group of type carriers and when the depressed amount key begins its upward movement the spring 101 (Fig. 4) will draw the slide 98 downwardly disengaging the dog 97 from the escapement finger 93, but since the escapement dog 94 has been placed in the path of the escapement finger 92 by its spring 100 (Fig. 4), when such disengagement is effected, the shaft 84 will be released for further rotary movement until stopped by the engagement of the finger 92 with the escapement dog 94. At this time the carriage 80 will have been given a complete step of movement and the whole group of selectors will have been moved one step and the selector at the extreme left of the group will engage the first one of the transmitting racks 55. After this operation the spring 77 (Fig. 4) acting upon the slide 73 will bring the zero stop 72 in the path of the oppositely disposed finger 76, so that when the projection 64 is disengaged from the finger 60, the tube 49 and type carriers thereon will be given their complementary movements, rotating all the disengaged selectors and type carriers back to the normal position ready for the depression of the next digit key.

At this time the first reading wheel 130 may be read through the slot in the machine cabinet, and if the two key has been depressed as assumed the numeral "2" will be exhibited. The next key to be depressed, in the example taken, will be the "5" key. Upon the depression and return to normal position of this key the second type carrier will be brought to the "5" position and the second selector will be rotated through five steps of movement. At the same time the first reading wheel 130 will be shifted into the tens order and the wheel indicating "5" will be brought into view in the units order. The zero and "6" amount keys are then successively depressed so that at the end of the operation of all the keys, the amount of $25.06 will be standing upon the index indicators and the type carriers, and will be represented on the selector wheels.

Since certain ledger numbers are to be printed the operator will then depress the ledger keys 2, 8, 7, 4 (Fig. 1) successively with precisely the same result upon the corresponding type carriers and reading wheels as for the amount keys.

At this point in the operation of the machine if it should be observed that the proper numbers have not been entered in the machine, as shown by the index indicators, either in the ledger or amount differentials, the "Error" key will be operated. In order to rectify the error the error key 141 is drawn outwardly rocking the shaft 143 (Fig. 6) so that the stud 145 will first engage the extension 146 of the then shifted segment 89 and rock the latter upwardly and through the train of mechanism already described, it will shift the carriage 80 back to its normal position carrying with it all of the shifted type carriers and selectors so that the pawls 56 (Fig. 12) of the type carriers 48 will now engage the tube 49. After the type carriers 48 are all laterally restored to rest upon the tube 49 the stud 145 will engage the extension 147 of the segment 68 thereby rocking the latter upwardly and rotating the sleeve 49, thus restoring the energy in the spring 71 (Fig. 6) and bringing the type carriers 48 back to their normal positions. The same action will occur in the ledger differential mechanism.

Certain interlocking mechanisms, which are employed, prevent any misoperations of the machine as thus far summarized. It will be noted that when the first shifting movement of the carrier caused by the rotation of the shaft 84 takes place, the cam disk 124 (Fig. 10) will rock the bail 125 counter-clockwise bringing it above the projection 128 of all the amount controlling slides 46 which are at normal thereby locking the remaining amount keys of the group against operation until the completion of the second shifting movement of the carrier into the next denominational position. The same type of mechanism is provided for the ledger differential mechanism.

Furthermore, while the error key is being operated the lug 151 (Fig. 6) will pass in the notch formed on the disk 153 secured to the shaft 111, thereby preventing operation of the machine by the crank handle.

It has also been assumed that the transaction is a "cash" transaction and will not, therefore, require the depression of any of the "transaction" keys but in order to release the machine for operation it will be necessary for the clerk to operate his particular key which in the example assumed, is clerk "D". When the clerk operates his key 154 (Fig. 21) the bell-crank 159 will be rocked forcing the detent plate 160 rearwardly against the tension of its spring 161 so that the rearward end which terminates in the hooked portion 162 will engage the plate 163 carried by the back frame 23 thereby holding the key 154 depressed. The shoulder 168 of the detent plate 160 will engage with the bail 170 so that rocking of the bail 170, through the pin and slot connection, will shift the locking plate 172 forwardly thereby withdrawing the locking lug 175 from the notch in the locking disk 176, and since the lug will be held disengaged from the notch the machine will be retained in unlocked position.

When a clerk's key has been depressed and the locking plate 172 is shifted forwardly, the arm 173 and the sleeve 174 will be rocked so that the upwardly extending arm 177 (Fig. 5) will move the locking plate 178 so that it will engage the notches 179 formed in the controlling slides 46, thereby effectively locking the amount keys. Simultaneously another arm which is also attached to the sleeve 174 will permit a second locking lug 180 (Fig. 17) to engage notches formed in the controlling slides associated with the ledger keys, also locking them against operation when the machine is released.

Since an amount is to be registered in the machine, it will not be possible to depress the "No sale" key either intentionally or accidentally, due to the fact that when one of the amount slides is raised the foot 186 (Fig. 5) of such slide will engage the stud 185 to rock the yoke 183 clockwise against the tension of its spring 187 so as to draw the arm 182 (Fig. 15) rearwardly away from the lug 181 so that when the shifting movement of the carriage takes place the segment 89 will drop downwardly bringing the lug 181 in front of the arm 182 and also bringing an arm 188 (Fig. 2) in front of a projection 189 carried by the detent plate 160 associated with the "No sale" key thereby locking the latter against operation.

When the clerk's key 154 (Fig. 21) is depressed the slot 187¹ engaging the pin 188¹ carried by the plate 189¹ will, through its jaw 190 positively rock the corresponding bail 191 counter-clockwise, as viewed in Figs. 16 and 21. The projection 202 of the bail contacting with the projection 203 of the detent 199 will disengage the forward end of the detent from the lug 198, carried by the slide 193 and just prior to this time the hook 162 will have been caught over the plate 161. The bail 191 will be elevated sufficiently so as to bring it in the path of the foot 204 integral with the slide 193 which, at this time is unlocked by the detent 199 so that the spring 197 (Fig. 28) will rock the segment 194 clockwise forcing the slide 193 rearwardly until the projection 204 contacts with the projection 202 of the raised bail 191. At this time the clerk's type carrier will be positioned to print the character "D" upon the record strip. Since it is assumed that the transaction is a cash transaction, none of the transaction keys will be depressed and the transaction type carrier will be retained in its normal position so as to print a character indicating that the transaction is a cash transaction.

When the bail 191 is rocked clockwise the extension 274 (Fig. 28) will rock the bell-crank 275 and by means of the projection 281 raise its corresponding selecting finger 280 upwardly to bring its forward end in cooperation with the finger 284 of the associated totalizer controlling slide 282 and since the clerk's key is latched in its depressed position the finger 280 will be retained in cooperative relationship with the finger 284. It will, therefore, be noted at this point in the operation that the clerk's type carrier is adjusted to its proper position and that the totalizer selecting mechanism will have been set, all this being performed prior to the further operation of the machine by the crank handle.

It should be pointed out at the present time, that if the transaction should be other than a cash transaction, the proper key will be depressed resulting in a differential adjustment of the transaction type carrier 205, (Fig. 3) in a manner similar to that described in connection with the adjustment of the clerk's type carrier.

If the transaction key operated does not contemplate the receipt of cash, such as the "Charge", "Paid out", and "No sale" keys, depression of one of these keys will rock the associated bell-crank 311 (Fig. 28) so that its lug 312 will raise all the selecting fingers 280 upwardly bringing their forward ends in line with the notches 285 so that none of the totalizers will be thrown into engagement when the machine is operated.

However, if the transaction should be one involving the receipt of cash, such as a "Received on account" transaction for which it is desired to enter the amount in the appropriate totalizers, the finger 280 will remain in cooperative relationship with the finger 284 of the totalizer controlling slide 282, and will not be affected by the depression of the proper key.

The amount, ledger, clerk's and transaction type carriers, will, at this time, have been properly positioned to print upon the record strip and the machine is now ready for further operation by the crank handle.

During the first movement of the operating handle the pitman 258 (Fig. 3) is moved forwardly thereby rocking the shaft 251 and forcing the platen 228 against the amount, ledger, clerk and transaction type carriers thus effecting an impression upon the record strip.

After the printing impression the pitman 242 (Fig. 31) will be moved forwardly and through its extension 41 cooperating with the lug 240 will rock the operating plate 237 counter-clockwise, and since the feeding pawl 239 is in engagement with the teeth of the ratchet wheel 236, it will rotate it and the shaft 235, and since the paper passes between the rollers 233 and 234 (Fig. 2) the paper strip will be fed an increment. This will bring the printed item in juxtaposition to the writing slot 263 (Fig. 1) of the glass 262 so that if desired, the operator may make further notations upon the record strip in the form of written entries. If insufficient room is provided to accommodate the complete written entry the paper strip may be fed as much as desired, by means of the spacing lever 248 which projects through the cabinet cover 31.

When the machine is operated the arm 277 (Fig. 15) will be rocked forwardly thereby forcing the desired totalizer controlling slide 282 (Fig. 28) forwardly and through the cam slot 286 co-operating with the shaft 271 will rock the desired clerk's totalizer frame about its pivotal point forcing the totalizer pinions into mesh with the actuating racks, which at this time, are stationary. Also when a clerk's totalizer controlling slide 282 is moved forwardly the forward end engaging the lug 290 (Fig. 15) will force the slide 288 forwardly and by virtue of the slot 289 formed therein engaging the shaft 271, will serve to simultaneously force the grand totalizer 264 into engagement with the transmitting racks.

Simultaneous with this operation, the movement of the grand totalizer slide 288 (Fig. 15) will, through the teeth formed on the under edge co-operating with the pinion 296 rock the shaft 295 to move the locking slide 291 (Fig. 31) forwardly unlocking all the totalizers at one end and permitting the clerk's totalizer and grand totalizer to be forced into mesh with the then stationary operating racks 55.

As the crank handle is further operated the sleeve 102 (Fig. 11) is rocked picking up the variously positioned pawls 56 thus driving the selectors 54 differential distances, and when this is taking place the selectors 54 will drive the transmitting racks 55 (Fig. 35) rearwardly and by reason of the teeth at their upper ends meshing with the pinions 270 of the engaged totalizers, they will actuate the totalizer elements differentially. After the pinions have been differentially adjusted, the bail 278 (Fig. 28) is moved reversely and by means of the lug 297 in engagement with the shoulders 298 of the shifted clerk's and grand totalizer controlling slides, will force these slides rearwardly thus lifting the differentially operated totalizers back to their normal positions out of mesh with the racks.

When the racks are moved rearwardly differential extents, as explained, the segments 307 (Fig. 28) are rocked clockwise, and simultaneously the fingers 309 secured to the shafts 308 are rocked clockwise. To permit this movement the bar 303 which carries pins 310 normally blocking the fingers 309 is moved rearwardly by the cam 3021 and pitman 300 (Fig. 21A) at the same rate of speed as the fingers 309 or slightly in advance thereof the pins 310 being given a constant amount of movement equal to the maximum differential movement of the fingers 309.

After the totalizers are disengaged from the racks the selected type wheels 48 which are now at their normal positions with "0" at the printing line will be shifted from the tube 102 back onto the tube 49. Since the selectors 54 will then be out of engagement with the associated transmitting racks 55, the bar 303 (Fig. 28) may be forced forwardly due to the form of cam 3021 and by the cooperation of the studs 310 with the fingers 309, and slot 305 and stud 304, it will rock the shafts 308 and force the transmitting racks 55 back to their normal positions. In a similar manner the pitman 220 (Fig. 28) and cam 221 (Fig. 29) will force the links 216 and 218 rearwardly to rock the segments 194 and 207 restoring the slides and type segments 201 and 205 to normal.

If the amount added to a totalizer wheel will bring it beyond the zero position a unit will be transferred to the wheel of the next higher order, this operation being effected due to the fact that the trip tooth 316 will (Fig. 37) through the member 318 disengage the shoulder 321 from the lug 326 permitting the transfer tooth 3261 to engage the pinion of the next higher order wheel. When the corresponding transfer rack 324 is operated the transfer tooth 3261 which has been moved so that it is in the path of the pinion of the next higher order, will engage the pinion so as to add a unit to the totalizer wheel.

When the clerk's and grand totalizer are thrown into engagement with the actuating racks, the stud 347 (Fig. 41) will be brought into cooperative relationship with the notch 349 in the slide 350 so that when the slide is operated, by means of the arm 352, a unit will be added to the corresponding counter.

When the machine is released for operation by the depression of a clerk's key the member 172 (Fig. 21) will be shifted rearwardly so that the spring 4072 (Fig. 18) will rock the bar 406 downwardly disengaging the bar 406 from the teeth of the aligning segment 405 and releasing the same. This will permit the spring 411 to rock the different segments to their normal positions disengaging the selecting fingers 394 from the feet of the previously elevated amount and clerk's tablets, but since friction exists between the indicator stems and guides, the previously raised amount and tablet indicators will remain in their elevated positions.

When the crank is operated the amount indicator carriage and the clerk's and transaction indicator carriage will be raised, but since the stops 415 (Fig. 46) co-operate with the feet 3761 of the elevated amount tablets they will prevent further upward movement of the raised tablets, and since the latter are held stationary while the indicator carriage is now being moved upwardly, the tablets will be forced back to their normal positions. In a similar manner, the previously elevated transaction and clerk's indicators will be held while they are being forced back into the clerk's and transaction indicator carriage. While the indicator carriages are being elevated the shafts 388 will be rocked so as to bring the selecting fingers 394 out of the line of travel of the feet of the various indicators, and upon the beginning of the second half of the operation of the machine when the carriage is at its uppermost position, the differentially positioned fingers, which are controlled by the differential positioning of the links 414 (Fig. 6) for the amount carriers, links 421 (Fig. 6) for the clerk's and links 468 (Fig. 47) for the transaction indicators, will again be rocked under the feet of the indicators which are to remain elevated, and simultaneously the cam 410 will operate to force the locking bar 406 upwardly to lock the segments and selecting fingers in their differentially adjusted position. The indicator carriages will now descend carrying with them all the indicators with the exception of the indicators which are retained elevated by reason of the fact that the selecting fingers have been placed in the line of travel of the feet of those indicators. At the end of the operation of the machine there will be exhibited to view, the amount designating the amount of the transaction, the clerk operating the machine, and the type of transaction.

As previously stated, if the amount entered in the machine should not be of a denomination higher than the dimes, the selecting finger 394 will not cooperate with the fingers of the amount tablets, so that the "0" indicator of groups higher than the dimes denomination will not be exhibited to view. In order to position the selecting fingers so that they will cooperate with the feet of the "0" tablets in the groups where zeros form a necessary part of the number to be exhibited, the successive depression of the keys will, by the link 427 (Figs. 6 and 52) rock the shaft 429 correspondingly to draw all the zero levers 431 rearwardly so that when the crank handle is operated the bail 434 will be moved upwardly elevating the links 421 and through the cam edges 423 of the triangular slots 422 rocking the segments clockwise and moving the selecting fingers one step rearwardly, until they are in the line of travel of the feet of the zero tablets.

A duplex indication is provided whereby the amounts may be read both at the front and rear of the machine, and in addition, so that the clerk operating the machine and type of transaction may also be read both at the front and the rear of the machine.

The above description states in fair detail the operation of the mechanisms when one amount has been entered in the machine and in order to register the different transactions pertaining to an arbitrary period the necessary keys are operated, and the crank handle subsequently operated for each separate transaction. This will permit the totalizers to accumulate the cash sales pertaining to a certain period and the item counters will register the number of cash sales performed by each clerk as well as the total number of cash sales transacted by all the clerks.

At the end of the desired period, the amount standing upon the totalizers and item counters may be printed and when it is desired to print the totals and numbers standing on the totalizers and item counters, it is merely necessary to rock the levers or finger-pieces 392 (Fig. 6) and through the eccentric 493 the platen blocks 495 will be moved downwardly against the paper, inking ribbon and type carriers. When all the information desired has been obtained, the totalizers are reset to their normal positions, this being performed by means of the knurled knobs 496 (Fig. 34) attached to the totalizer wheel supporting shafts 271.

When a clerk desires to replenish the paper supply, the printing mechanism is lifted upwardly, but before this is possible the finger-piece 504 (Fig. 6) must be moved rearwardly to disengage the locking arms 501 and 502 from co-operation with their studs 500. This will result in moving the ribbon supporting plate 475 (Fig. 53) rearwardly so that the plate will be forced over the totalizers and item counters thus preventing any fraudulent rotation of the totalizer elements.

When the printer frame is elevated the co-action of the concentric edge 508 (Fig. 6) with the locking lug 506 will retain the locking arm 505 and therefore, the ribbon supporting plate 475 in its rearwardly shifted position keeping the totalizers and counters totally concealed.

When the machine is released for operation the upper edge of the extension 511 (Fig. 21) will pass under the lug 510 to retain the locking arms 501 and 502 in locking relationship with their associated studs, so that it will be impossible to elevate the printing mechanism to fraudulently gain access to the totalizer elements after the machine has been released and vice versa.

While the form of mechanism herein shown and described is admirably adapted to fulfill the objects primarily stated, it is to be understood that it is not intended to confine the invention to the one form of embodiment herein shown, since it may be embodied in various forms all coming within the scope of the claims which follow.

What is claimed is:—

1. In an accounting machine, the combination of a series of keys, a group of selectors, and means controlled by the keys for differentially positioning the group of selectors and then turning all but one of said selectors forwardly to normal.

2. In a machine of the character described, the combination with a series of keys, a platen having effective and ineffective portions, a group of type carriers normally arranged below the ineffective portion of the platen, and means controlled by the keys for differentially positioning the type carriers and placing them, one for each depression of the keys, into operative relationship with the effective portion of the platen.

3. In an accounting machine, the combination with a series of keys, an oscillatory member operated by each key, a type carrier, a normally locked rack adapted to differentially adjust the type carrier, and means controlled by any one of said oscillatory members for unlocking the rack, said member acting as a stop for the movement of the rack to differentially adjust the type carrier.

4. In an accounting machine, the combination of a series of keys, a corresponding number of bails operated by the keys, a type carrier, a rack for differentially adjusting the type carrier, a detent for the rack, and means controlled by any bail whereby it first disables the detent and then acts as a stop for the rack whereby the differential positioning of the type carriers is determined.

5. In an accounting machine, the combination of a series of keys, a corresponding number of bails operated by the keys, a type carrier, a rack for differentially adjusting the type carrier, a detent for the rack, means operated by any one of said bails whereby it first disables the detent and then controls the differential positioning of the rack and type carrier, an operating shaft, and connections therefrom whereby the rack and the type carrier are positively returned to their normal positions and locked by the detent.

6. In an accounting machine, the combination of a series of keys, detent plates operated thereby, a corresponding number of bails operated by the detent plates, means associated with the detent plates whereby the keys are locked in depressed position, a type carrier, a member for differentially adjusting the type carrier, a detent for said member, means operated by any bail whereby the detent member is first disabled, said bail acting as a stop for the member whereby the differential positioning of the type carrier is determined.

7. In an accounting machine, the combination of a series of keys, detent plates whereby the keys are retained in their depressed positions, a plurality of bails operated by each key, a type carrier, a rack member for differentially adjusting the type carrier, a detent for the rack member, connections whereby said bail first disables the detent and then acts as a stop for the movement of the rack and type carrier so as to differentially position the latter, an operating shaft, means controlled by the detent plates whereby the operating shaft is unlocked when a key is depressed, and means controlled by the operating shaft for positively restoring the type carrier and the rack member to their normal positions and for releasing the depressed keys.

8. In a machine of the class described, the combination of a totalizer comprising a plurality of total printing elements, an inking ribbon normally overlying the total printing elements of the totalizer, a plate carrying said ribbon, said plate having an opening covered by said ribbon and an integral portion adjacent said opening, and means for moving the inking ribbon out of co-operative relationship with the printing totalizer and bringing the integral portion of the plate over the totalizer.

9. In a machine of the class described, the combination of a printer frame carrying a plurality of total printing platens, printing totalizers one for each total printing platen, a plate mounted below said printer frame, a series of inking ribbons one for each printing totalizer and all carried by said plate, means for normally locking the printer frame, means for unlocking the printer frame, said unlocking means having connections whereby said plate will be shifted and the inking ribbons will be withdrawn from co-operative relationship with the related printing totalizers and integral portions of said plate will be brought over the printing totalizers.

10. In a machine of the class described, the combination of a totalizer, a plate overlying the totalizer, said plate having an integral portion and an aperture, the latter normally standing over the printing totalizer, a normally locked frame for concealing the totalizer, and means for unlocking the frame and simultaneously bringing the integral portion of the plate over the totalizer to prevent access thereto.

11. In an accounting machine, the combination of a group of keys, a group of movable elements, a supporting means for said group of movable elements, means controlled by the keys for controlling a differential positioning of the support and group of movable elements, and a splined connection between the movable elements and the support.

12. In an accounting machine, the combination of a series of keys, a group of movable elements, a series of slides, one for each key, and means whereby the slides control the differential positioning of the movable elements as a group.

13. In an accounting machine, the combination of a series of keys, a group of movable elements, a series of slides controlled by said keys, means controlled by said slides for differentially positioning said group of movable elements said means also controlling restoration of all but one of said movable elements.

14. In an accounting machine, the combination of a series of keys, a group of movable elements, a plurality of helically arranged stop fingers, and means cooperating with the keys and with the stop fingers for controlling differential positioning of the group of movable elements.

15. In an accounting machine, the combination of a series of keys, a group of movable elements, a support for the group of movable elements, a plurality of helically arranged stop fingers movable with the support, and means whereby the keys in cooperation with the stop fingers control the differential positioning of the support and group of movable elements.

16. In a machine of the class described, a group of movable elements, means for supporting the group of movable elements, a series of helically arranged fingers movable with the supporting means, a series of stop members arranged to be projected into the path of said fingers, a series of keys, and connections between the keys and the stop members for selectively projecting them into the path of said fingers.

17. In an accounting machine, a series of elements rotatable about a horizontal axis, a series of stop fingers movable with said elements, a series of vertically movable stop devices cooperating with the stop fingers, a series of keys, connections intermediate the keys and stop devices for projecting the stop devices in the path of the stop fingers, and means for rotating said elements until a stop finger abuts a stop device.

18. In a machine of the class described, a plurality of type carriers, a platen provided with a depression therein normally overlying said type carriers, and means for successively shifting said type carriers laterally to bring the same into operative relationship with the effective surface of said platen.

19. In an accounting machine, the combination of a series of keys, a group of elements, and means controlled by the keys for controlling a differential positioning of the group of elements and then moving all but one to normal, the movement to normal being in the same direction as the positioning movement.

20. In an accounting machine, the combination of a series of keys, a group of elements, a supporting means for the group of elements, means controlled by the keys for controlling a differential positioning of the support and group of elements, and a pawl carried by each element engaging a portion of the support.

21. In an accounting machine, the combination of a series of keys, a group of elements, normally restrained means for driving the elements as a group, and means controlled by the keys for releasing the driving means and controlling the differential positioning of the group of elements.

22. In an accounting machine, the combination with a series of keys, a group of elements, a support for the elements, connections between the elements and support for producing simultaneous movement thereof, a member for rotating the support and group of elements, and means controlled by the keys for releasing the member to rotate the support and elements differentially in accordance with the key depressed.

23. In an accounting machine, the combination of a series of keys, a group of elements, a support for the elements, a connection between the elements and support for producing simultaneous movement thereof, a member for rotating the support and group of elements, means controlled by the keys for releasing said member, and means controlled by the keys for stopping said support and elements at a position governed by the key depressed.

24. In an accounting machine, the combination with a series of keys, a group of elements, a support for the elements, connections between the elements and support for producing simultaneous movement thereof, a member for rotating the support and group of elements, means controlled by the keys for releasing said member, means controlled by the keys for stopping the support and elements at a position governed by the key depressed, said member also being effective to restore all but one of the group of elements to zero position.

25. In an accounting machine, the combination with a series of keys, a group of elements, a plurality of helically arranged stop fingers, means whereby the keys in cooperation with stop fingers control the differential positioning of the group of elements and then control the turning of all but one of the differentially positioned elements to zero position.

26. In an accounting machine, the combination with a series of keys, a group of elements, a support for the group of elements, an adjacent support, a splined connection between the first mentioned support and group of elements, means whereby the keys control the differential positioning of said support and group of elements, means for successively shifting the differentially positioned elements from said support to said adjacent support, a main operating mechanism, and means whereby the main operating mechanism will actuate the last mentioned support so as to restore the differentially positioned elements and then return them laterally into engagement with the first mentioned support.

27. In a machine of the class described, the combination of a series of elements, a series of selectors movable therewith, transmitting racks a series of keys, and means controlled by the keys for causing the selectors and elements to be adjusted differentially and for shifting the selectors successively into engagement with the transmitting racks.

28. In a machine of the class described, the combination of a series of keys, a group of elements, a corresponding number of selectors in engagement with the elements and means controlled by the keys whereby the selectors and elements are simultaneouly adjusted differentially.

29. In a machine of the class described, the combination of a series of keys, a group of elements, a corresponding number of selectors connected with the elements, means controlled by the keys whereby the entire group of selectors and elements are simultaneously adjusted differentially, and means whereby all of the selectors and elements but one, are restored to their normal positions.

30. In a machine of the class described, the combination of a main operating mechanism, a plurality of elements, a corresponding number of selectors geared thereto, transmitting racks normally out of operative relationship with the selectors, a series of keys, means controlled by the keys for differentially positioning the elements and selectors and for shifting the selectors successively into operative relationship with the transmitting racks, and means operated by the main operating mechanism for turning the selectors to zero and thereby driving the transmitting racks differentially and then causing the elements and selectors to be shifted back to their normal positions.

31. In an accounting machine, the combination of a key, an element, a selector geared to the element, a support for the element, and means whereby the key simultaneously controls the differential positioning of the support, element and selector, and controls a lateral movement of the element and selector.

32. In an accounting machine, the combination of a series of keys, a group of elements, a corresponding number of selectors geared thereto, transmitting racks normally out of operative relationship with the selectors, and means whereby the keys control the differential positioning of the elements and selectors and then the shifting of them laterally into operative relationship with the transmitting racks.

FREDERICK L. FULLER.